US012179326B2

(12) United States Patent
Bierdeman et al.

(10) Patent No.: US 12,179,326 B2
(45) **Date of Patent: *Dec. 31, 2024**

(54) LIFTER MECHANISM FOR A POWERED FASTENER DRIVER

(71) Applicant: MILWAUKEE ELECTRIC TOOL CORPORATION, Brookfield, WI (US)

(72) Inventors: David A. Bierdeman, New Berlin, WI (US); Troy C. Thorson, Cedarburg, WI (US); Jacob P. Schneider, Cedarburg, WI (US); Mackenzie J. Nick, Fond du Lac, WI (US); Nathan Bandy, Wauwatosa, WI (US); Travis W. Leathrum, Milwaukee, WI (US); Mitchell T. Neuhoff, Waukesha, WI (US); Mark C. Hughes, Waukesha, WI (US); David C. Graf, Greendale, WI (US); Marcus Wechselberger, Milwaukee, WI (US); Leonard F. Mikat-Stevens, Milwaukee, WI (US); Jacob N. Zimmerman, Pewaukee, WI (US); Jason M. Julius, Waukesha, WI (US); Rosalie C. Phillips, Milwaukee, WI (US); Beth E. Cholst, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/665,150

(22) Filed: Feb. 4, 2022

(65) Prior Publication Data

US 2022/0219301 A1 Jul. 14, 2022

Related U.S. Application Data

(63) Continuation-in-part of application No. 17/584,060, filed on Jan. 25, 2022, now Pat. No. 11,951,601,
(Continued)

(51) Int. Cl.
*B25C 1/06* (2006.01)
*B25C 1/04* (2006.01)

(52) U.S. Cl.
CPC ................ *B25C 1/047* (2013.01); *B25C 1/06* (2013.01); *B25C 1/041* (2013.01)

(58) Field of Classification Search
CPC ................................. B25C 1/047; B25C 1/06
See application file for complete search history.

(56) References Cited

U.S. PATENT DOCUMENTS 1,064,551 A 6/1913 Schugart
1,758,603 A 5/1930 Helenbolt
(Continued)

FOREIGN PATENT DOCUMENTS

CN 102689289 A 9/2012
CN 202702169 U 1/2013
(Continued)

OTHER PUBLICATIONS

International Search Report and Written Opinion for Application No. PCT/US2020/037692 dated Sep. 25, 2020 (10 pages).
(Continued)

*Primary Examiner* — Joshua G Kotis
(74) *Attorney, Agent, or Firm* — Michael Best & Friedrich LLP

(57) ABSTRACT

A powered fastener driver includes a driver blade movable from a top-dead-center (TDC) position to a bottom-dead-center (BDC) position for driving a fastener into a workpiece and a drive unit for providing torque to move the
(Continued)

driver blade from the BDC position toward the TDC position. A kickout arrangement is at least partially defined by an outer surface on one of a torque output member and a torque input member and an aperture formed in the other of the torque output member and the torque input member in which the outer surface is received. The kickout arrangement configured to permit limited rotation of the torque output member relative to the torque input member between a first position and a second position.

21 Claims, 61 Drawing Sheets

Related U.S. Application Data which is a continuation-in-part of application No. 17/154,389, filed on Jan. 21, 2021, now Pat. No. 11,618,145, which is a continuation of application No. 17/052,463, filed as application No. PCT/US2020/037692 on Jun. 15, 2020, now Pat. No. 11,331,781.

(60) Provisional application No. 62/901,973, filed on Sep. 18, 2019, provisional application No. 62/861,355, filed on Jun. 14, 2019.

(56) References Cited

U.S. PATENT DOCUMENTS 2,473,868 A 6/1949 Domke
2,572,276 A 10/1951 Moe
2,590,994 A 4/1952 McKay
3,241,216 A 3/1966 Wellendorf
4,349,938 A 9/1982 Fontana
4,519,535 A 5/1985 Crutcher
5,586,639 A 12/1996 Yoshino
5,931,112 A 8/1999 Lacan
7,575,142 B2 8/2009 Liang et al.
8,011,441 B2 9/2011 Leimbach et al.
8,011,547 B2 9/2011 Leimbach et al.
8,230,941 B2 7/2012 Leimbach et al.
8,267,296 B2 9/2012 Leimbach et al.
8,267,297 B2 9/2012 Leimbach et al.
8,286,722 B2 10/2012 Leimbach et al.
8,387,718 B2 3/2013 Leimbach et al.
8,602,282 B2 12/2013 Leimbach et al.
8,763,874 B2 7/2014 McCardle et al.
9,463,561 B2 10/2016 Franz
9,676,088 B2 6/2017 Leimbach et al.
9,776,312 B2 10/2017 Franz
9,868,196 B2 1/2018 Chien
10,173,310 B2 1/2019 Wyler et al.
10,363,650 B2 7/2019 Miyashita et al.
10,730,172 B2 8/2020 Po
10,898,994 B2 1/2021 Carrier et al.
11,331,781 B2 * 5/2022 Bierdeman ............. B25C 1/047
11,571,794 B2 2/2023 Bierdeman et al.
2006/0180631 A1 8/2006 Pedicini et al.
2007/0210134 A1 9/2007 Oda et al.
2008/0190986 A1 8/2008 Chang et al.
2009/0095787 A1 4/2009 Liang et al.
2012/0325887 A1 12/2012 Wolf
2016/0229043 A1 8/2016 Wyler et al.
2016/0288305 A1 10/2016 McCardle et al.
2017/0190037 A1 7/2017 Sato et al.
2017/0266796 A1 9/2017 Leimbach et al.
2018/0036870 A1 2/2018 Komazaki et al.
2018/0126527 A1 5/2018 Pomeroy et al.
2018/0126528 A1 5/2018 Pomeroy et al.
2018/0126530 A1 5/2018 Pomeroy et al.
2018/0154505 A1 6/2018 Sato et al.
2019/0091845 A1 3/2019 Wyler et al.
2019/0202042 A1 7/2019 Wu et al.
2020/0338708 A1 10/2020 Po
2021/0008701 A1 1/2021 Tan et al.
2021/0101272 A1 4/2021 Saitou et al.
2021/0205969 A1 7/2021 Zhu
2021/0308852 A1 10/2021 Ueda et al.
2022/0339767 A1 10/2022 Zhu
2022/0355451 A1 11/2022 Mecklenburg et al.
2022/0371169 A1 11/2022 Kuriki et al.
2023/0090859 A1 3/2023 Yasutomi et al.
2023/0125450 A1 4/2023 Kuriki et al.
2023/0126083 A1 4/2023 Baba et al.
2024/0051103 A1 2/2024 Kuriki et al.

FOREIGN PATENT DOCUMENTS

CN 105818099 A 8/2016
CN 205835215 U 12/2016
CN 107249823 A 10/2017
DE 8711784 U1 11/1987
JP 2018034258 A 3/2018
WO 2016046188 A1 3/2016
WO 2016160699 A1 10/2016
WO 2016190133 A1 12/2016
WO 2016199670 A1 12/2016
WO 2017056810 A1 4/2017
WO WO-2021102894 A1 * 6/2021 ............. B25C 1/047

OTHER PUBLICATIONS

International Search Report and Written Opinion for Application No. PCT/US2023/011517 dated May 11, 2023 (14 pages).

* cited by examiner

LIFTER MECHANISM FOR A POWERED FASTENER DRIVER

CROSS-REFERENCE TO RELATED APPLICATIONS

This application is a continuation-in-part of U.S. patent application Ser. No. 17/584,060 filed on Jan. 25, 2022, now U.S. Pat. No. 11,951,601, which is a continuation-in-part of U.S. patent application Ser. No. 17/154,389 filed on Jan. 21, 2021, now U.S. Pat. No. 11,618,145, which is a continuation of U.S. patent application Ser. No. 17/052,463 filed on Nov. 2, 2020, now U.S. Pat. No. 11,331,781, which is a national phase filing under 35 U.S.C. § 371 of International Application No. PCT/US2020/037692 filed on Jun. 15, 2020, which claims priority to U.S. Provisional Patent Application No. 62/901,973 filed on Sep. 18, 2019 and to U.S. Provisional Patent Application No. 62/861,355 filed on Jun. 14, 2019, the entire contents of all of which are incorporated herein by reference.

FIELD OF THE INVENTION

The present invention relates to powered fastener drivers, and more specifically to lifter mechanisms of powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.) to drive a driver blade from a top-dead-center position to a bottom-dead-center position.

SUMMARY OF THE INVENTION

The present invention provides, in one aspect, a powered fastener driver comprising a driver blade The present invention provides, in another aspect, a powered fastener driver The present invention provides, in another aspect, a powered fastener driver comprising The present invention provides, in another aspect, Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
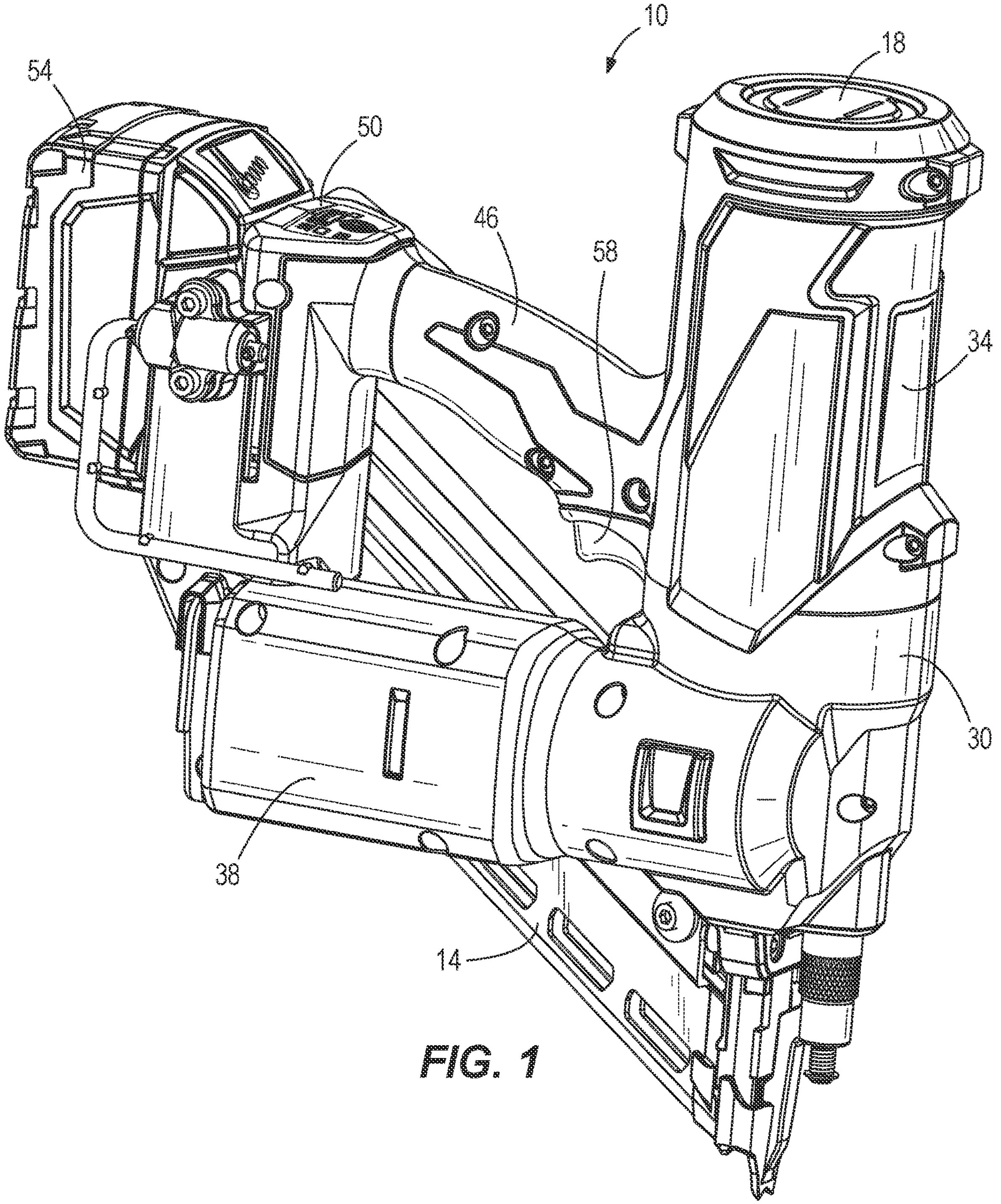
FIG. 1 is perspective view of a powered fastener driver in accordance with a first embodiment of the invention.
Figure 2:
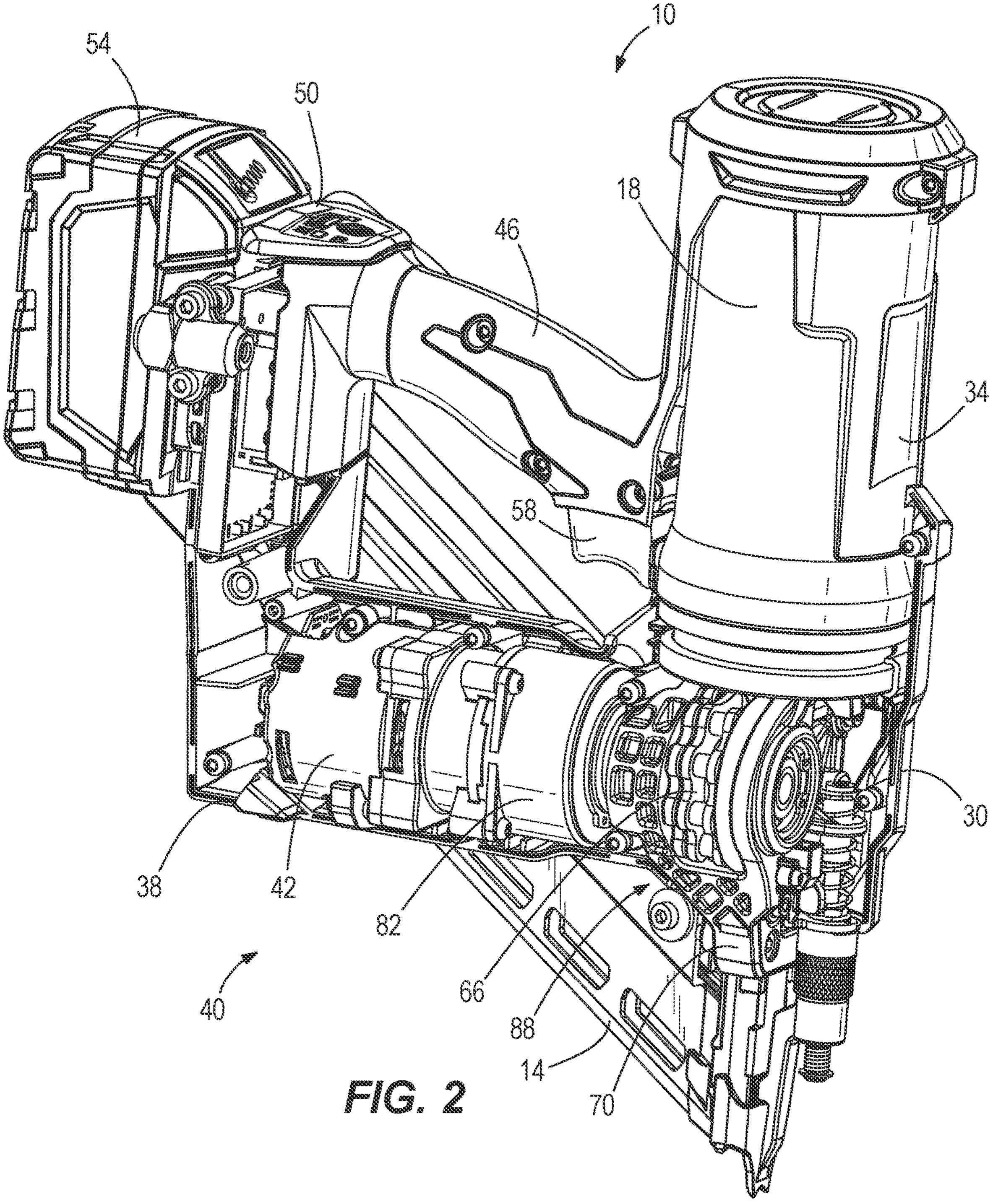
FIG. 2 is another perspective view of the powered fastener driver of FIG. 1, with portions of a housing removed to show a drive unit and a lifter assembly of the powered fastener driver.
Figure 3:
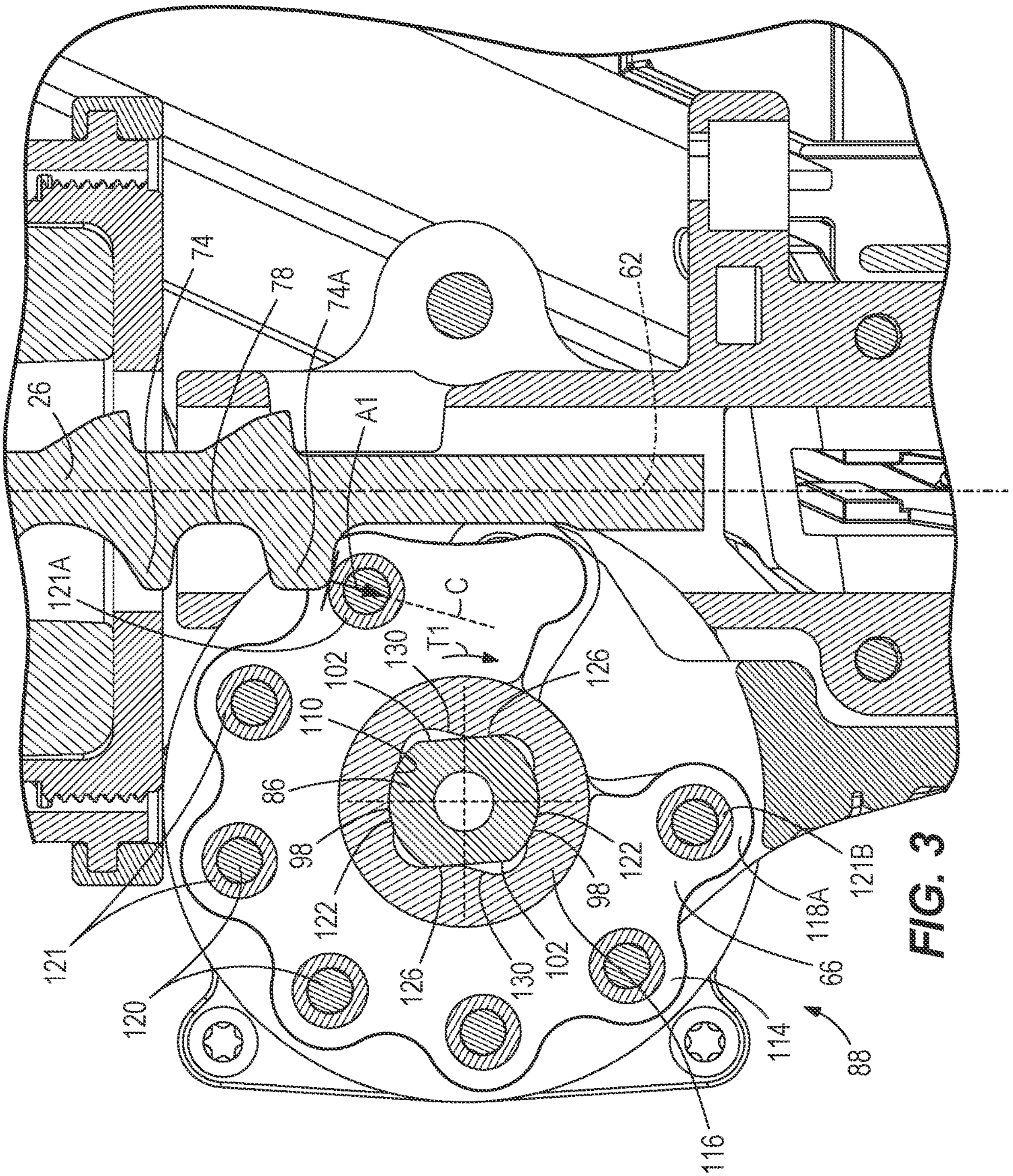
FIG. 3 is a front cross-sectional view of the lifter assembly of FIG. 2 illustrating a driver blade of the powered fastener driver of FIG. 1 in a TDC position, and a rotary lifter of the lifter assembly of FIG. 2 in a first rotational position.

With reference to FIGS. 1 and 2, a gas spring-powered fastener driver 10 is operable to drive fasteners (e.g., nails, tacks, staples, etc.) held within a magazine 14 into a workpiece. The fastener driver 10 includes a cylinder 18. A moveable piston (not shown) is positioned within the cylinder 18. With reference to FIG. 3, the fastener driver 10 further includes a driver blade 26 that is attached to the piston and moveable therewith. The fastener driver 10 does not require an external source of air pressure, but rather includes pressurized gas in the cylinder 18.

With reference to FIG. 1, the fastener driver 10 includes a housing 30 having a cylinder housing portion 34 and a motor housing portion 38 extending therefrom. The cylinder housing portion 34 is configured to support the cylinder 18, whereas the motor housing portion 38 is configured to support a drive unit 40 (FIG. 2). In addition, the illustrated housing 30 includes a handle portion 46 extending from the cylinder housing portion 34, and a battery attachment portion 50 coupled to an opposite end of the handle portion 46. A battery pack 54 supplies electrical power to the drive unit 40. The handle portion 46 supports a trigger 58, which is depressed by a user to initiate a driving cycle of the fastener driver 10.

Figure 4:
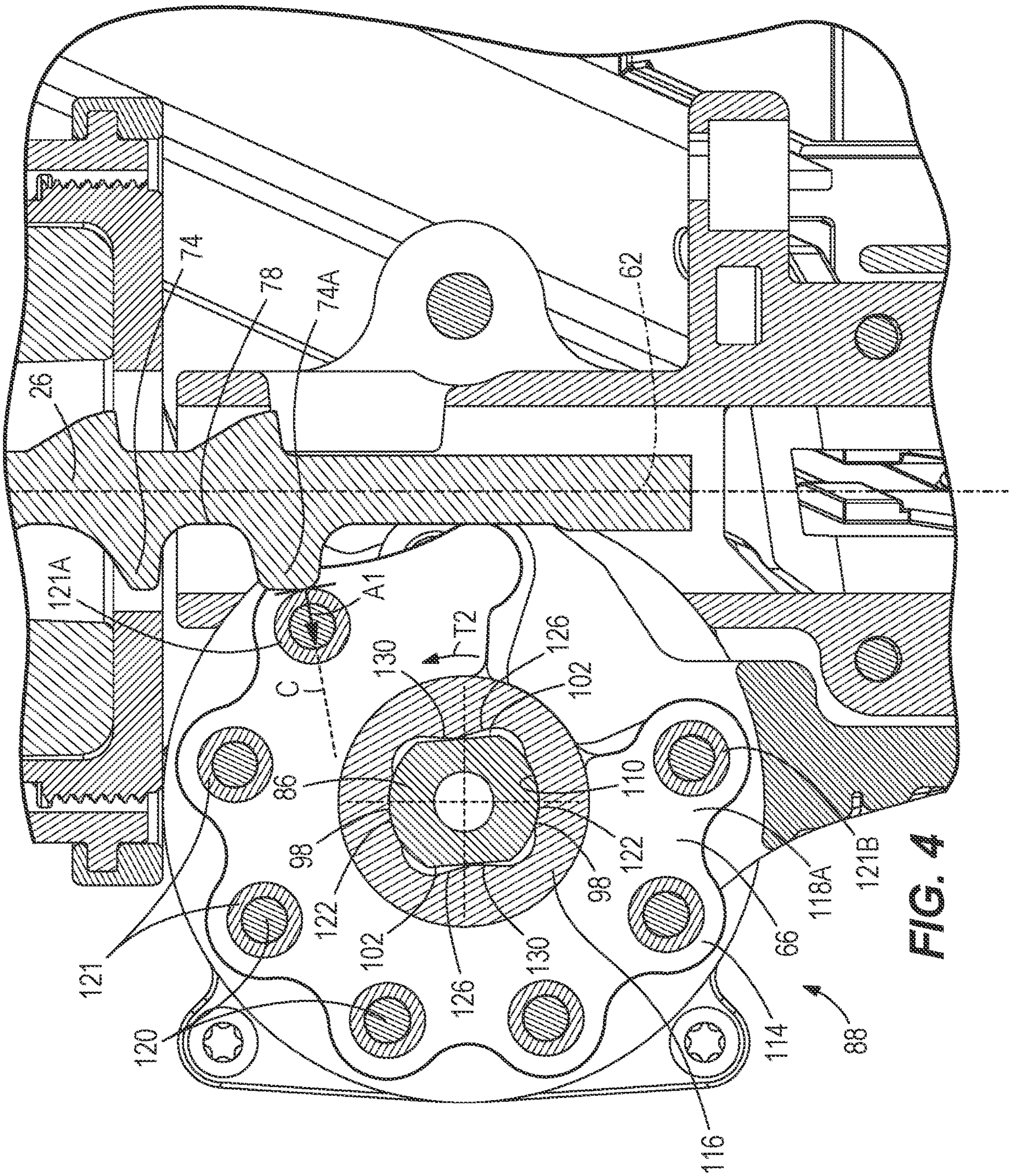
FIG. 4 is another front cross-sectional view of the lifter assembly of FIG. 2 illustrating the rotary lifter of FIG. 3 in an intermediate position.
Figure 5:
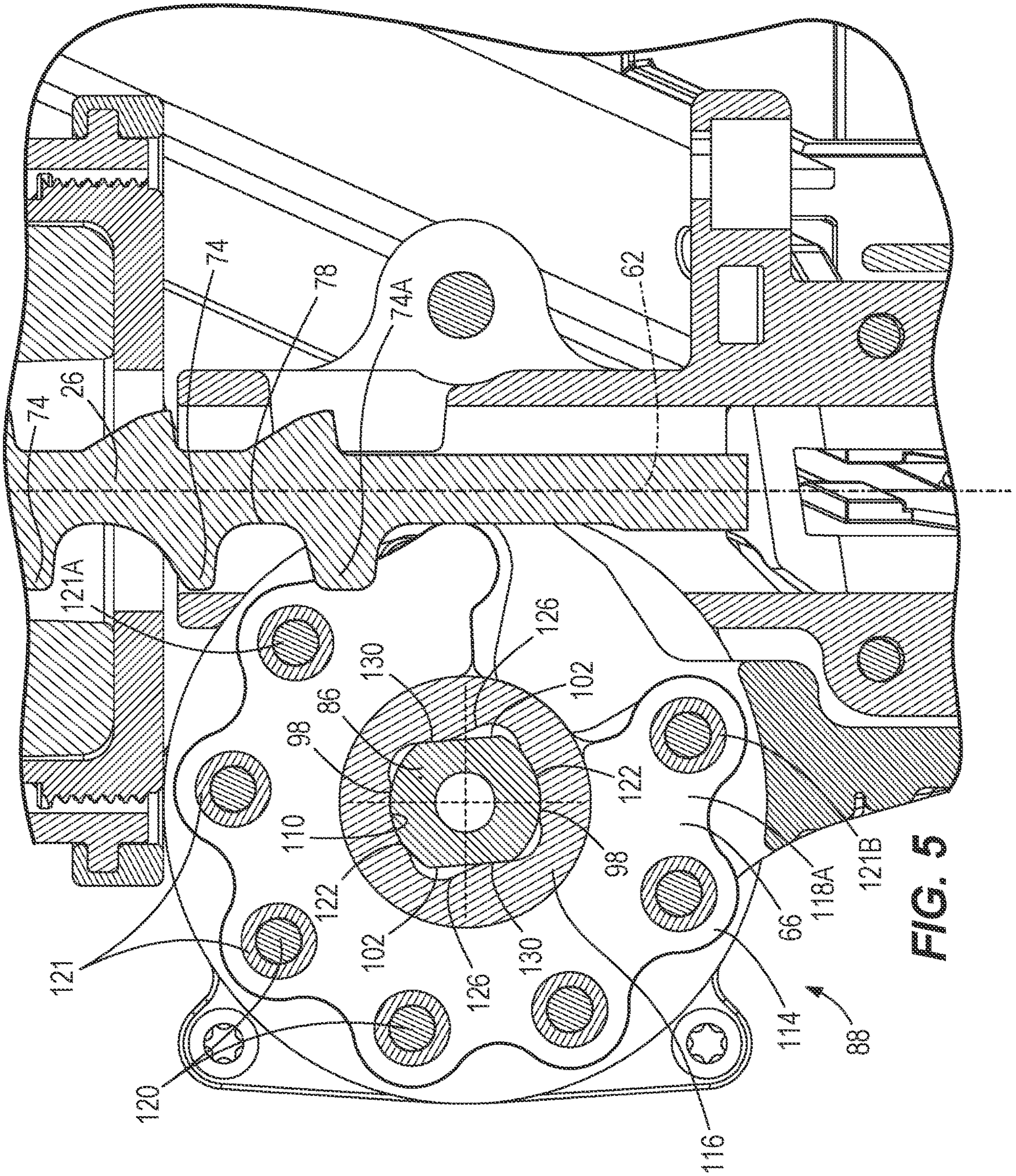
FIG. 5 is another front cross-sectional view of the lifter assembly of FIG. 2 illustrating the driver blade of FIG. 3 moving from the TDC position toward a BDC position, and the rotary lifter of FIG. 3 in a second rotational position.

With reference to FIGS. 3-5, the driver blade 26 defines a driving axis 62. Further, the driver blade 26 includes a plurality of lift teeth 74 formed along an edge 78 of the driver blade 26, which extends in the direction of the driving axis 62. In particular, the lift teeth 74 project laterally from the edge 78 relative to the driving axis 62. During a driving cycle, the driver blade 26 and piston are moveable along the driving axis 62 between a top-dead-center (TDC) position (FIG. 3) and a bottom-dead-center (BDC) or driven position. The fastener driver 10 further includes a rotary lifter 66 that receives torque from the drive unit 40, causing the lifter 66 to rotate and return the driver blade 26 from the BDC position toward the TDC position.

With reference to FIG. 2, the powered fastener driver 10 further includes a frame 70 positioned within the housing 30. The frame 70 is configured to support the lifter 66 within the housing 30.

Figure 7:
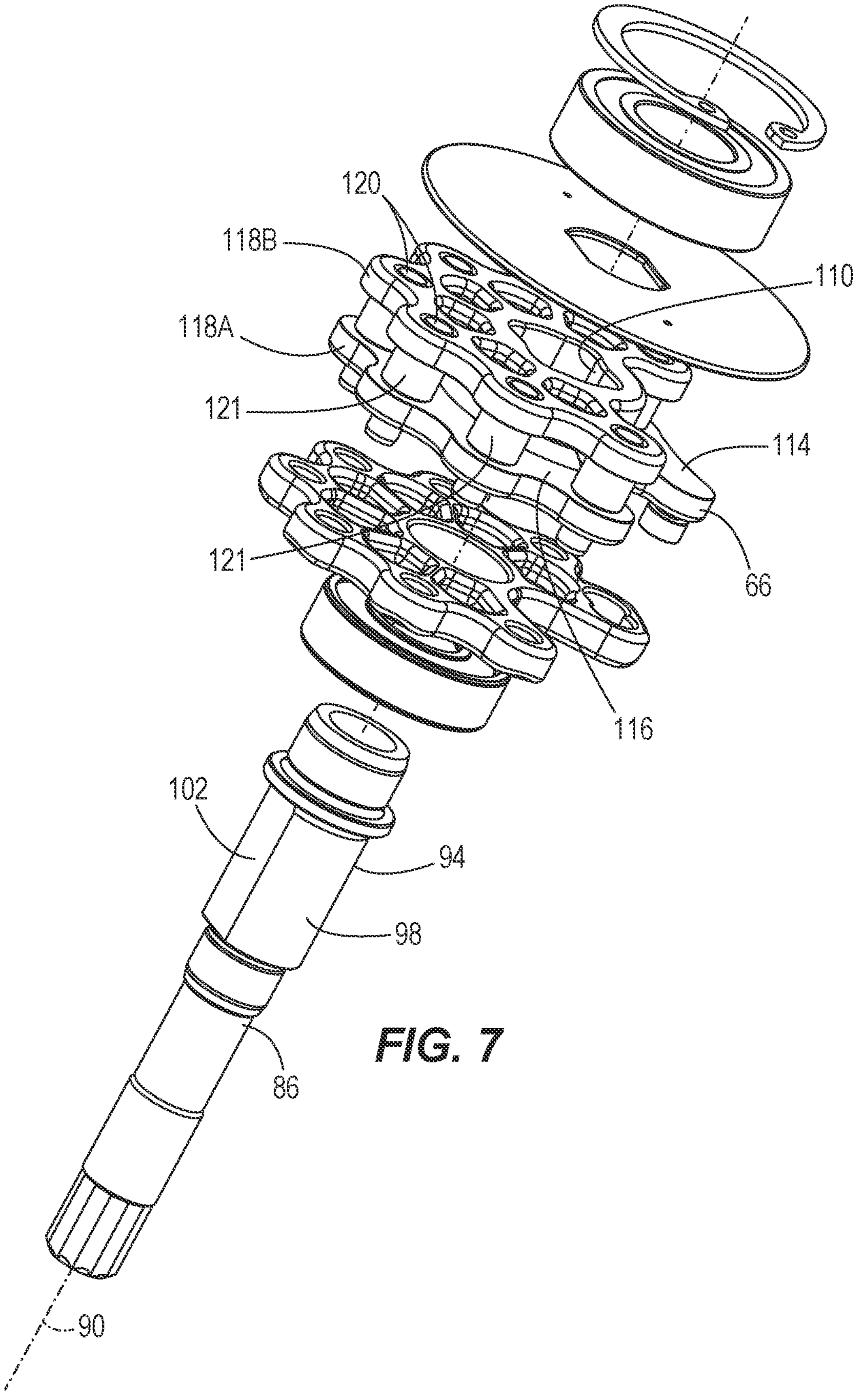
FIG. 7 is an exploded view of the lifter assembly of FIG. 2.

With continued reference to FIG. 2, the drive unit 40 includes an electric motor 42 and a transmission 82 positioned downstream of the motor 42. The transmission 82 includes an output shaft 86 (FIG. 7). In one embodiment, the output shaft 86 is meshed with a last stage of a gear train (e.g., multi-stage planetary gear train; not shown) of the transmission 82. Torque is transferred from the motor 42, through the transmission 82, to the output shaft 86. The lifter 66 and the drive unit 40 may be collectively referred to as a lifter assembly 88, as further discussed below.

With reference to FIG. 7, the output shaft 86 defines a rotational axis 90. In addition, the output shaft 86 includes an outer peripheral surface 94 having a cylindrical portion 98 and a flat portion 102 adjacent the cylindrical portion 98. Further, in the illustrated embodiment, the outer peripheral surface 94 includes two cylindrical portions 98 and two flat portions 102 (FIGS. 3-5). The cylindrical portions 98 are positioned opposite one another relative to the rotational axis. Likewise, the flat portions 102 are positioned opposite one another relative to the rotational axis 90. Each of the flat portions 102 is oriented parallel with the rotational axis 90. In the illustrated embodiment, the output shaft 86 defines a torque input member and the lifter 66 defines a torque output member.

With reference to FIGS. 2-7, the lifter 66 includes an aperture 110 through which the output shaft 86 is received. With particular reference to FIG. 7, the lifter 66 includes a body 114 having a hub 116 through which the aperture 110 extends, a first flange 118A radially extending from one end of the hub 116, and a second flange 118B radially extending from an opposite end of the hub 116 and spaced from the first flange 118A along the axis 90. Further, the lifter 66 includes a plurality of pins 120 extending between the flanges 118A, 118B and rollers 121 supported upon the pins 120. The rollers 121 sequentially engage the lift teeth 74 formed on the driver blade 26 as the driver blade 26 is returned from the BDC position toward the TDC position.

Figure 6:
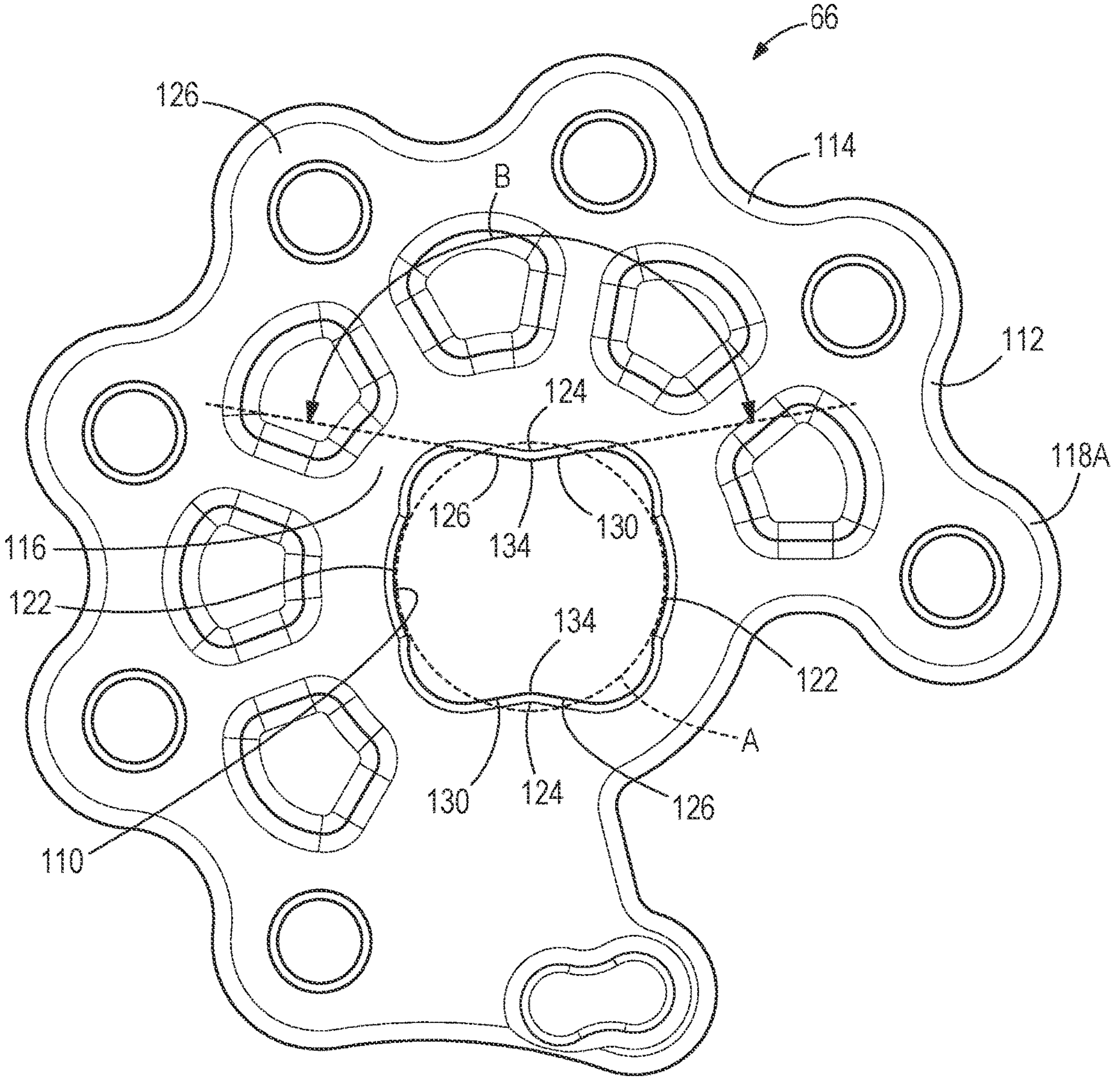
FIG. 6 is a plan view of a portion of the rotary lifter of FIG. 3.

As illustrated in FIG. 6, the aperture 110 is partly defined by two opposed curvilinear segments 122 and two opposed protrusions 124 that extend radially inward of a base circle A coinciding with the curvilinear segments 122. Each of the protrusions 124 includes flat segments 126, 130 and an apex 134 between the segments 126, 130. Thus, the aperture 110 is also partly defined by the protrusions 124, in addition to the curvilinear segments 122. As explained in further detail below, each curvilinear segment 122 is configured to engage with the respective cylindrical portion 98 of the output shaft 86, while each protrusion 124 is configured to engage with a corresponding flat portion 102 on the outer peripheral surface 94 of the output shaft 86.

With reference to FIGS. 6 and 7, the first and second flat segments 126, 130 of each protrusion 124 define an obtuse included angle B therebetween (FIG. 6). In other words, the first and second flat segments 126, 130 and the apex 134 therebetween form a "V-shape" defining the obtuse included angle B. In some embodiments, the obtuse included angle B is between about 100 degrees and about 170 degrees. More specifically, in some embodiments, the obtuse included angle B is between about 120 degrees and about 160 degrees. In the illustrated embodiment, the obtuse included angle B is about 140 degrees. Each of the first and second flat segments 126, 130 of each of the protrusions 124 is configured to alternately engage with the respective flat portion 102 of the output shaft 86 (FIG. 7). Accordingly, each flat segment 126, 130 may be considered a driven lug and each flat portion 102 may be considered a driving lug. A combination of the driven lugs 126, 130 and driving lugs 102 defines a kickout arrangement 136 located between the lifter 66 and the output shaft 86. As explained in greater detail below, the driven lugs 126, 130 are alternately engageable with the respective driving lugs 102 of the output shaft 86.

With reference to FIGS. 3-5, the lifter 66 is movable relative to the output shaft 86 between a first position (FIG. 3), in which the first flat segments or driven lugs 126 of the rotary lifter 66 are engaged with the respective flat portions or driving lugs 102 of the output shaft 86, and a second position (FIG. 5), in which the lifter 66 is rotated about the output shaft 86 (i.e., about the rotational axis 90) such that the second flat segments or driven lugs 130 are engaged with the respective flat portions or driving lugs 102. The lifter 66 is in the first position relative to the output shaft 86 when returning the driver blade 26 from the BDC position toward the TDC position. The lifter 66 rotates (in a counterclockwise direction from the frame of reference of FIG. 3) to the second position after the driver blade 26 reaches the TDC position. In other words, the aperture 110 is configured to selectively allow rotation of the lifter 66 relative to the output shaft 86 such that only the driving lugs 126 or only the driving lugs 130 engage the output shaft 86 at any given time.

More specifically, as illustrated in FIG. 3, as the driver blade 26 approaches the TDC position, a contact normal (i.e., arrow A1 in FIG. 3) perpendicular to a line tangent to both a last lifter roller 121A and the surface on a lowermost tooth 74A on the driver blade 26 with which the roller 121A is in contact is formed. A reaction force is applied to the rotary lifter 66 along the contact normal A1, which is oriented along a line of action C located below the rotational axis of the lifter 66, which is coaxial with the rotational axis 90 of the output shaft 86, from the frame of reference of FIG. 3. Thus, a reaction torque (arrow T1) is applied to the lifter 66 in a clockwise direction (from the frame of reference of FIG. 3), thereby maintaining the lifter 66 in the first position as the driver blade 26 is moved toward the TDC position. The line of action C of the contact normal A1 remains below the rotational axis of the lifter 66 until the lifter 66 reaches the TDC position. Thereafter, as shown in FIG. 4, the contact normal A1 between the lowermost tooth 74A and the last lifter roller 121A changes direction such that the line of action C is located above the rotational axis of the lifter 66. Thus, the reaction torque (arrow T2) exerted on the lifter 66 by the driver blade 26 is redirected in a counter-clockwise direction (from the frame of reference of FIG. 4), thereby causing the lifter 66 to rotate about the output shaft 86 from the first position shown in FIG. 3 to the second position shown in FIG. 5.

With reference to FIG. 5, the last lifter roller 121A has rotated past the lowermost tooth 74A such that there is no contact between the last lifter roller 121A and the driver blade 26, and the driver blade 26 is moved toward the BDC position by the force of the compressed gas. As such, there is no longer any reaction torque imparted on the lifter 66 by the driver blade 26 and the lifter 66 remains in the second position as the driver blade 26 is moved toward the BDC position.

During a driving cycle in which a fastener is discharged into a workpiece, the lifter 66 returns the piston and the driver blade 26 from the BDC position toward the TDC position. As the piston and the driver blade 26 are returned toward the TDC position, the gas within the cylinder 18 above the piston is compressed. A controller of the gas-spring powered fastener driver 10 controls the drive unit 40 such that the lifter 66 stops rotation when the driver blade 26 is at an intermediate position between the BDC position and the TDC position (i.e., the ready position). In one example, the ready position may be when the piston and the driver blade 26 are near the TDC position (e.g., 80 percent of the way up the cylinder 18) such that the compressed air is partially compressed. The driver blade 26 (and the piston) is held in the ready position until released by user activation of the trigger 58 (FIG. 1), which initiates a driving cycle. The lifter 66 continues rotation until the driver blade 26 is moved to the TDC position and the last lifter roller 121A of the lifter 66 rotates past the lowermost tooth 74A of the driver blade 26 to release the driver blade 26. When released, the compressed gas above the piston within the cylinder 18 drives the piston and the driver blade 26 to the BDC position, thereby driving a fastener into a workpiece. The illustrated fastener driver 10 therefore operates on a gas spring principle utilizing the lifter 66 and the piston to compress the gas within the cylinder 18 upon being returned to the ready position for a subsequent fastener driving cycle. In other embodiments, the driver blade 26 may be held at the TDC position before a subsequent fastener driving cycle.

When the piston and the driver blade 26 are at the ready position, the rotary lifter 66 is in the first position (FIG. 3) relative to the output shaft 86. In particular, at this time, the reaction torque T1 exerted on the lifter 66 by the drive blade 26 is oriented in a clockwise direction (from the frame of reference of FIG. 3), maintaining the lifter 66 in the first position relative to the output shaft 86. When the trigger 58 is actuated, the drive unit 40 is energized and the lifter 66 receives torque such that the lifter 66 engages with the driver blade 26 to move the driver blade to the TDC position. When the driver blade 26 reaches the TDC position, the orientation of the reaction torque exerted on the lifter 66 by the driver blade 26 is reversed (i.e., by the change in direction of the contact normal between the lowermost tooth 74A and the last lifter roller 121A to above the rotational axis of the lifter 66) such that the reaction torque T2 is oriented in a counter-clockwise direction (from the frame of reference of FIG. 4), thereby rotating the lifter 66 from the first position toward the second position. Thereafter, the lifter 66 no longer engages the driver blade 26, and the piston and the driver blade 26 are thrust downward toward the BDC position by the compressed air in the cylinder 18 above the piston. As the driver blade 26 is displaced toward the BDC position, the lifter 66 remains in the second position. Therefore, due to the kickout arrangement 136, the lifter 66 may "kick out" or move relatively quickly out of the way of the driver blade 26 after the driver blade 26 reaches the TDC position.

Upon a fastener being driven into a workpiece, the driver blade 26 is in the driven or BDC position. After the driver blade 26 reaches the BDC position, an uppermost tooth 74 (not shown; tooth closest to the piston) of the driver blade 26 is engaged by a first lifter roller 121B of the lifter 66, thereby causing the lifter 66 to momentarily stop rotation while the output shaft 86 continues to rotate. As such, the rotation of the output shaft 86 relative to the lifter 66 adjusts the lifter 66 back into the first position (FIG. 3). Thereafter, the continued driving of the drive unit 40 rotates the lifter 66, which returns the driver blade 26 and the piston toward the ready position. The controller deactivates the drive unit 40 when the driver blade 26 is in the ready position to complete the driving cycle. Therefore, the kickout arrangement 136 is configured to permit limited rotation of the lifter 66 relative to the output shaft 86 between the first position and the second position. In some embodiments, one complete rotation of the lifter 66 is necessary to return the driver blade 26 from the BDC position to the ready position.

In particular, when the lifter 66 is moving the driver blade 26 toward the TDC position, forces (from the gas being compressed in the cylinder 18) act on the drive teeth 74. The forces are at a maximum on the lowermost tooth 74A as the driver blade 26 approaches the TDC position such that the lowermost tooth 74A may experience a high amount of wear by sliding contact with the last lifter roller 121A as the last lifter roller 121A rotates past the lowermost tooth 74A to initiate a fastener driving operation. As the driver blade 26 reaches the TDC position, the kickout arrangement 136 permits the lifter 66 to rotate relative to the output shaft 86 from the first position to the second position, thereby allowing the lifter 66 (i.e., the last lifter roller 121A) to be moved quickly out of the way of the drive blade 26 to release the driver blade 26 and initiate a fastener driving operation, thereby reducing wear on the lifter 66 and damage that might otherwise be caused to the drive unit 40 by a momentary reaction torque applied to the drive unit 40 as the driver blade 26 reaches the TDC position.

FIGS. 8-23 illustrate a second embodiment of a kickout arrangement 336 of a lifter assembly 288, with like components and features as the embodiment of the lifter assembly 88 of the fastener driver 10 shown in FIGS. 1-7 being labeled with like reference numerals plus "200". The lifter assembly 288 is utilized for a fastener driver similar to the fastener driver 10 of FIGS. 1-7 and, accordingly, the discussion of the fastener driver 10 above similarly applies to the kickout arrangement 336 of the lifter assembly 288 and is not re-stated. Rather, only differences between the kickout arrangement 136 and of the driver blade 26 of FIGS. 1-7 and the kickout arrangement 336 and the driver blade 226 of FIGS. 8-23 are specifically noted herein, such as differences in a last one of the lifter pins and the shape of the lowermost tooth of the driver blade.

Figure 12:
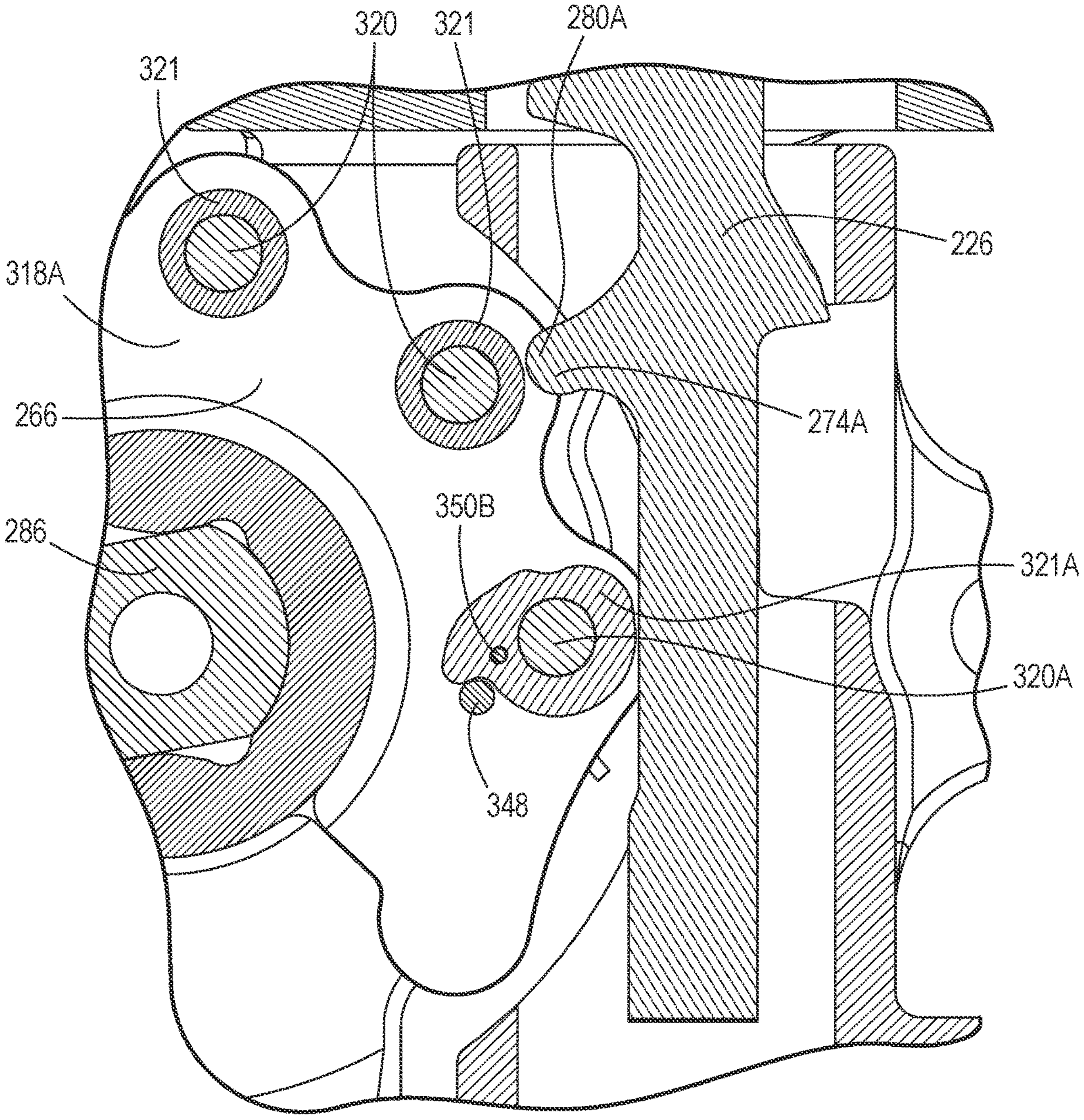
FIG. 12 is a front cross-sectional view of the lifter assembly of FIG. 8 illustrating a driver blade of the powered fastener driver approaching a TDC position, and the lifter roller of FIG. 8 in a first position.
Figure 13:
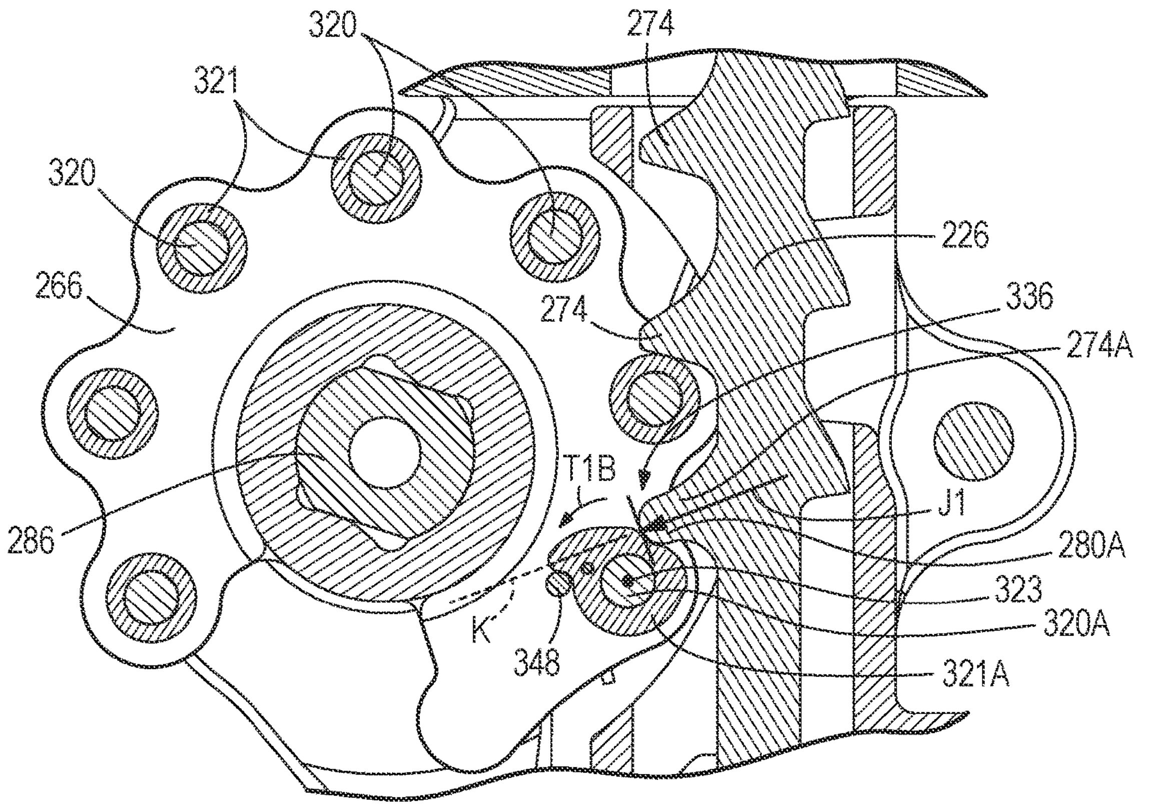
FIG. 13 is another front cross-sectional view of the lifter assembly of FIG. 8 illustrating the driver blade reaching the TDC position such that a lowermost tooth of the driver blade engages the lifter roller of FIG. 8.

With reference to FIGS. 12 and 13, the driver blade 226 includes a plurality of lift teeth 274 formed along an edge 278 of the driver blade 226. Each one of the lift teeth 274 includes an end portion 280. Each of the end portions 280, except for the end portion 280A of a lowermost tooth 274A of the driver blade 226, has the same shape. In particular, the end portion 280A of the lowermost tooth 274A has a rounded shape, as further discussed below.

The lifter assembly 288 includes a drive unit (e.g., drive unit 40 of FIG. 2) having an output shaft 286, and a lifter 266 coupled for co-rotation with the output shaft 286. The output shaft 286 defines a rotational axis 290. The lifter 266 includes a plurality of pins 320 extending between flanges 318A, 318B of a body 314 of the lifter 266, and rollers 321 supported upon the pins 320. Each roller 321 is rotatably supported on the respective pin 320. Further, the rollers 321 sequentially engage the lift teeth 274 (i.e., the end portions 280) formed on the driver blade 226 as the driver blade 226 is returned from the BDC position toward the TDC position.

Figure 8:
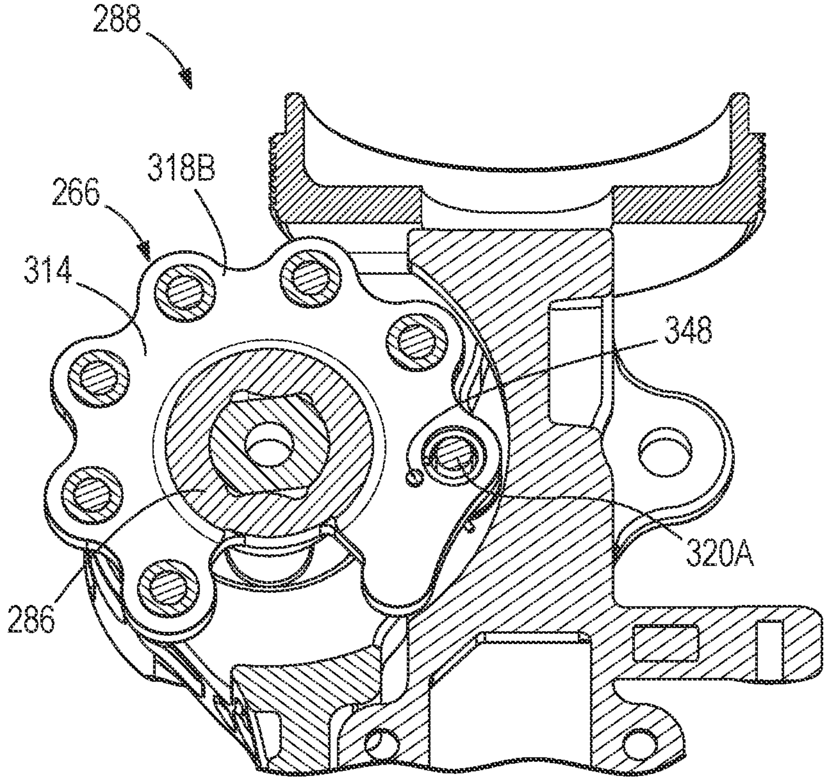
FIG. 8 is a front cross-sectional view of a lifter assembly in accordance with a second embodiment of the invention.
Figure 9:
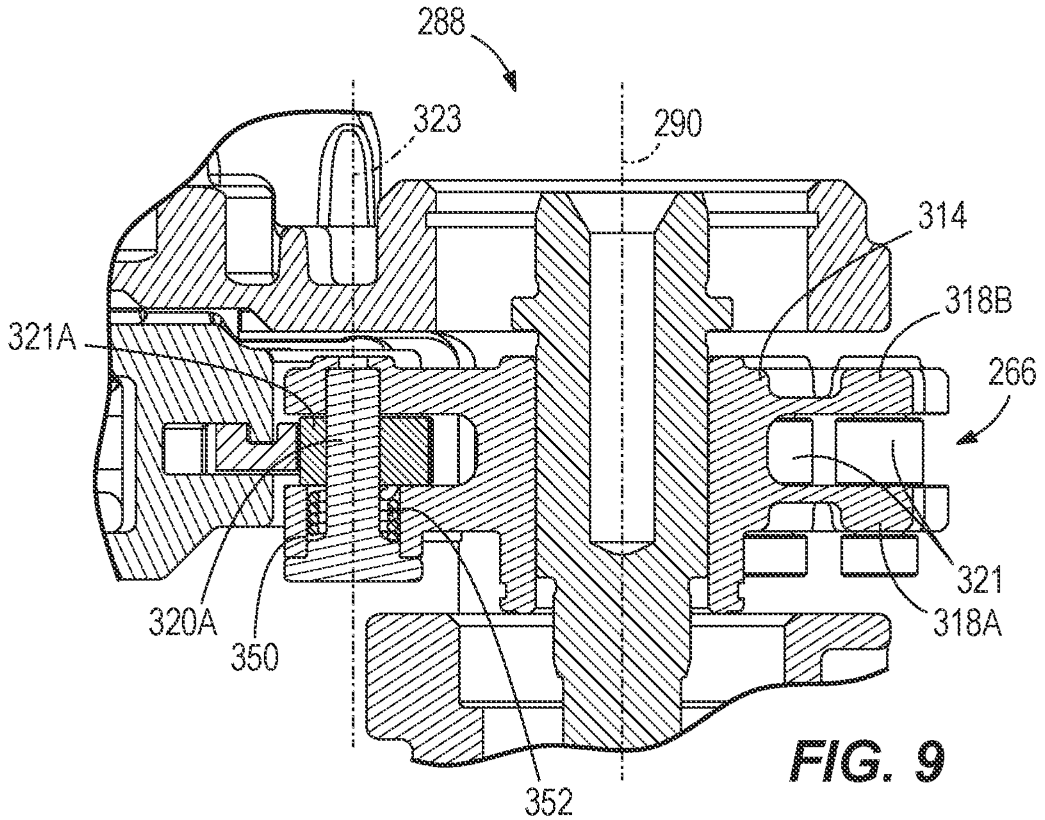
FIG. 9 is side cross-sectional view of the lifter assembly of FIG. 8.
Figure 11:
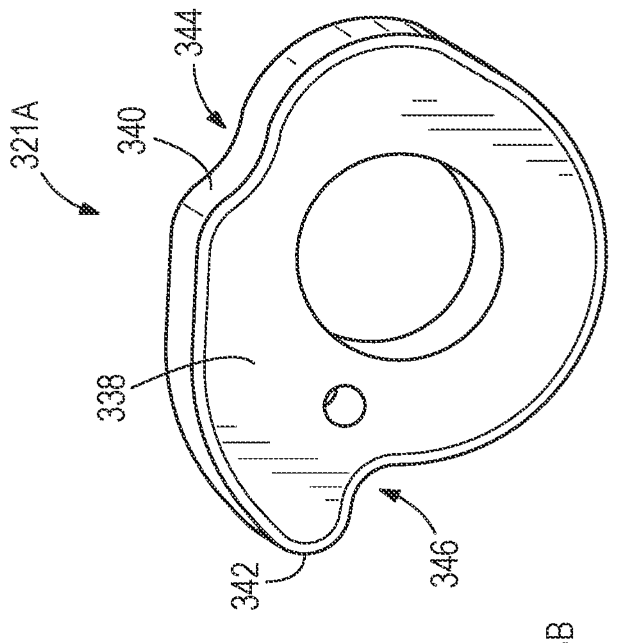
FIG. 11 is a perspective view of a lifter roller of the lifter assembly of FIG. 8 in accordance with a first configuration and illustrating a camming portion.
Figure 10:
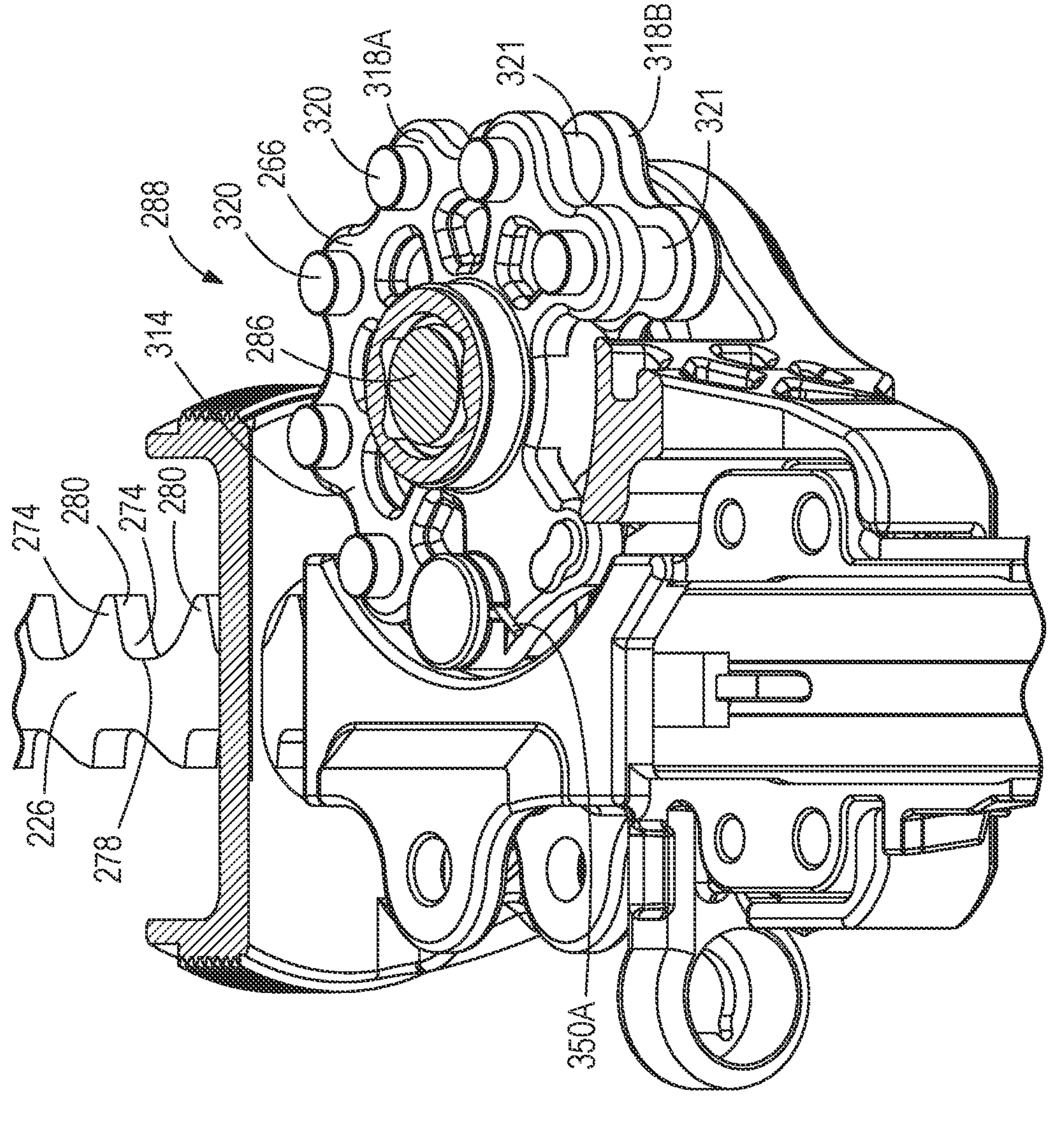
FIG. 10 is a rear cross-sectional view of the lifter assembly of FIG. 8.

With reference to FIGS. 8, 9, and 12, a last lifter pin 320A of the plurality of pins 320 includes a cam roller 321A having a camming portion 338. In particular, the cam roller 321A has an outer circumference, and the camming portion 338 has a first end 340 and a second end 342 (FIG. 11). The camming portion 338 extends from the first end 340 radially outward relative to the outer circumference to the second end 342. The cam roller 321A further includes a first engagement section 344 proximate the first end 340, and a second engagement section 346 proximate the second end 342. Each of the first engagement section 344 and the second engagement section 346 is defined by a concave shape proximate the first and second ends 340, 342, respectively. The first engagement section 344 is configured to slidably engage the end portion 280A of the lowermost tooth 274A during rotation of the lifter 266. In particular, the rounded shape of the end portion 280A of the lowermost tooth 274A cooperates with the concave shape of the first engagement section 344.

The lifter 266 includes a protrusion 348 (FIG. 12) located proximate the cam roller 321A. The protrusion 348 extends between an inner surface of each flange 318A, 318B. The second engagement section 346 of the camming portion 338 is configured to selectively engage the protrusion 348 such that the protrusion 348 inhibits rotation of the cam roller 321A about the last lifter pin 320A in a first rotational direction (e.g., in a counter-clockwise direction from the frame of reference of FIG. 12).

The lifter 266 further includes a torsion spring 350 (FIG. 9). In the illustrated embodiment, the torsion spring 350 is positioned in a cavity 352 define by the flange 318A of the lifter 266. One end 350A of the torsion spring 350 is fixed to the lifter 266 (i.e., the flange 318A, FIG. 10), and an opposite, second end 350B is attached to the cam roller 321A. The torsion spring 350 is configured to apply a biasing force to the cam roller 321A in the first rotational direction to bias the camming portion 338 (i.e., the second engagement section 346 at the second end 342) into engagement with the protrusion 348. A combination of the camming portion 338 and the lowermost tooth 274A of the driver blade 226 defines a kickout arrangement 336 located between the lifter 266 and the driver blade 226. As explained in greater detail below, the cam roller 321A is selectively rotatably about the last lifter pin 320A in the first rotational direction and a second, opposite rotational direction.

With reference to FIGS. 13-18, the cam roller 321A is rotatable relative to the last lifter pin 320A between a first position (FIG. 13), in which the second engagement section 346 of the cam roller 321A is in engagement with the protrusion 348, and a second position (FIG. 15), in which the cam roller 321A is rotated about the pin 320A in the second rotational direction (e.g., clockwise from the frame of reference of FIG. 15) to create a circumferential gap between the second engagement section 346 and the protrusion 348. The cam roller 321A is in the first position relative to the protrusion 348 when returning the driver blade 226 from the BDC position toward the TDC position.

As illustrated in FIGS. 9 and 12, the last lifter pin 320A defines a pin axis 323 extending parallel to the rotational axis 290. The cam roller 321A is configured to rotate in the first rotational direction (e.g., counter-clockwise from the frame of reference of FIG. 12) by the bias of the torsion spring 350 about the pin axis 323 toward the first position. The cam roller 321A is inhibited from continued rotation about the pin 320A by the protrusion 348. As such, the biasing force of the torsion spring 350 and the protrusion 348 maintain the cam roller 321A in the first position. Further, when the cam roller 321A is in the first position, it is configured to rotate with the lifter 266 as the driver blade 226 is returned from the BDC position toward the TDC position.

Figure 14:
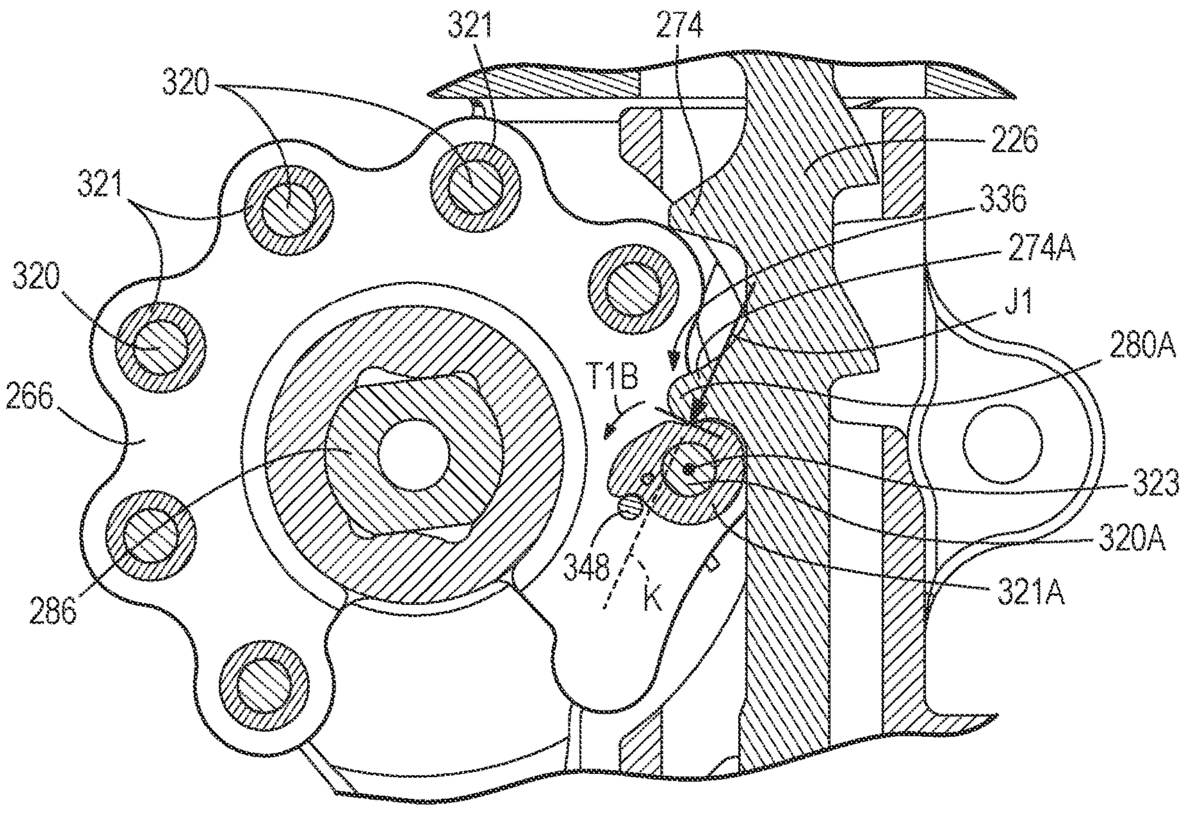
FIG. 14 is yet another front cross-sectional view of the lifter assembly of FIG. 8 illustrating continued rotation of the lifter and the continued engagement of the lowermost tooth of the driver blade with the lifter roller.
Figure 15:
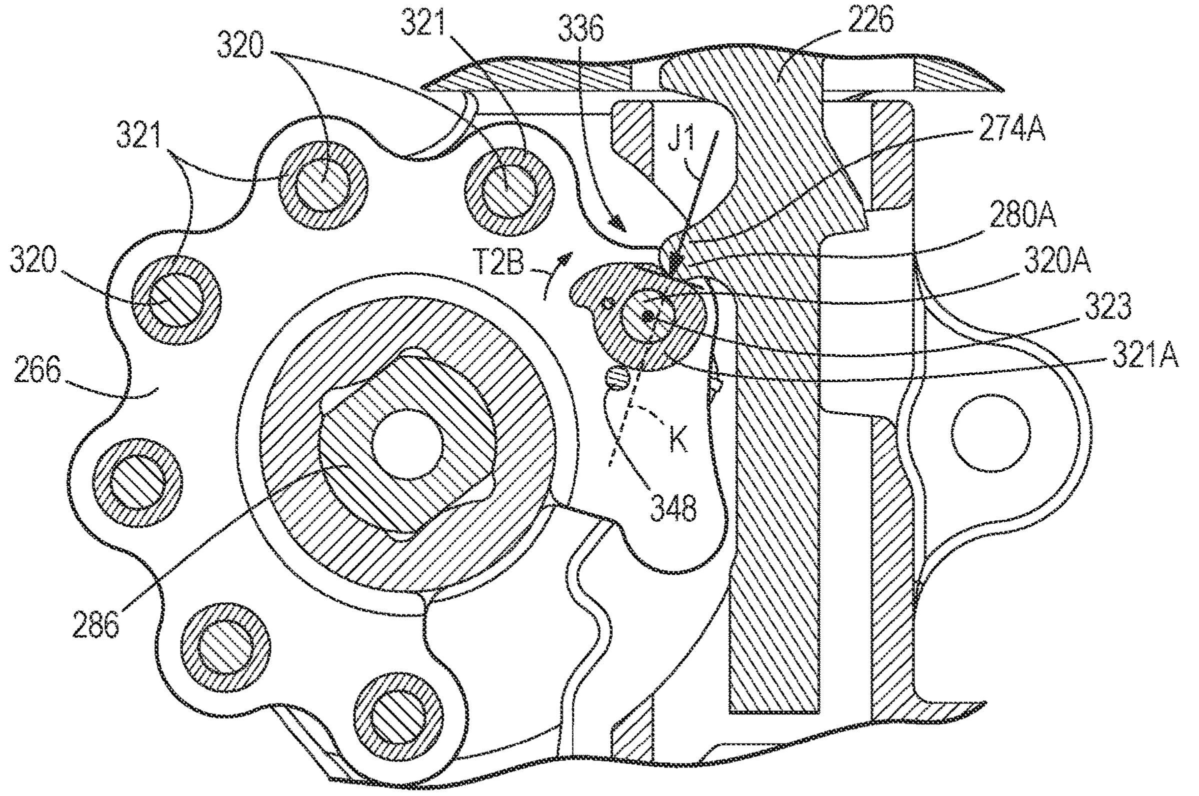
FIG. 15 is yet still another front cross-sectional view of the lifter assembly of FIG. 8 illustrating the lifter roller adjusted from the first position of FIG. 12 to a second position.
Figure 16:
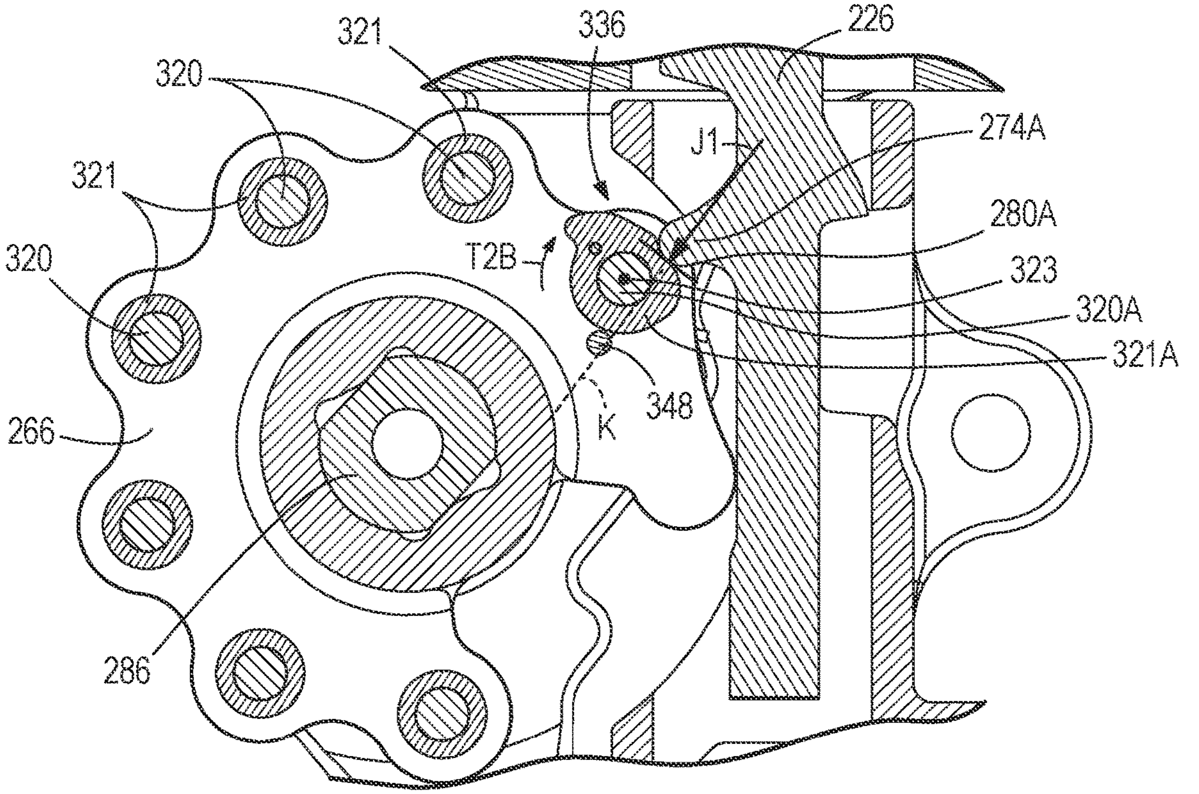
FIG. 16 is another front cross-sectional view of the lifter assembly of FIG. 8 illustrating continued rotation of the lifter and the continued engagement of the lowermost tooth of the driver blade with the lifter roller such that the lifter roller is maintained in the second position.
Figure 17:
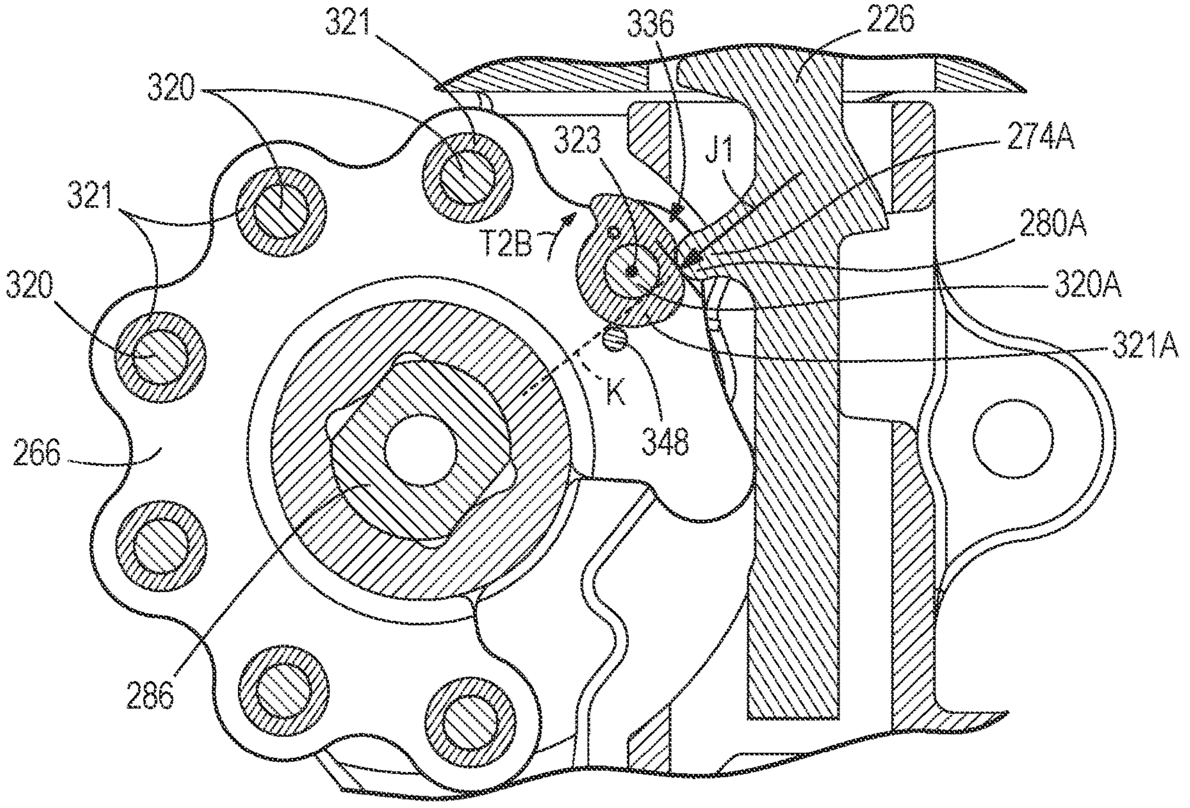
FIG. 17 is yet another front cross-sectional view of the lifter assembly of FIG. 8 illustrating continued rotation of the lifter and the continued engagement of the lowermost tooth of the driver blade with the lifter roller such that the lifter roller is maintained in the second position.

As shown in FIGS. 13-17, as the driver blade 226 approaches the TDC position, a contact normal (i.e., arrow J1 in FIGS. 13-14) perpendicular to a line tangent to both the cam roller 321A (i.e., the first engagement section 344) and the rounded end portion 280A on the lowermost tooth 274A on the driver blade 226 with which the cam roller 321A is in contact is formed. A reaction force is applied to the cam roller 321A along the contact normal J1, which is oriented along a line of action K located above the pin axis 323 of the last lifter pin 320A, from the frame of reference of FIG. 13. Thus, a reaction torque (arrow T1B) is applied to the cam roller 321A in a counter-clockwise direction (from the frame of reference of FIG. 13), thereby maintaining the cam roller 321A in the first position (along with the biasing force of the torsion spring 350) as the driver blade 226 is moved toward the TDC position. The line of action K of the contact normal J1 remains above the pin axis 323 until the lifter 266 reaches the TDC position. Thereafter, as shown in FIG. 15, the contact normal J1 between the rounded end portion 280A of the lowermost tooth 274A and the cam roller 321A changes direction such that the line of action K is located below the pin axis 323 of the last lifter pin 320A. Thus, the reaction torque (arrow T2B) exerted on the cam roller 321A by the driver blade 226 is redirected in a clockwise direction (from the frame of reference of FIG. 15), thereby overcoming the biasing force of the torsion spring 350 and causing the cam roller 321A to rotate about the pin axis 323 from the first position shown in FIGS. 13-14 toward the second position shown in FIG. 15.

Figure 18:
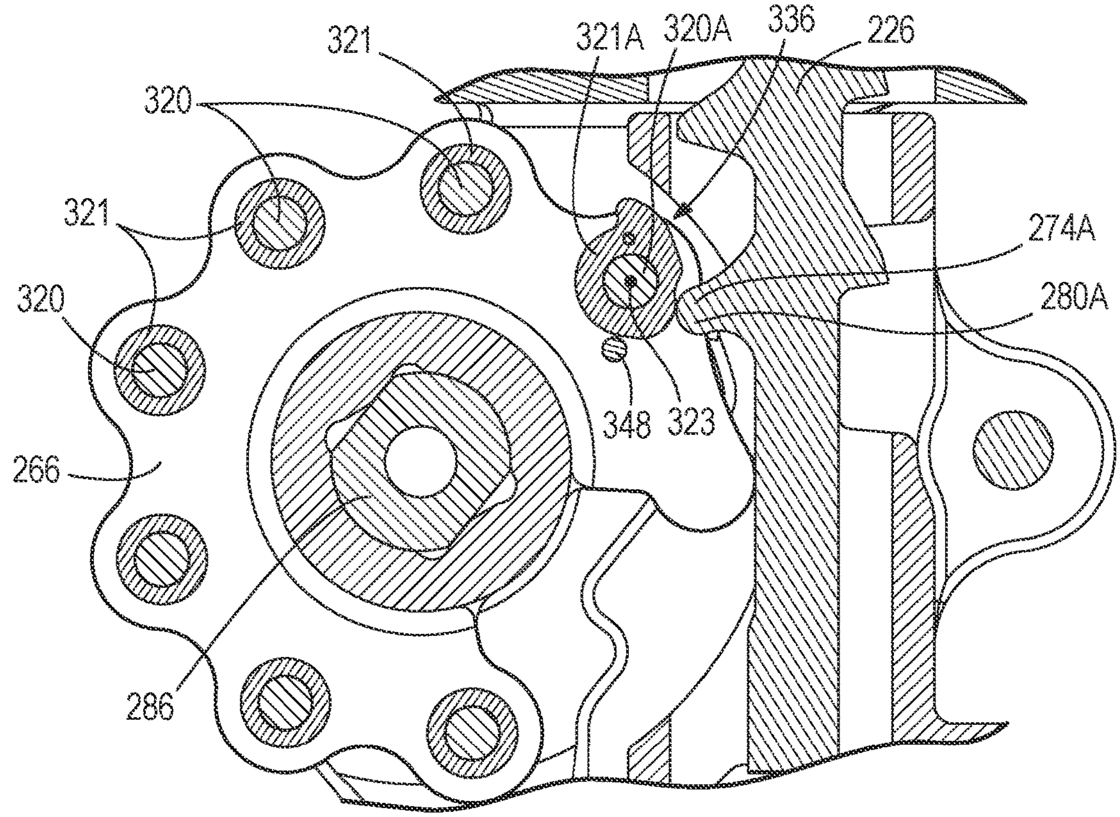
FIG. 18 is yet still another front cross-sectional view of the lifter assembly of FIG. 8 illustrating the driver being fired from the TDC position to a BDC position, and the lifter roller of FIG. 8 in the second position.

As shown in FIG. 18, the cam roller 321A has rotated past the lowermost tooth 274A such that there is no contact between the cam roller 321A and the driver blade 226, and the driver blade 226 is moved toward the BDC position by the force of the compressed gas. As such, there is no longer any reaction torque imparted on the cam roller 321A by the driver blade 226 and the cam roller 321A is biased by the torsion spring 350 toward the first position as the driver blade 226 is moved toward the BDC position, and then from the BDC position toward the TDC position again.

Figure 19:
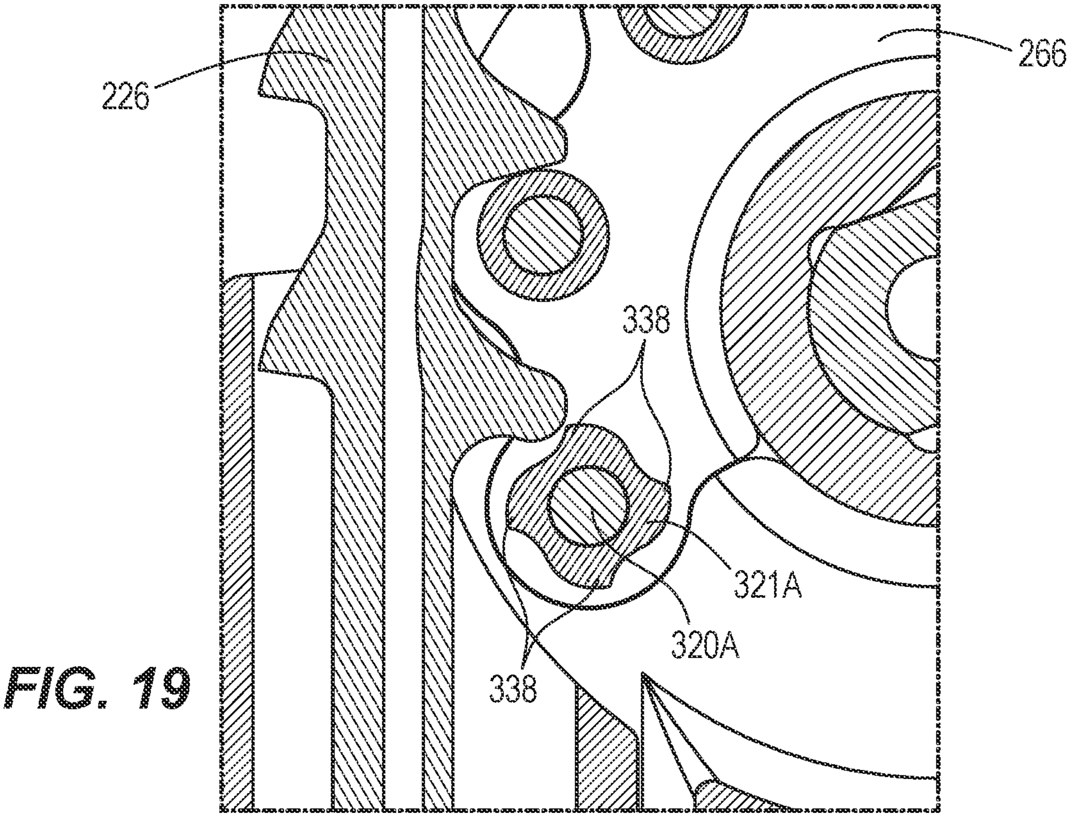
FIG. 19 is a front cross-sectional view of the lifter assembly of FIG. 8 illustrating a lifter roller in accordance with a second construction.
Figure 20:
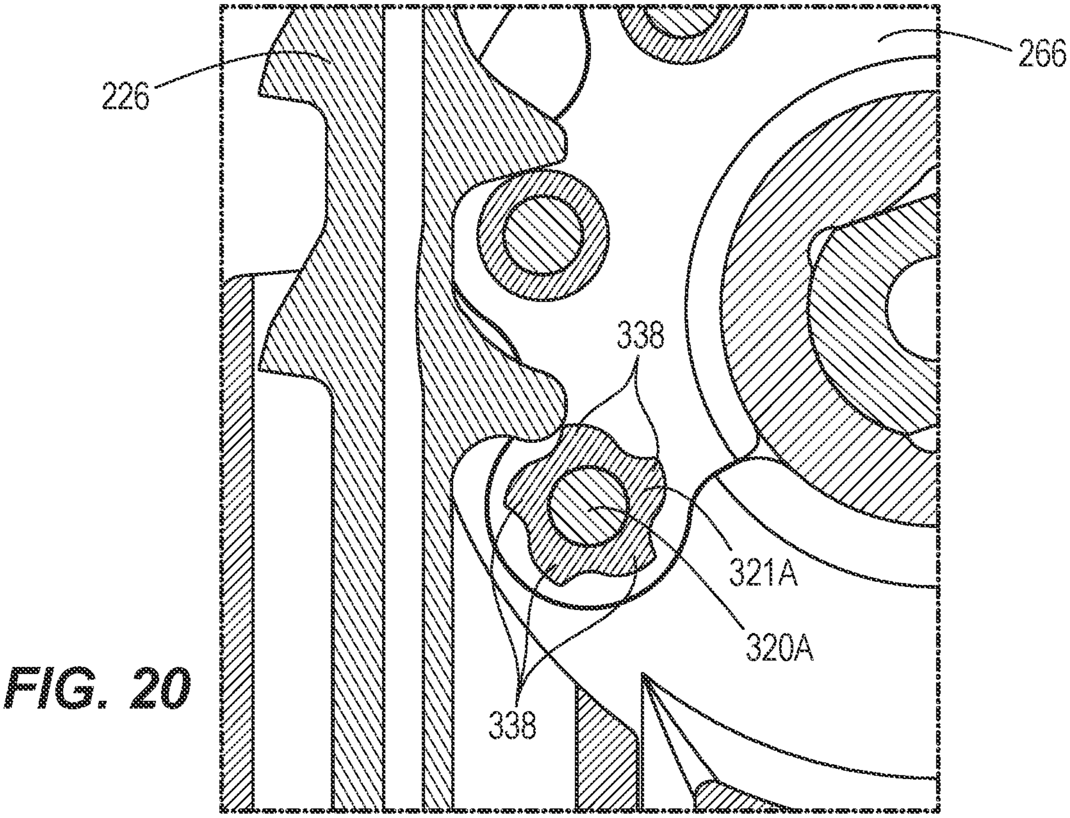
FIG. 20 is a front cross-sectional view of the lifter assembly of FIG. 8 illustrating a lifter roller in accordance with a third construction.
Figure 21:
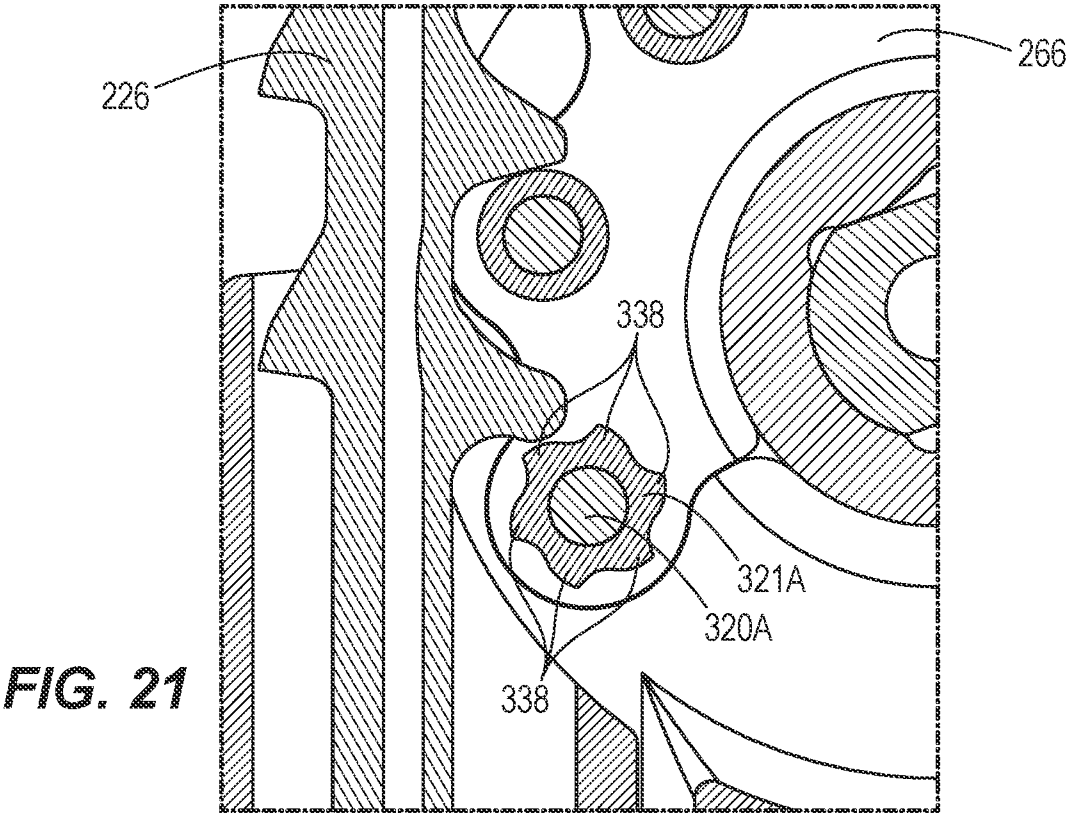
FIG. 21 is a front cross-sectional view of the lifter assembly of FIG. 8 illustrating a lifter roller in accordance with a fourth construction.
Figure 22:
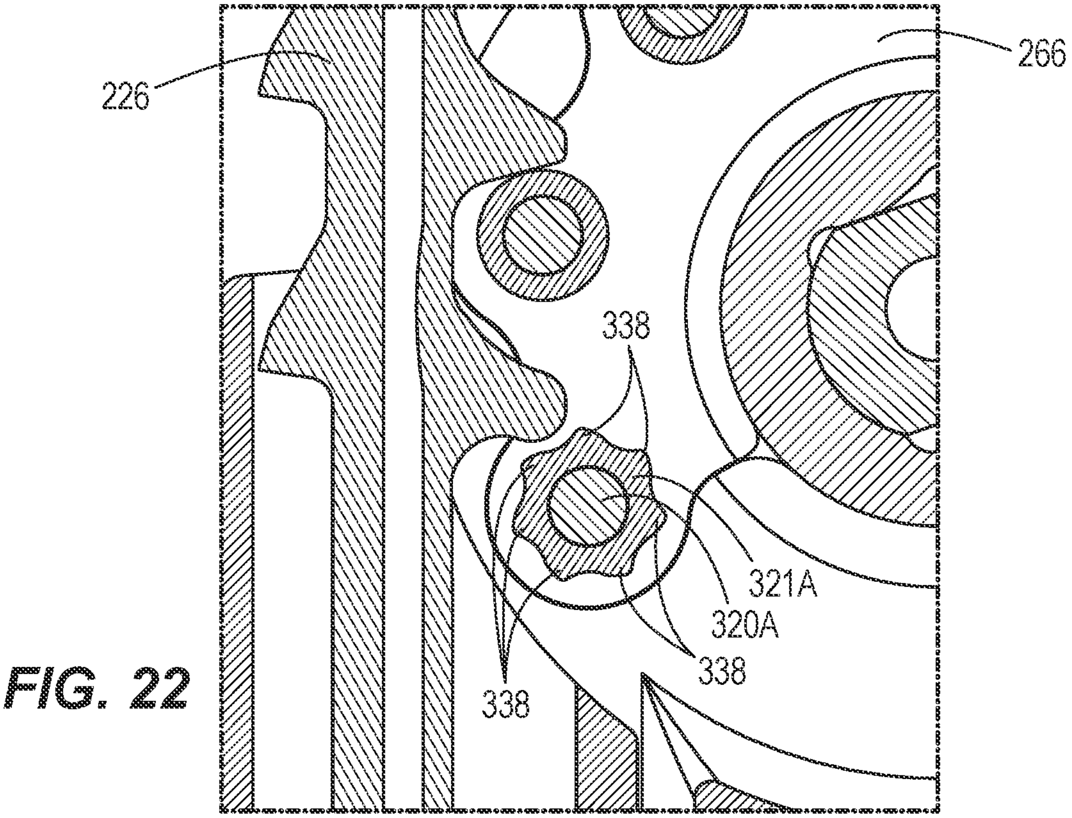
FIG. 22 is a front cross-sectional view of the lifter assembly of FIG. 8 illustrating a lifter roller in accordance with a fifth construction.
Figure 23:
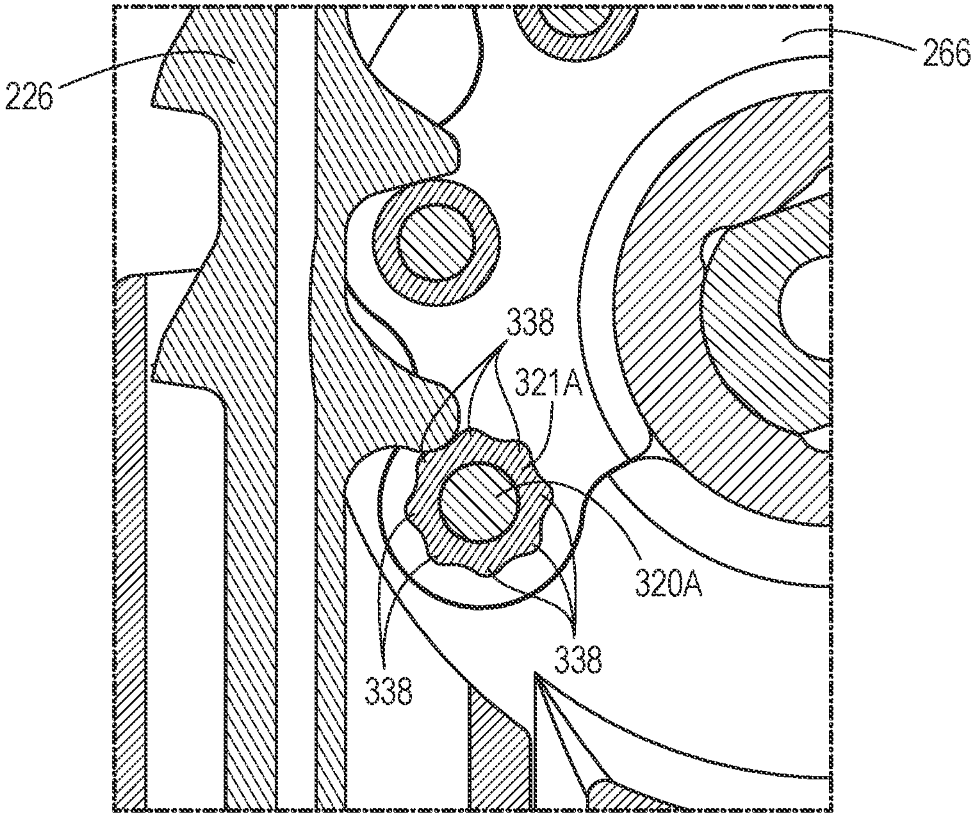
FIG. 23 is a front cross-sectional view of the lifter assembly of FIG. 8 illustrating a lifter roller in accordance with a sixth construction.

With reference to FIGS. 19-23, in alternative embodiments, the cam roller 321A may include one or more camming portions 338. For example, as shown in FIG. 19, the cam roller 321A includes four camming portions 338. In another example, as shown in FIG. 20, the cam roller 321A includes five camming portions 338. In yet another example, as shown in FIG. 21, the cam roller 321A includes six camming portions 338. In yet still another example, as shown in FIG. 22, the cam roller 321A includes seven camming portions 338. In another example, as shown in FIG. 23, the cam roller 321A includes eight camming portions 338.

During a driving cycle in which a fastener is discharged into a workpiece, the lifter 266 returns the piston and the driver blade 226 from the BDC position toward the TDC position (FIGS. 12-14). In particular, the cam roller 321A is in the first position when returning the driver blade 226 from the BDC position toward the TDC position such that the cam roller 321A rotates with the rotation of the lifter 266. As the driver blade 226 approaches the TDC position, the lowermost tooth 274A engages the cam roller 31A, and the reaction torque T1B exerted on cam roller 321A by the drive blade 226 is oriented in a counter-clockwise direction (from the frame of reference of FIG. 13).

When the driver blade 226 reaches the TDC position, the orientation of the reaction torque exerted on the cam roller 321A by the driver blade 226 is reversed (i.e., by the change in direction of the contact normal J1 between the lowermost tooth 274A and the cam roller 321A to below the pin axis 323 of the last lifter pin 320A) such that the reaction torque T2B is oriented in clockwise direction (from the frame of reference of FIG. 15), thereby overcoming the biasing force of the torsion spring 350 and rotating the cam roller 321A from the first position toward the second position. Thereafter, the cam roller 321A no longer engages the driver blade 226, and the piston and the driver blade 226 are thrust downward toward the BDC position by the compressed air (e.g., in the cylinder 18 above the piston, FIG. 2). As the driver blade 226 is displaced toward the BDC position and the cam roller 321A is released from the driver blade 226, the torsion spring 350 rotates the cam roller 321A in the first rotational direction (e.g., counter-clockwise from the frame of reference of FIGS. 15-18), thereby adjusting the cam roller 321A into the first position again. Therefore, due to the kickout arrangement 336, the cam roller 321A may "kick out" or move relatively quickly out of the way of the lowermost tooth 274A of the driver blade 226 after the driver blade 226 reaches the TDC position.

Upon a fastener being driven into a workpiece, the driver blade 226 is in the driven or BDC position. Additionally, the torsion spring 350 has already rotated the cam roller 321A from the second position toward the first position. Thereafter, the continued driving of the drive unit (e.g., drive unit 40, FIG. 2) rotates the lifter 266 for returning the driver blade 226 toward the TDC position. Similar to FIGS. 1-7 of the first embodiment, a controller may deactivate the drive unit when the driver blade 226 is in the ready position. The driver blade 226 (and the piston) is held in the ready position until released by user activation of a trigger (trigger 58, FIG. 1), which initiates another driving cycle.

In particular, when the lifter 266 is moving the driver blade 226 toward the TDC position, forces (from the gas being compressed in the cylinder 18) act on the drive teeth 274. The forces are at a maximum on the lowermost tooth 274A as the driver blade 226 approaches the TDC position such that the lowermost tooth 274A may experience a high amount of wear by sliding contact with the cam roller 321A as the cam roller 321A rotates past the lowermost tooth 274A. The kickout arrangement 336 is configured to permit limited rotation of the cam roller 321A relative to the lifter pin 320A between the first position and the second position such that the cam roller 321A is moved quickly out of the way of the drive blade 226 to release the driver blade 226 and initiate a fastener driving operation, thereby reducing wear on the lifter 266 (i.e., the cam roller 321A) and damage that might otherwise be caused to the drive unit by a momentary reaction torque applied to the drive unit as the driver blade 226 reaches the TDC position.

FIGS. 24-28 illustrate a third embodiment of a kickout arrangement 536 of a lifter assembly 488, with like components and features as the embodiment of the lifter assembly 88 of the fastener driver 10 shown in FIGS. 1-7 being labeled with like reference numerals plus "400". The lifter assembly 488 is utilized for a fastener driver similar to the fastener driver 10 of FIGS. 1-7 and, accordingly, the discussion of the fastener driver 10 above similarly applies to the kickout arrangement 536 of the lifter assembly 488 and is not re-stated. Rather, only differences between the kickout arrangement 136 of FIGS. 1-7 and the kickout arrangement 536 of FIGS. 24-28 are specifically noted herein, such as differences in a configuration of the lifter and the output shaft.

Figure 24:
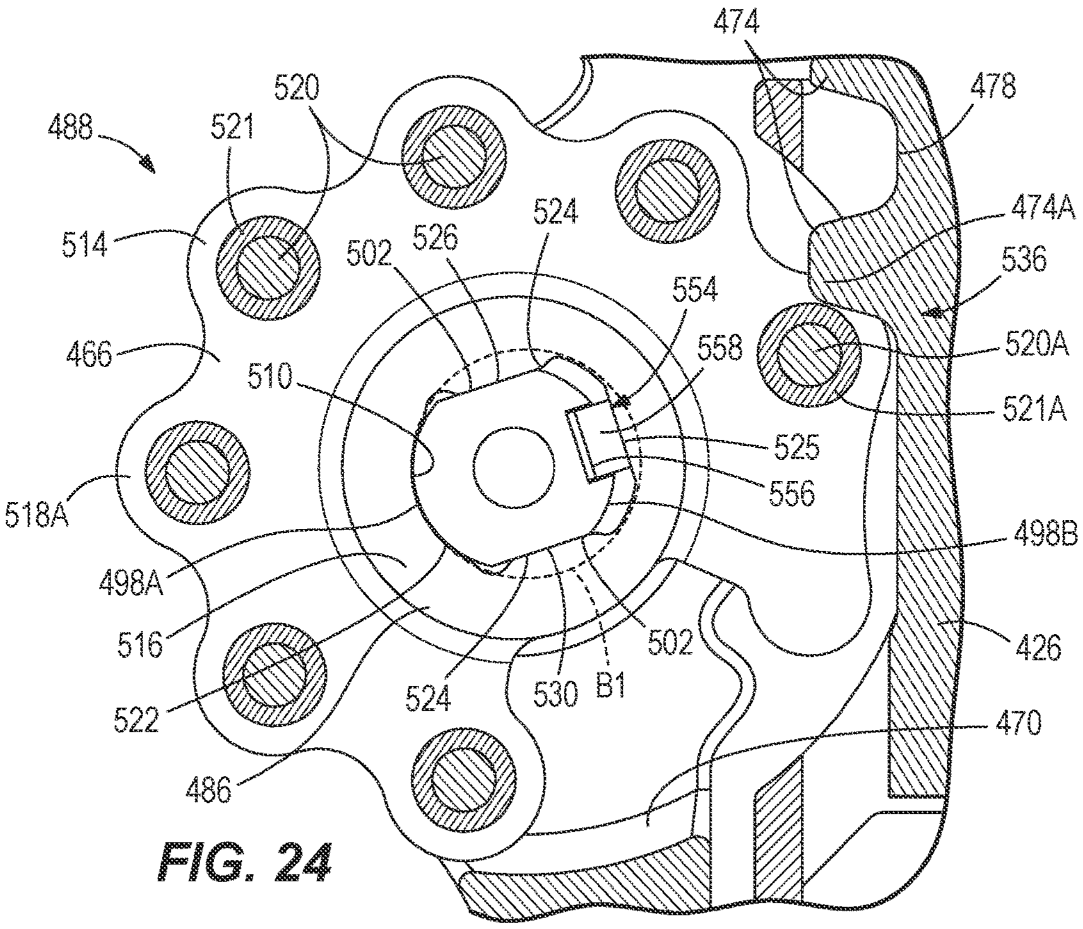
FIG. 24 is front cross-sectional view of a lifter assembly in accordance with a third embodiment of the invention.
Figure 25:
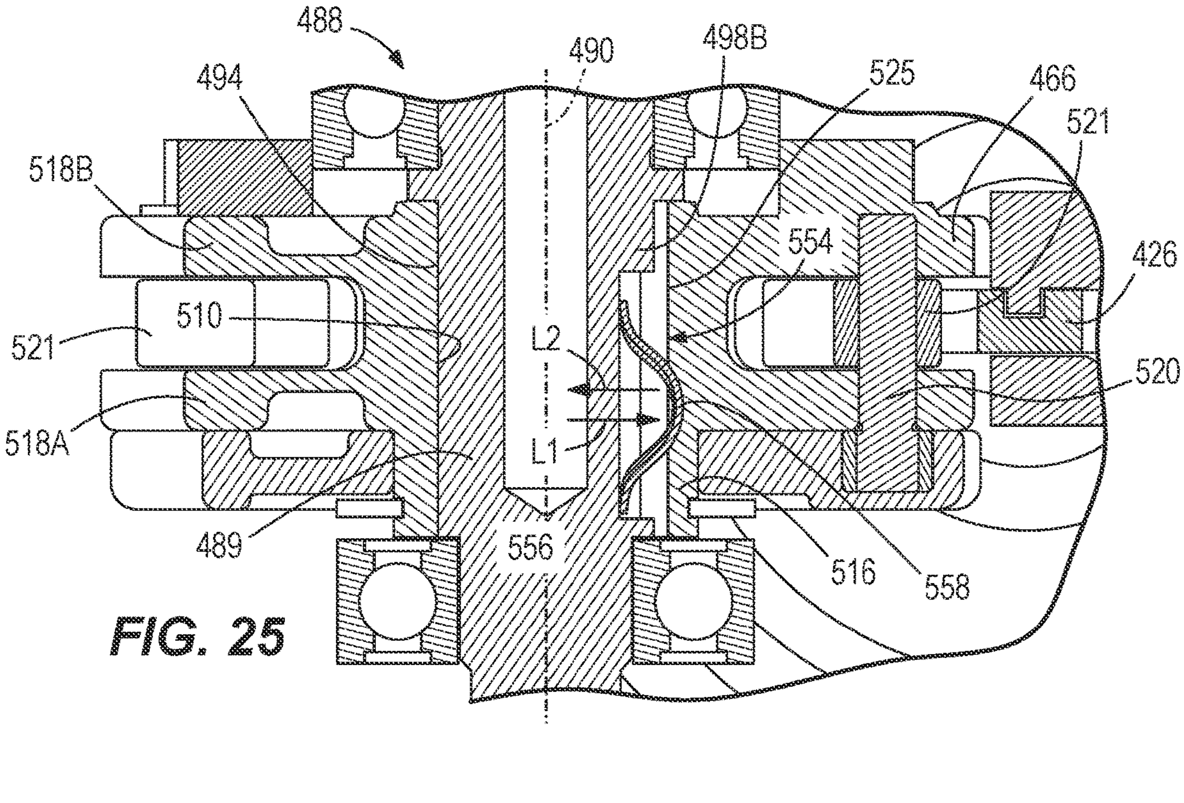
FIG. 25 is a side cross-sectional view of the lifter assembly of FIG. 24.

With reference to FIGS. 24-25, the driver blade 426 includes a plurality of lift teeth 474 formed along an edge 478 of the driver blade 426. Further, the powered fastener driver includes a frame 470 positioned within a housing (e.g., housing 30, FIG. 1). The frame 470 is configured to support the lifter assembly 488 within the housing.

The lifter assembly 488 includes a drive unit (e.g., drive unit 40, FIG. 2) having an output shaft 486. The output shaft 486 defines a rotational axis 490. In addition, the output shaft 486 includes an outer peripheral surface 494 having a cylindrical portion 498 and a flat portion 502 adjacent the cylindrical portion 498. Further, in the illustrated embodiment, the outer peripheral surface 494 includes two cylindrical portions 498A, 498B and two flat portions 502 (FIG. 24). The cylindrical portions 498A, 498B are positioned opposite one another relative to the rotational axis 490. Likewise, the flat portions 502 are positioned opposite one another relative to the rotational axis 490. Each of the flat portions 502 is oriented parallel with the rotational axis 490.

Figure 26:
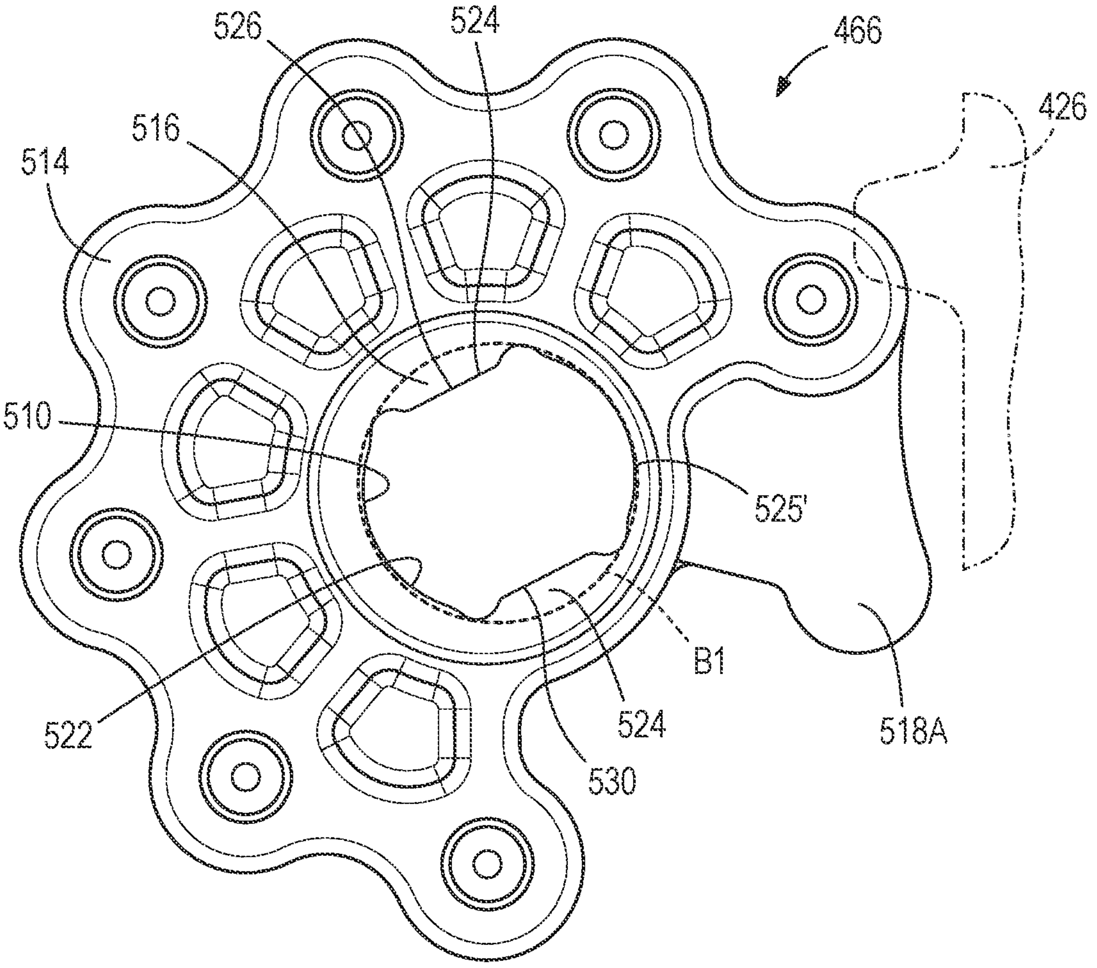
FIG. 26 is a front view of a lifter of the lifter assembly of FIG. 24.
Figure 27:
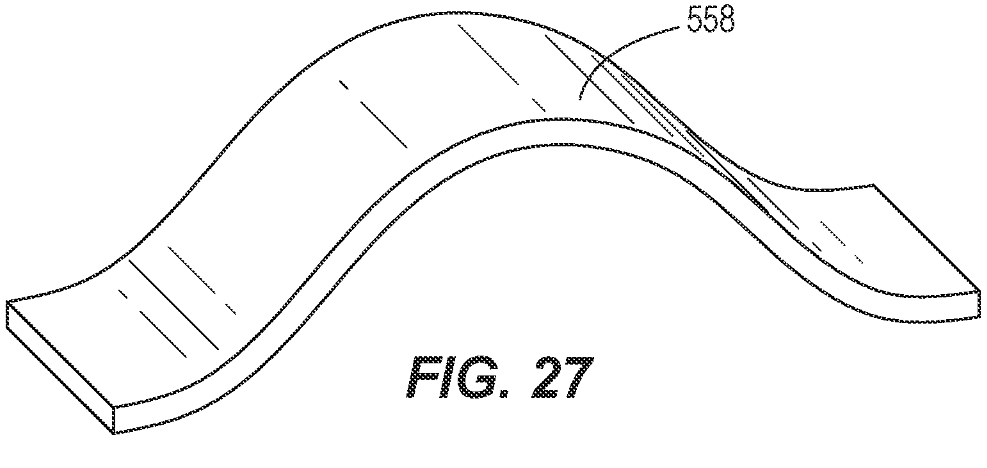
FIG. 27 is a perspective view of a spring of the lifter assembly of FIG. 24.

With reference to FIGS. 24-26, the lifter 466 includes an aperture 510 through which the output shaft 486 is received. With particular reference to FIG. 26, the lifter 466 includes a body 514 having a hub 516 through which the aperture 510 extends, a first flange 518A radially extending from one end of the hub 516, and a second flange 518B radially extending from an opposite end of the hub 516 and spaced from the first flange 518A along the axis 490. Further, the lifter 466 includes a plurality of pins 520 extending between the flanges 518A, 518B and rollers 521 supported upon the pins 520 (FIG. 25). The rollers 521 sequentially engage the lift teeth 474 formed on the driver blade 426 as the driver blade 426 is returned from the BDC position toward the TDC position.

As illustrated in FIGS. 24 and 26, the aperture 510 is partly defined by one curvilinear segment 522, one flat segment 525 opposed to the curvilinear segment 522, and two opposed protrusions 524 that extend radially inward of a base circle B1 coinciding with the curvilinear segment 522. Alternatively, the flat segment 525' may also be curvilinear, as shown in FIG. 26. Each of the protrusions 524 includes flat segments 526, 530. The aperture 510 is partly defined by the protrusions 524, in addition to the curvilinear segment 522 and the flat segment 525. The curvilinear segment 522 is configured to engage with one of the cylindrical portions 498A of the output shaft 486 (FIG. 24), while each protrusion 524 is configured to engage with a corresponding flat portion 502 on the outer peripheral surface 494 of the output shaft 486.

With particular reference to FIGS. 24-25, the lifter assembly 488 includes a cavity 554 defined between the other one of the cylindrical portions 498B of the output shaft 486 and the flat segment 525 of the aperture 510. More specifically, the aperture 510 is sized such that during assembly of the lifter assembly 488, the flat segment 525 is spaced from the cylindrical portion 498B to define the cavity 554. Further, in the illustrated embodiment, the cylindrical portion 498B of the output shaft 486 includes a cutout 556 (FIG. 25) to further define the cavity 554. The cutout 556 extends radially inward relative to the rotational axis 490 from the outer peripheral surface 494.

The lifter assembly 488 includes a spring 558 (FIG. 27) positioned within the cavity 554. As shown in FIG. 25, each end of the spring 558 is fixedly coupled to the output shaft 486. In the illustrated embodiment, each end is positioned within the cutout 556. The spring 558 is configured to apply a biasing force to the lifter 466 in a first linear direction L1 perpendicular to the rotational axis 490 (i.e., to the right from the frame of reference of FIG. 25). In the illustrated embodiment, the spring 558 is a leaf spring. In other embodiments, the spring 558 may be a compression spring. Further, in other embodiments, the lifter assembly 488 may include one or more springs (e.g., two, three, four, etc.). A combination of the output shaft 486 and the lifter 466 defines a kickout arrangement 536 located between the output shaft 486 and the lifter 466. As explained in greater detail below, the lifter 466 is selectively movable relative to the output shaft 486 in the first linear direction L1, and in a second, opposite linear direction L2.

With reference to FIG. 24, the lifter 466 is movable relative to the output shaft 486 between a first position (FIG. 24), in which the spring 558 biases the lifter 466 toward the driver blade 426, and a second position, in which the lifter 466 is moved away from the driver blade 426 relative to the output shaft 486 in the second, opposite linear direction L2. The flat segment 525 of the aperture 510 may contact the cylindrical portion 498B of the output shaft 486 when the lifter 466 is in the second position relative to the output shaft 486. The lifter 466 is in the first position when returning the driver blade 426 from the BDC position toward the TDC position. The lifter 466 moves in the second linear direction L2 (i.e., to the left from the frame of reference of FIG. 24) to the second position after the driver blade 426 reaches the TDC position. In other words, the aperture 510 is configured to selectively allow linear movement of the lifter 466 relative to the output shaft 486 in a direction that is transverse to the output shaft 486.

More specifically, the spring 558 is selected having a stiffness, once the spring 558 is preloaded within the cavity 554, sufficient to apply a predetermined force necessary to maintain the lifter 466 in the first position until the driver blade 426 reaches the TDC position. In particular, as the driver blade 426 is returned from the BDC position toward the TDC position, reaction forces (from the gas being compressed in the cylinder 18) act on the drive teeth 474. A resultant reaction force from these forces is applied to the rotary lifter 466 along the second linear direction L2, which is perpendicular to the rotational axis 490 of the output shaft 486 from the frame of reference of FIG. 25, by the driver blade 426. As the lifter 466 approaches the TDC position, the forces increase toward a maximum force on a lowermost tooth 474A such that the reaction force increases to a maximum value that is greater than the force applied to the lifter 466 by the spring 558 in the first linear direction L1. As such, after the lifter 466 reaches the TDC position, the resultant reaction force from the driver blade 426 on the lifter 466 exceeds the preload force applied by the spring 558 in the first linear direction L1, and the lifter 466 is moved from the first position to the second position (e.g., to the left from the frame of reference of FIG. 24) against the bias of the spring 558. As the driver blade 426 is driven from the TDC position to the BDC position, the driver blade 426 no longer contacts the lifter 466 to apply the reaction force, and as such the spring 558 rebounds to return the lifter 466 from the second position to the first position relative to the output shaft 486.

Figure 28:
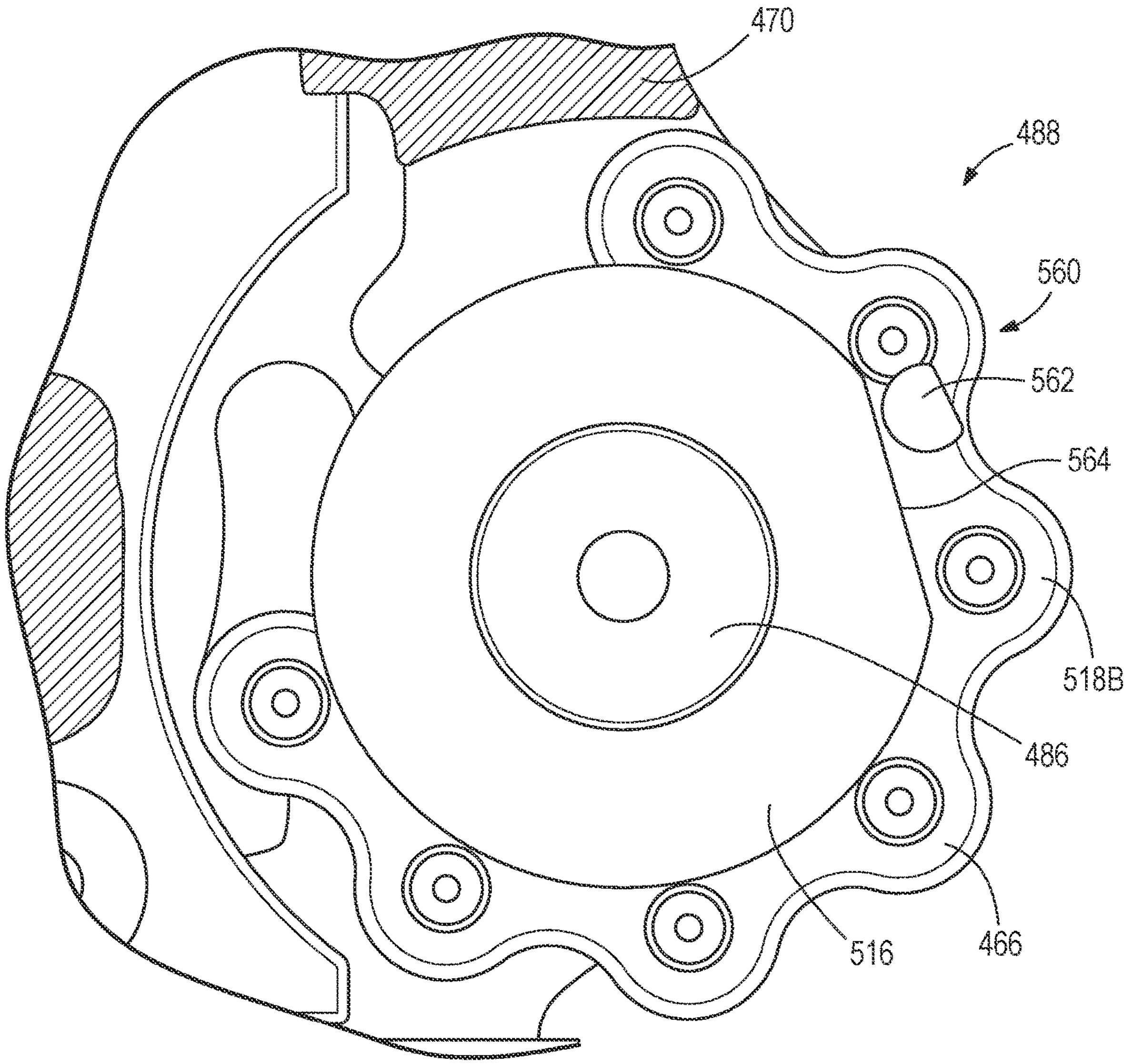
FIG. 28 is a rear cross-sectional view of another construction of the lifter assembly of FIG. 24 illustrating a retaining mechanism.

With reference to FIG. 28, in some embodiments, the lifter assembly 488 includes a retaining mechanism 560 for selectively retaining the lifter 466 in the first position relative to the output shaft 486 until the driver blade 426 reaches the TDC position. As shown in FIG. 28, the illustrated retaining mechanism 560 includes a retaining member 562 positioned at a predetermined location on the frame 470. The retaining member 562 is engageable with a flat member 564 defined on the hub 516 of the lifter 466. In particular, the retaining member 562 engages the flat member 564 for a portion of the lifter rotation when returning the driver blade 426 from the BDC position to the TDC position. The flat member 564 is configured such that the retaining member 562 of the frame 470 disengages the flat member 564 when the driver blade 426 reaches the TDC position. This may allow for a relatively smaller preload force of the spring 558 necessary for maintaining the lifter 466 in the first position. Further, this may inhibit any inadvertent movement of the lifter 466 toward the second position except for when the driver blade 426 reaches the TDC position.

During a driving cycle in which a fastener is discharged into a workpiece, the lifter 466 returns the piston and the driver blade 426 from the BDC position toward the TDC position. In particular, the lifter 466 is in the first position when returning the driver blade 426 from the BDC position toward the TDC position. After the driver blade 426 reaches the TDC position, the reaction force reaches the maximum value, thereby exceeding the preload force applied to the lifter 466 by the spring 558, and adjusting the lifter 466 from the first position to the second position.

As the lifter 466 is moved toward the second position, a last lifter roller 521A of the lifter 466 moves away from the lowermost tooth 474A of the driver blade 426 to release the driver blade 426. Thereafter, the lifter 466 no longer engages the driver blade 426, and the piston and the driver blade 426 are thrust downward toward the BDC position by the compressed air (e.g., in the cylinder 18 above the piston, FIG. 2). As the driver blade 426 is displaced toward the BDC position, the driver blade 426 no longer contacts the lifter 466 to apply the reaction force, and the spring 558 rebounds to move the lifter 466 from the second position toward the first position again (e.g., to the right from the frame of reference of FIG. 24). Therefore, due to the kickout arrangement 536, the lifter 466 (i.e., the last lifter roller 521A) may "kick out" or move relatively quickly out of the way of the driver blade 426 (i.e., lowermost tooth 474A) after the driver blade 426 reaches the TDC position.

Upon a fastener being driven into a workpiece, the driver blade 426 is in the driven or BDC position. Additionally, the spring 558 applies the biasing force to move the lifter 466 from the second position toward the first position. Thereafter, the continued driving of the drive unit (e.g., drive unit 40, FIG. 2) rotates the lifter 466 for returning the driver blade 426 toward the TDC position. Similar to FIGS. 1-7 of the first embodiment, a controller may deactivate the drive unit when the driver blade 426 is in the ready position. The driver blade 426 (and the piston) is held in the ready position until released by user activation of a trigger (trigger 58, FIG. 1), which initiates another driving cycle.

In particular, when the lifter 466 is moving the driver blade 426 toward the TDC position, the forces (from the gas being compressed in the cylinder 18) act on the lowermost tooth 474A as the driver blade 426 approaches the TDC position such that the lowermost tooth 474A may experience a high amount of wear by sliding contact with the last lifter roller 521A as the last lifter roller 521A rotates past the lowermost tooth 474A. The kickout arrangement 536 is configured to permit limited linear movement of the lifter 466 relative to the output shaft 486 between the first position and the second position such that the last lifter roller 521A is moved quickly out of the way of the drive blade 426 to release the driver blade 426 and initiate a fastener driving operation, thereby reducing wear on the lifter 466 (i.e., the last lifter roller 521A) and damage that might otherwise be caused to the drive unit by a momentary reaction torque applied to the drive unit as the driver blade 426 reaches the TDC position.

FIGS. 29-38 illustrate a fourth embodiment of a kickout arrangement 736 of a lifter assembly 688, with like components and features as the embodiment of the lifter assembly 88 of the fastener driver 10 shown in FIGS. 1-7 being labeled with like reference numerals plus "600". The lifter assembly 688 is utilized for a fastener driver similar to the fastener driver 10 of FIGS. 1-7 and, accordingly, the discussion of the fastener driver 10 above similarly applies to the kickout arrangement 736 of the lifter assembly 688 and is not re-stated. Rather, only differences between the kickout arrangement 136 of FIGS. 1-7 and the kickout arrangement 736 of FIGS. 29-38 are specifically noted herein, such as differences in a configuration of the lifter and the output shaft.

Figure 29:
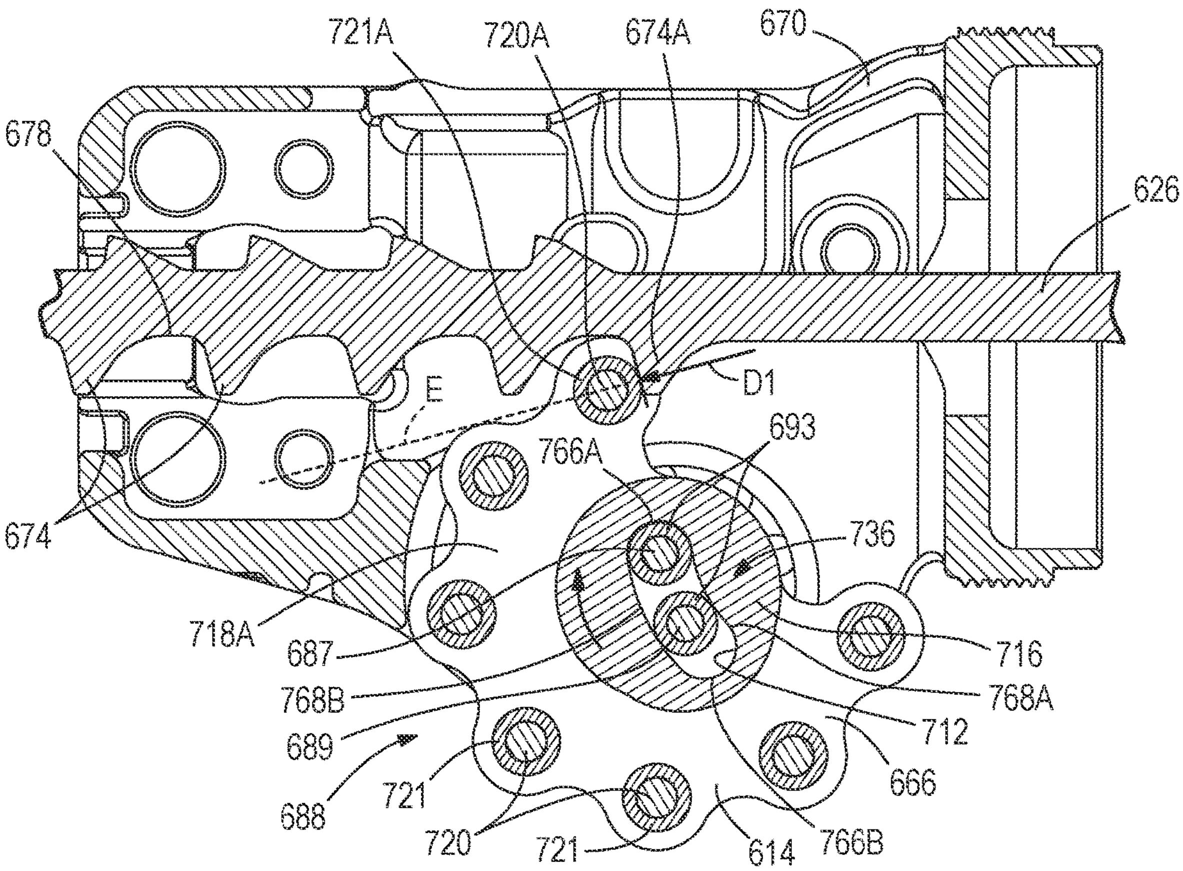
FIG. 29 is a front cross-sectional view of a lifter assembly in accordance with a fourth embodiment of the invention, illustrating a driver blade of the powered fastener driver at a BDC position.

With reference to FIG. 29, a driver blade 626 includes a plurality of lift teeth 674 formed along an edge 678 of the driver blade 626. Further, the powered fastener driver includes a frame 670 positioned within a housing (e.g., housing 30, FIG. 1). The frame 670 is configured to support the lifter assembly 688 within the housing.

Figure 30:
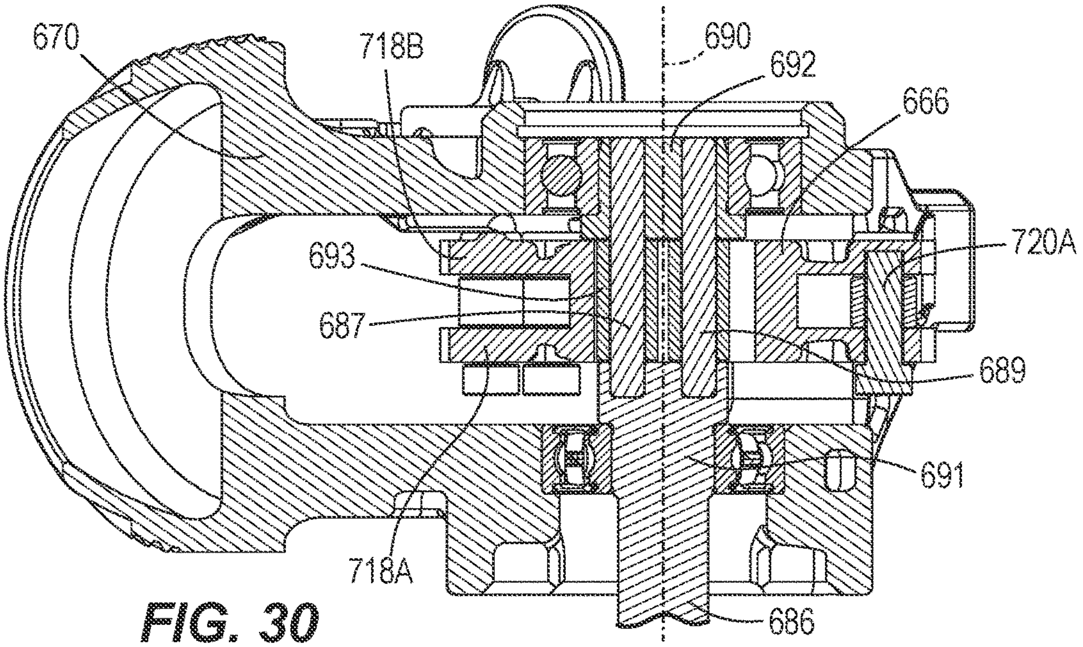
FIG. 30 is a side cross-sectional view of the lifter assembly of FIG. 29 illustrating a lifter.

With reference to FIG. 30, the lifter assembly 688 includes a drive unit (e.g., drive unit 40, FIG. 2) having an output shaft 686. The output shaft 686 defines a rotational axis 690. In addition, the output shaft 686 includes a first drive shaft 687 and a second drive shaft 689 coupled for co-rotation with the output shaft 686. In the illustrated embodiment, the output shaft 686 includes a first portion 691 and a second portion 692 spaced from the first portion 691 along the rotational axis 690. The first drive shaft 687 and the second drive shaft 689 extend between the portions 691, 692 of the output shaft 686 parallel to the rotational axis 690. In one embodiment, the first drive shaft 687 and the second drive shaft 689 are pressed between the first portion 691 and the second portion 692. Further, rollers 693 are supported on each of the first drive shaft 687 and the second drive shaft 689.

With reference to FIGS. 29 and 30, a lifter 666 of the lifter assembly 688 includes a slot 712 through which the first drive shaft 687 and the second drive shaft 689 are received. In particular, the lifter 666 includes a body 714 having a hub 716 through which the slot 712 extends, a first flange 718A radially extending from one end of the hub 716, and a second flange 718B radially extending from an opposite end of the hub 716 and spaced from the first flange 718A along the axis 690. The first portion 691 of the output shaft 686 is adjacent the first flange 718A and the second portion 692 is adjacent the second flange 718B relative to the rotational axis 690.

The lifter 666 further includes a plurality of pins 720 extending between the flanges 718A, 718B and rollers 721 supported upon the pins 720. The rollers 721 sequentially engage the lift teeth 674 formed on the driver blade 626 as the driver blade 626 is returned from the BDC position toward the TDC position.

As illustrated in FIG. 29, the slot 712 is defined by a plurality of curvilinear segments 766A, 766B and rounded segments 768A, 768B to form a curvilinear-shaped slot 712. More specifically, the slot 712 includes a first rounded segment 768A and a second, opposite rounded segment 768B. A first curvilinear segment 766A and a second curvilinear segment 766B extend between the first and second rounded segments 768A, 768B. The first rounded segment 768A and the second rounded segment 768B are opposite to each other relative to the rotational axis 690. Additionally, the second curvilinear segment 766B is spaced from and has a shape coinciding with the shape of the first curvilinear segment 766A. Each of the segments 766A, 766B, 768A, 768B is positioned interior to an outer edge of the lifter 666 such that the curvilinear-shaped slot 712 is formed by an interior wall of the lifter 666. The first and second rounded segments 768A, 768B and the first and second curvilinear segments 766A, 766B are configured to selectively engage with the rollers 693 of the first and second drive shafts 687, 689.

In particular, the segments 766A, 766B, 768A, 768B of the slot 712 of the lifter 666 are configured to engage with the first and second drive shafts 687, 689 (i.e., the rollers 693) as the first and second drive shafts 687, 689 rotate in a rotational direction about the rotational axis 690 of the output shaft 686. The first and second drive shafts 687, 689 rotate, with the rotation of the drive shaft 686, to apply a rotational force on the lifter 666 (i.e., the curvilinear segments 768A, 768B) for rotation of the lifter 666 with the rotation of the output shaft 686. A combination of the curvilinear and rounded segments 766A, 766B, 768A, 768B, and the first and second drive shafts 687, 689 define a kickout arrangement 736 located between the lifter 666 and the output shaft 686. As explained in greater detail below, the lifter 666 is selectively movable relative to the output shaft 686 about the first and second drive shafts 687, 689 as the lifter 666 continues to rotate with the rotation of the output shaft 686.

Figure 32:
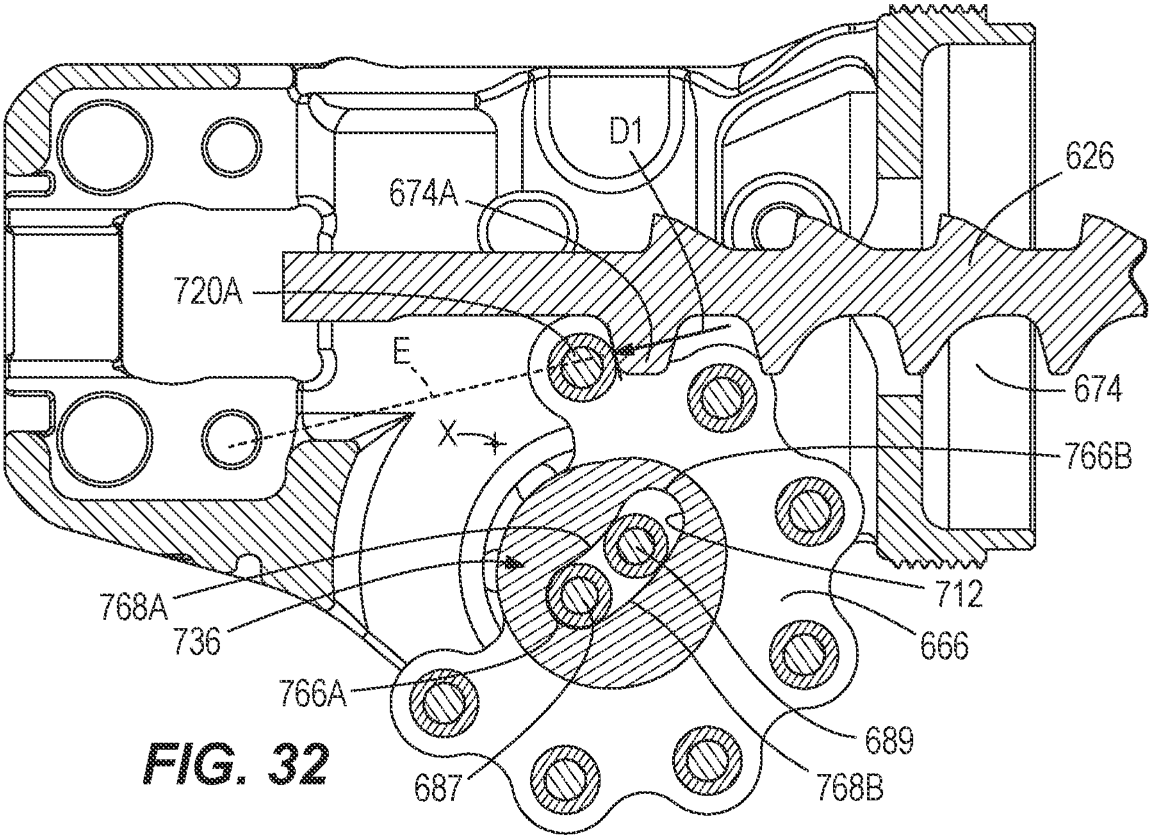
FIG. 32 is another front cross-sectional view of the lifter assembly of FIG. 29 illustrating the driver blade approaching the TDC position such that a lowermost tooth of the driver blade engages a last lifter roller of the lifter of FIG. 30.
Figure 38:
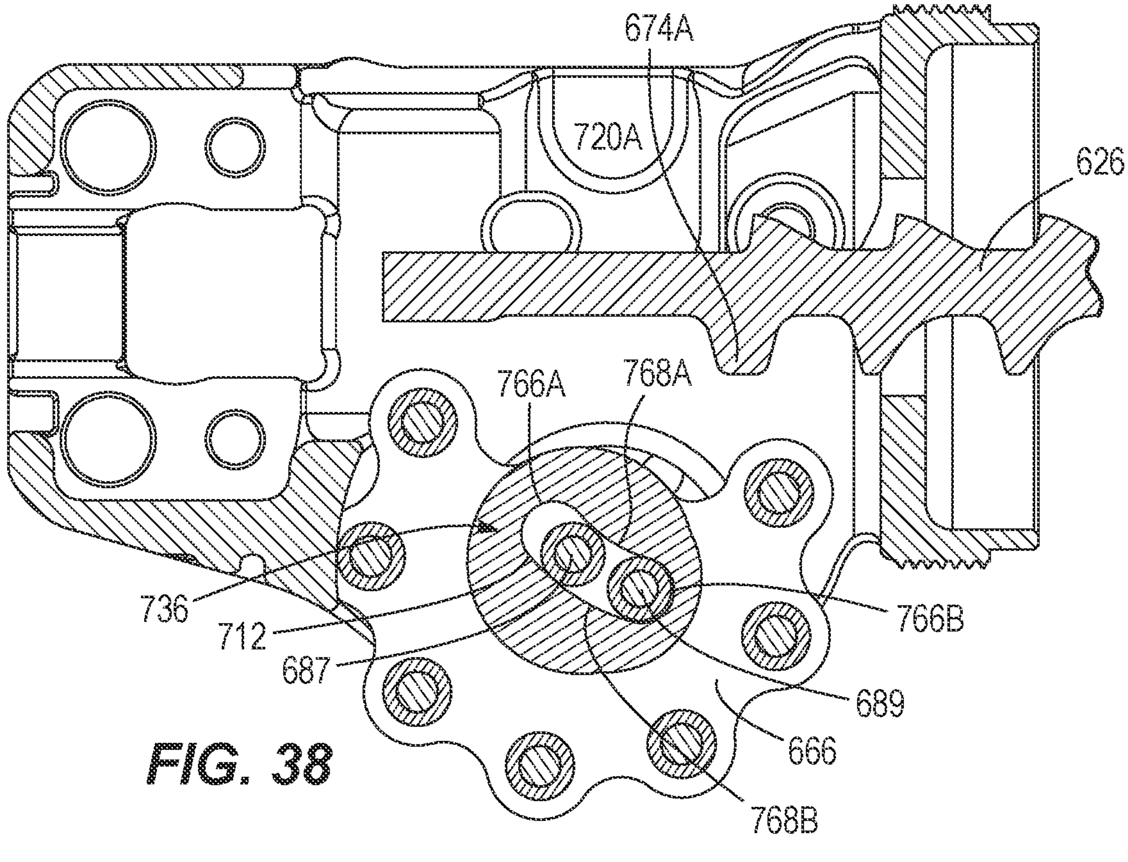
FIG. 38 is another front cross-sectional view of the lifter assembly of FIG. 29 illustrating the driver being fired from the TDC position to a BDC position, and the lifter in the second position.

With reference to FIGS. 32 and 38, the lifter 666 is movable about the first drive shaft 687 and the second drive shaft 689 between a first position (FIG. 32), in which the first and second drive shafts 687, 689 are engaged with the first and second curvilinear segments 766A, 766B, respectively, and closer to the first rounded segment 768A, and a second position (FIG. 38), in which the lifter 666 is moved away from the driver blade 626 relative to the output shaft 686 such that the first and second drive shafts 687, 689 are positioned closer to the second rounded segment 768B. The second drive shaft 689 may engage with the second rounded segment 768B when the lifter 666 is in the second position relative to the output shaft 686 (FIG. 38). The lifter 666 is in the first position when returning the driver blade 626 from the BDC position toward the TDC position. The lifter 666 moves toward the second position after the driver blade 626 reaches the TDC position. In other words, the slot 712 is configured to selectively allow movement of the lifter 666 relative to the output shaft 686.

Figure 31:
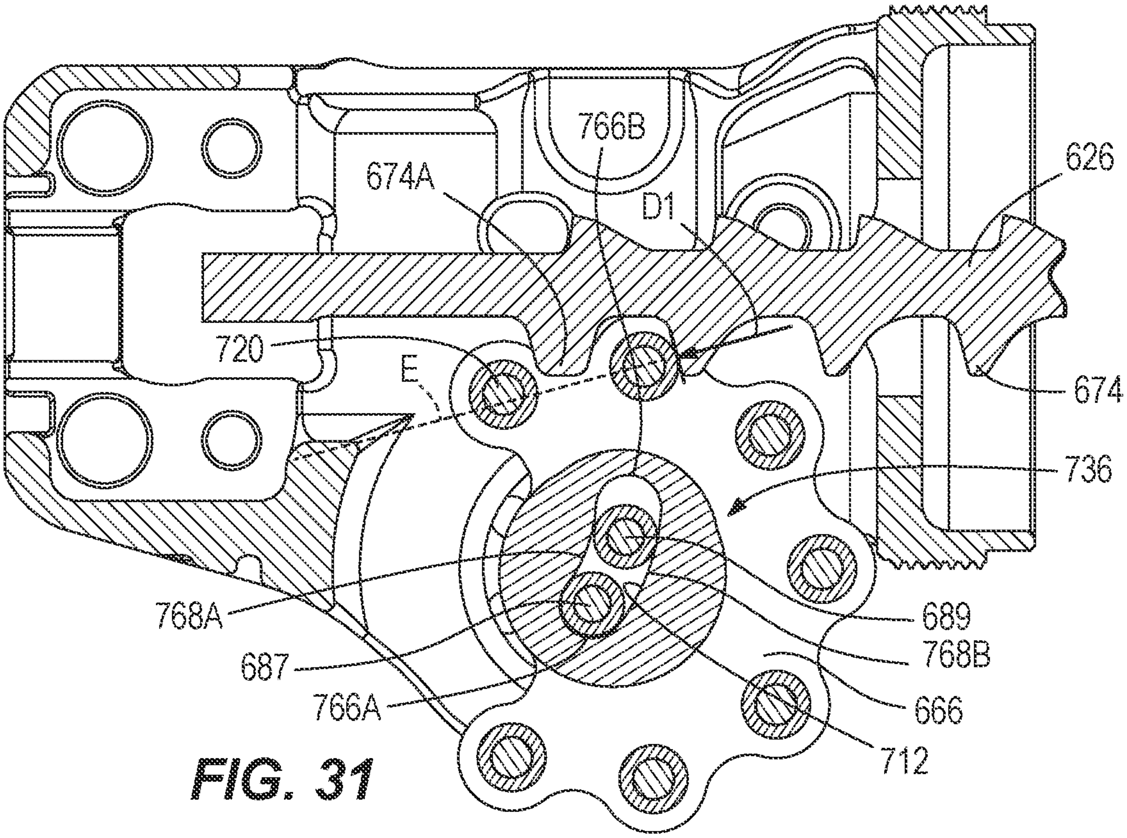
FIG. 31 is a front cross-sectional view of the lifter assembly of FIG. 29 illustrating the driver blade nearing a TDC position, and the lifter of FIG. 30 in a first position.

More specifically, as illustrated in FIGS. 29 and 31-33, the slot 712 has a center which defines a pivot point X at which the lifter 666 will move or shift from the first position to the second position. Specifically, as the driver blade 626 is being returned from the BDC position to the TDC position, a contact normal (i.e., arrow D1 in FIGS. 29 and 31-33) perpendicular to a line tangent to both one of the lifter rollers 721 and the surface of the respective tooth 674 of the driver blade 626 with which the roller 721 is in contact is formed. A reaction force is applied to the rotary lifter 666 along the contact normal D1 oriented along a line of action E as each roller 721 of the lifter 666 engages with each respective driver tooth 674. The line of action E is misaligned or otherwise does not extend through the pivot point X prior to the driver blade 626 reaching the TDC position such that the reaction force of the driver blade 626 on the lifter 666 maintains the lifter 666 in the first position. Said another way, the reaction force is oriented along the line of action E that extends above the pivot point X, as shown in FIG. 31.

Figure 33:
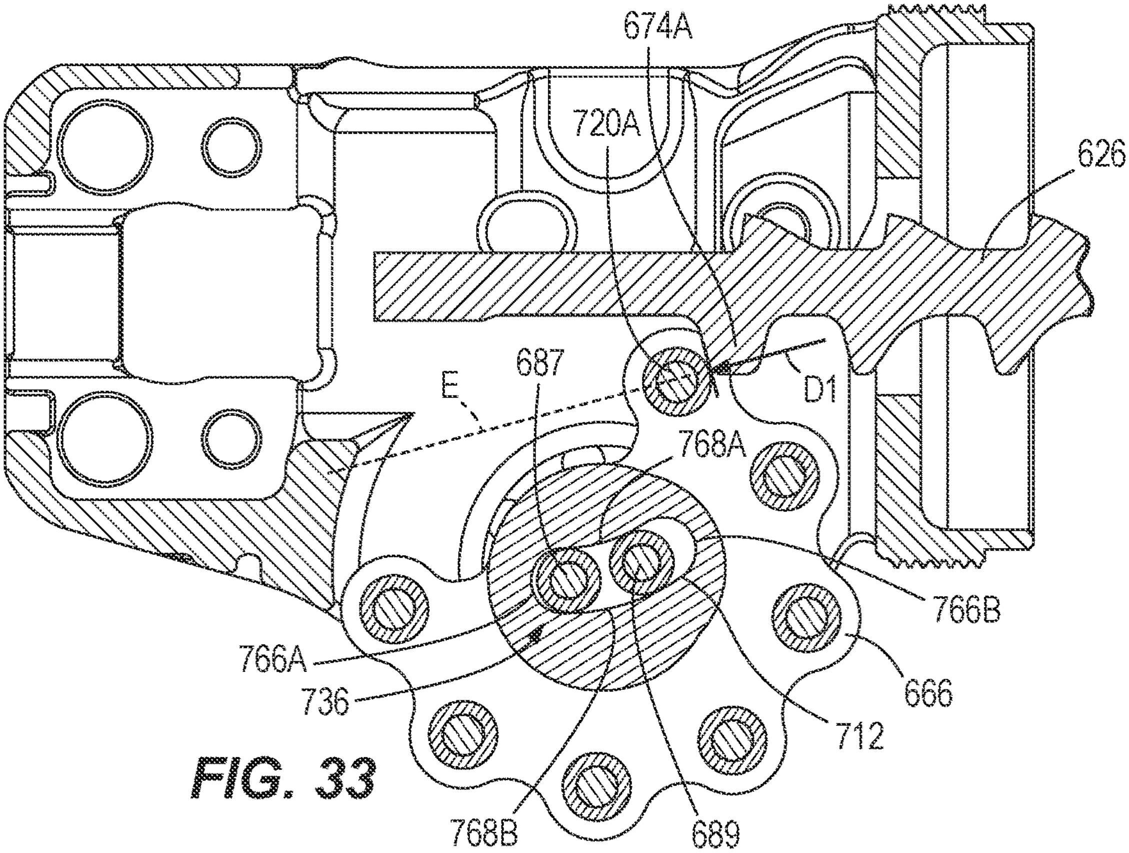
FIG. 33 is yet another front cross-sectional view of the lifter assembly of FIG. 29 illustrating the driver blade reaching the TDC position.
Figure 34:
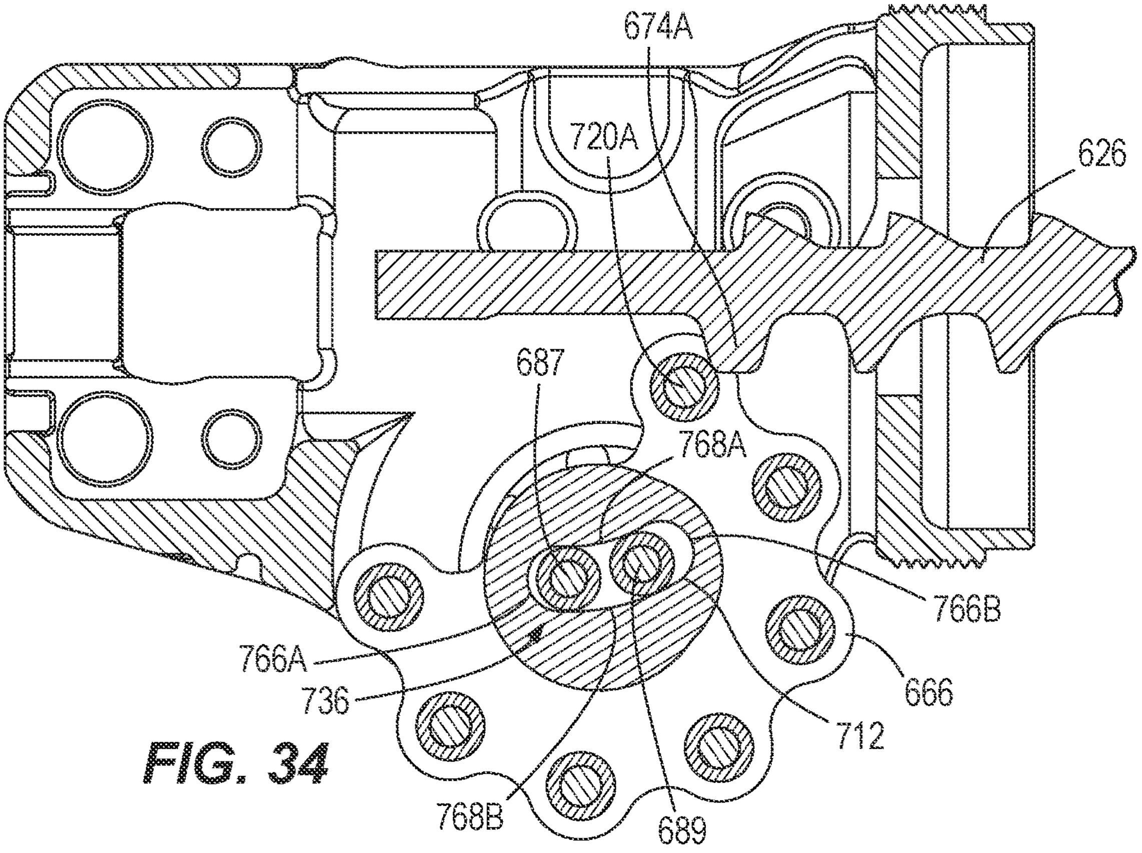
FIG. 34 is yet still another front cross-sectional view of the lifter assembly of FIG. 29 illustrating the lifter adjusting from the first position of FIG. 31 toward a second position.
Figure 35:
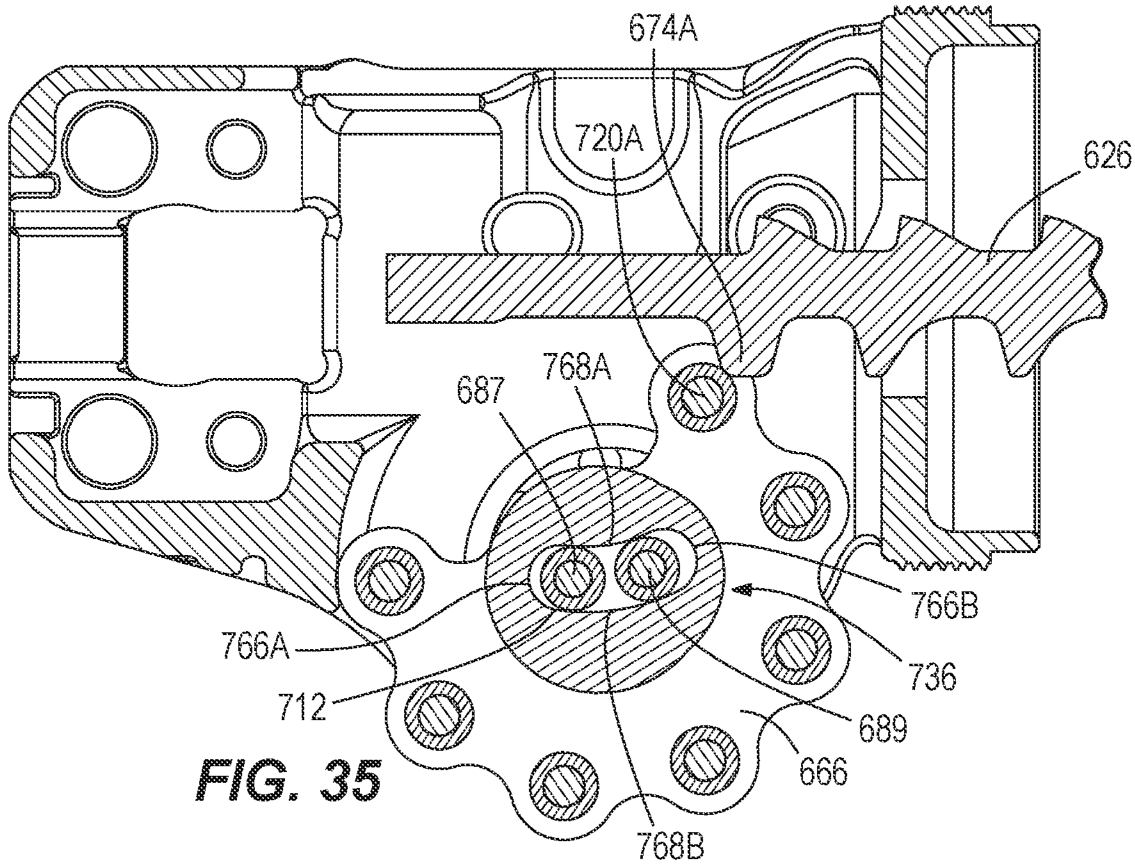
FIG. 35 is another front cross-sectional view of the lifter assembly of FIG. 29 illustrating the continued adjustment of the lifter toward the second position and continued rotation of the lifter.
Figure 36:
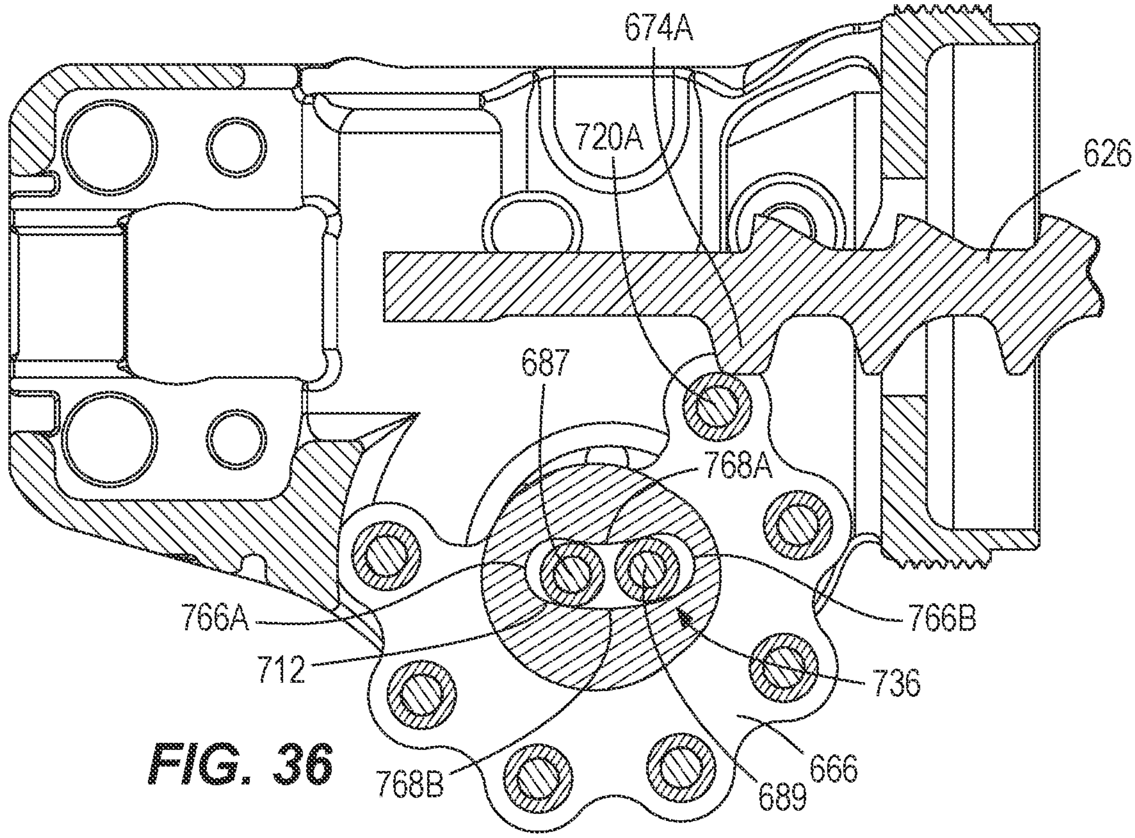
FIG. 36 is yet another front cross-sectional view of the lifter assembly of FIG. 29 illustrating the continued adjustment of the lifter toward the second position and continued rotation of the lifter.
Figure 37:
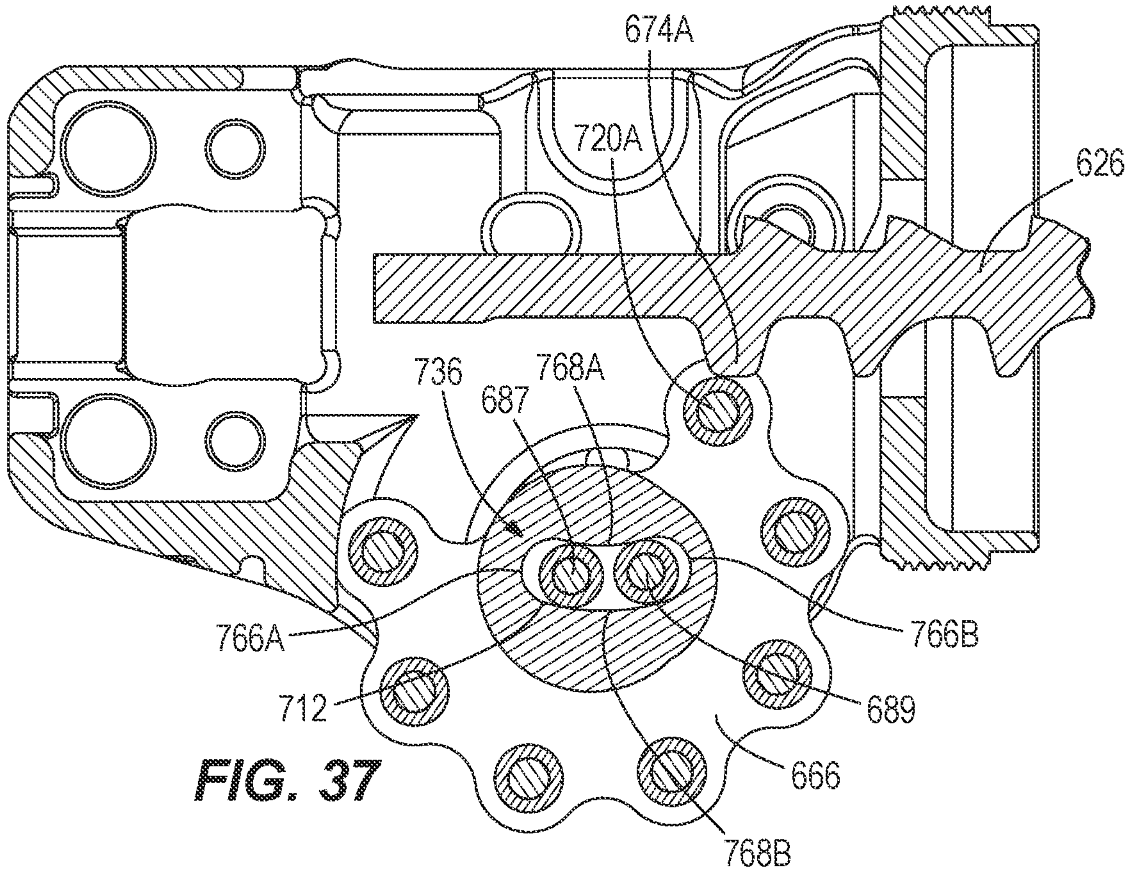
FIG. 37 is yet still another front cross-sectional view of the lifter assembly of FIG. 29 illustrating the continued adjustment of the lifter toward the second position and continued rotation of the lifter.

With particular reference to FIGS. 32 and 33, as the driver blade 626 approaches the TDC position, the contact normal D1 is formed perpendicular to the line tangent to both a last lifter roller 721A and the surface on a lowermost tooth 674A on the driver blade 626 with which the roller 721A is in contact (FIG. 32). As illustrated in FIG. 33, after the driver blade 626 reaches the TDC position, the reaction force oriented along the line of action E extends through the pivot point X, thereby causing the lifter 666 to move or pivot about the first and second drive shafts 687, 689 from the first position shown in FIGS. 29, 31, and 32 toward the second position shown in FIG. 38 (i.e., to the left from the frame of reference of FIG. 33).

With reference to FIGS. 33-38, the lifter 666 continues to rotate (by the first and second drive shafts 687, 689, respectively) as the lifter 666 pivots from the first position toward the second position, and the last lifter roller 721A has rotated past the lowermost tooth 674A such that there is no contact between the last lifter roller 721A and the driver blade 626 (FIGS. 34-37), and the driver blade 626 is moved toward the BDC position by the force of the compressed gas. The continued rotation of the lifter 666 by a centrifugal force from the first and second drive shafts 687, 689, respectively, on the lifter 666 eventually drives the lifter 666 to move outward again relative to the first and second drive shafts 687, 689 (i.e., to the right from the frame of reference of FIG. 38, thereby moving or pivoting the lifter 666 from the second position (FIG. 38) toward the first position (FIG. 29). As such, as the driver blade 626 is being fired from the TDC position to the BDC position, the lifter 666 is momentarily allowed to move or shift from the first position into the second position until the centrifugal force returns the lifter 666 from the second position to the first position again.

During a driving cycle in which a fastener is discharged into a workpiece, the lifter 666 returns the piston and the driver blade 626 from the BDC position toward the TDC position. In particular, the lifter 666 is in the first position when returning the driver blade 626 from the BDC position toward the TDC position. After the driver blade 626 reaches the TDC position, the reaction force is oriented along the line of action E extending through the pivot point X, thereby moving or pivoting the lifter 666 from the first position toward the second position.

As the lifter 666 is moved toward the second position, the last lifter roller 721A of the lifter 666 moves away from the lowermost tooth 674A of the driver blade 626 to release the driver blade 626. Thereafter, the lifter 666 no longer engages the driver blade 626, and the piston and the driver blade 626 are thrust downward toward the BDC position by the compressed air (e.g., in the cylinder 18 above the piston, FIG. 2). As the driver blade 626 is displaced toward the BDC position, the lifter 666 continues to rotate about the first and second drive shafts 687, 689, with the centrifugal force acting on the lifter 666 returning it from the second position toward the first position again (i.e., to the right from the frame of reference of FIG. 38). Therefore, due to the kickout arrangement 736, the lifter 666 (i.e., the last lifter roller 721A) may "kick out" or move relatively quickly out of the way of the driver blade 626 (i.e., lowermost tooth 674A) after the driver blade 626 reaches the TDC position.

Upon a fastener being driven into a workpiece, the driver blade 626 is in the driven or BDC position. Additionally, the centrifugal force acting on the lifter 666 moves the lifter 666 from the second position toward the first position. Thereafter, the continued driving of the drive unit (e.g., drive unit 40, FIG. 2) rotates the lifter 666 for returning the driver blade 626 toward the TDC position. Similar to FIGS. 1-7 of the first embodiment, a controller may deactivate the drive unit when the driver blade 626 is in the ready position. The driver blade 626 (and the piston) is held in the ready position until released by user activation of a trigger (trigger 58, FIG. 1), which initiates another driving cycle.

In particular, when the lifter 666 is moving the driver blade 626 toward the TDC position, the forces (from the gas being compressed in the cylinder 18) act on the lowermost tooth 674A as the driver blade 626 approaches the TDC position such that the lowermost tooth 674A may experience a high amount of wear by sliding contact with the last lifter roller 721A as the last lifter roller 721A rotates past the lowermost tooth 674A. The kickout arrangement 736 is configured to permit limited movement of the lifter 666 relative to the output shaft 686 between the first position and the second position such that the last lifter roller 721A is moved quickly out of the way of the drive blade 626 to release the driver blade 626 and initiate a fastener driving operation, thereby reducing wear on the lifter 666 (i.e., the last lifter roller 721A) and damage that might otherwise be caused to the drive unit by a momentary reaction torque applied to the drive unit as the driver blade 626 reaches the TDC position.

FIGS. 39-52 illustrate a fifth embodiment of a kickout arrangement 936 of a lifter assembly 888, with like components and features as the embodiment of the lifter assembly 88 of the fastener driver 10 shown in FIGS. 1-7 being labeled with like reference numerals plus "800". The lifter assembly 888 is utilized for a fastener driver similar to the fastener driver 10 of FIGS. 1-7 and, accordingly, the discussion of the fastener driver 10 above similarly applies to the kickout arrangement 936 of the lifter assembly 888 and is not re-stated. Rather, only differences between the kickout arrangement 136 and of the lifter 66 of FIGS. 1-7 and the kickout arrangement 936 and the lifter 866 of FIGS. 39-52 are specifically noted herein, such as differences in a last one of the lifter pins.

Figure 39:
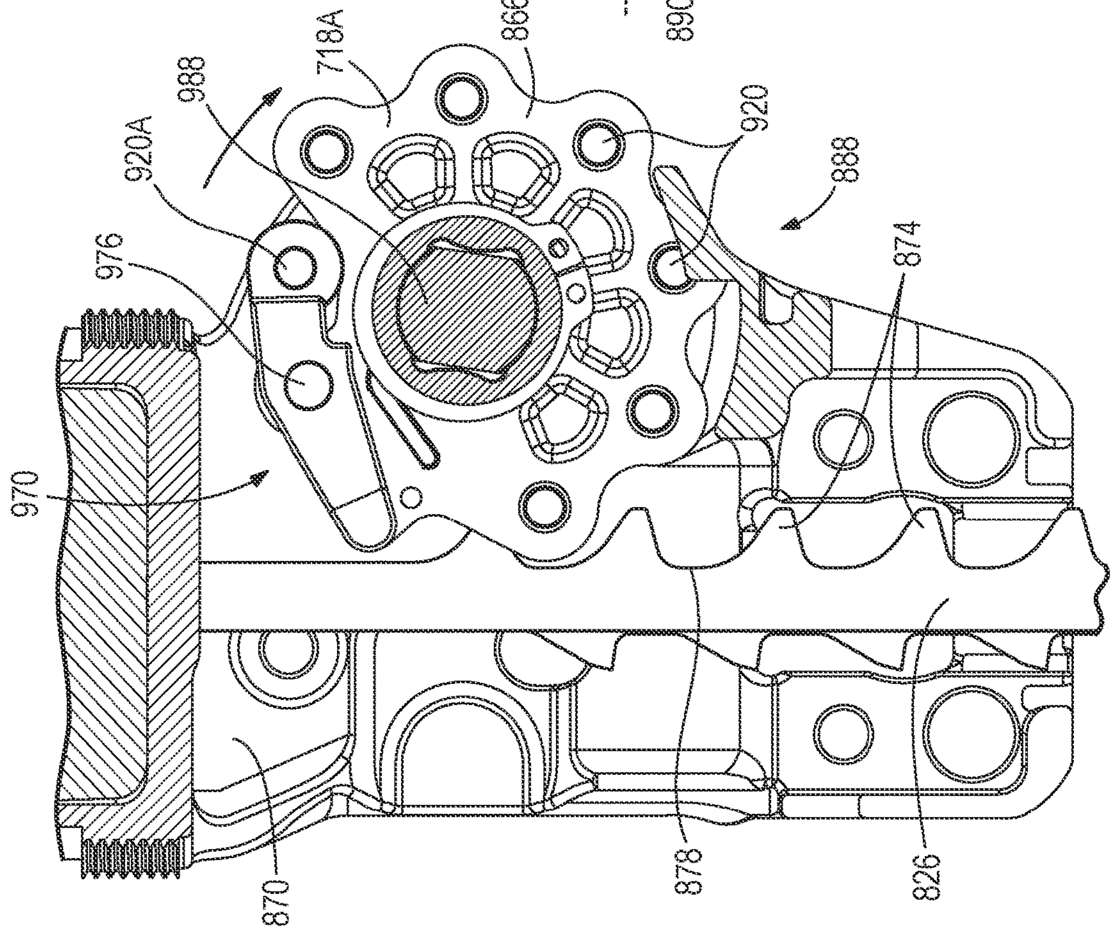
FIG. 39 is a front cross-sectional view of a lifter assembly in accordance with a fifth embodiment of the invention, illustrating a driver blade of the powered fastener driver at a BDC position.

With reference to FIG. 39, the driver blade 826 includes a plurality of lift teeth 874 formed along an edge 878 of the driver blade 826. Further, the powered fastener driver includes a frame 870 positioned within a housing (e.g., housing 30, FIG. 1). The frame 870 is configured to support the lifter assembly 888 within the housing.

Figure 40:
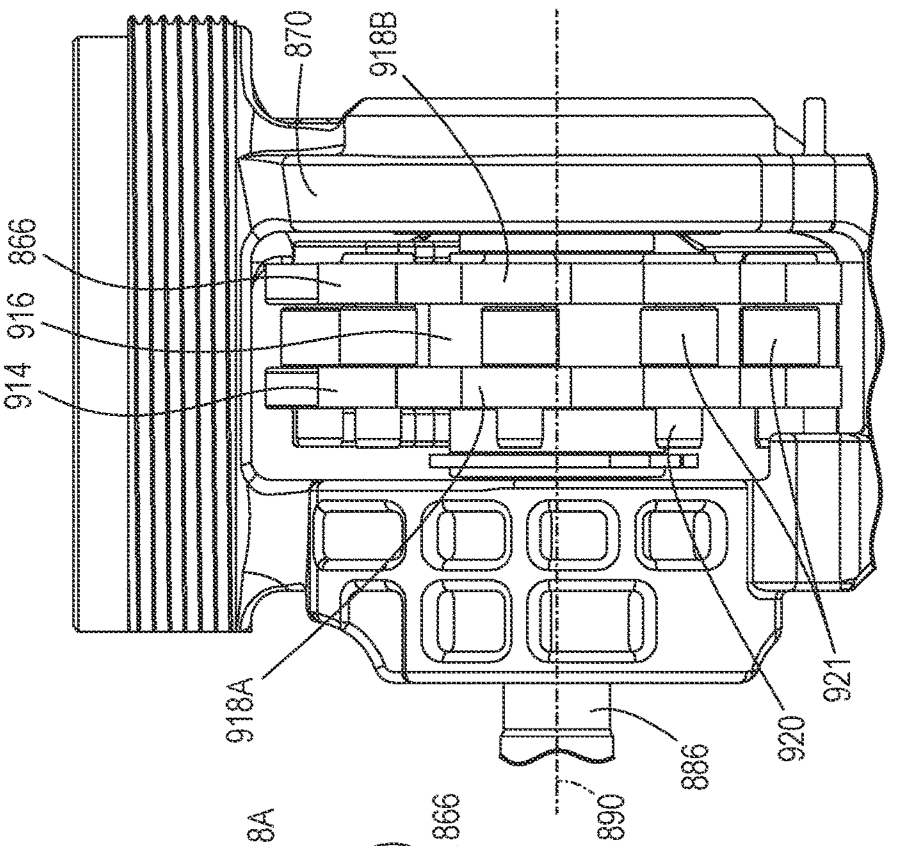
FIG. 40 is a side view of the lifter assembly of FIG. 39 illustrating a lifter of the lifter assembly and a frame supporting the lifter assembly.
Figure 41:
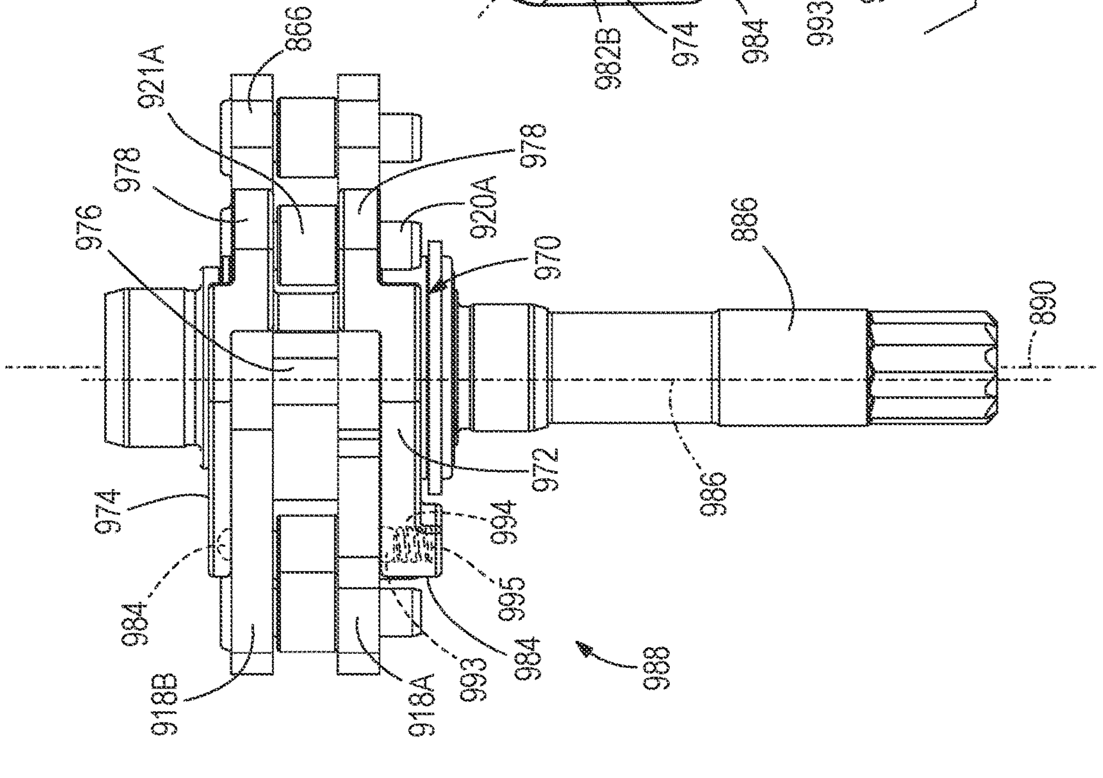
FIG. 41 is another side view of a portion of the lifter assembly of FIG. 39.

With reference to FIGS. 40-41, the lifter assembly 888 includes a drive unit (e.g., drive unit 40 of FIG. 2) having an output shaft 886, and a lifter 866 coupled for co-rotation with the output shaft 886. The output shaft 886 defines a rotational axis 890. The lifter 866 includes a plurality of pins 920 extending between flanges 918A, 918B of a body 914 of the lifter 866 (except for a last lifter pin 920A), and rollers 921 supported upon the pins 920. Each roller 921 is rotatably supported on the respective pin 920. Further, the rollers 921 sequentially engage the lift teeth 874 formed on the driver blade 826 as the driver blade 826 is returned from the BDC position toward the TDC position.

Figure 42:
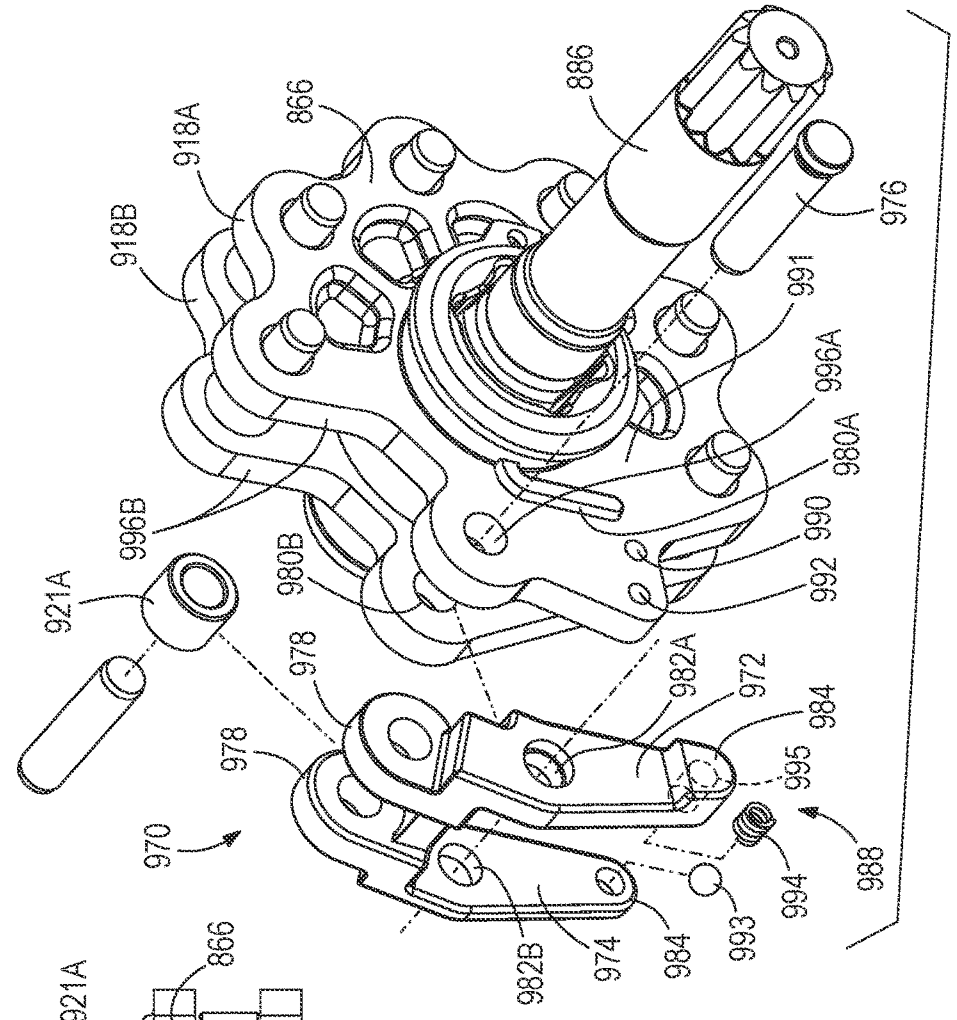
FIG. 42 is an exploded view of the lifter assembly of FIG. 41.

With reference to FIGS. 39, 41, and 42, the last lifter pin 920A forms a portion of a pivot pin assembly 910 of the lifter 866. The pivot pin assembly 970 includes a first pivot arm 972, a second pivot arm 974, a rod 976, and the last lifter pin 920A supported on a first end 978 of each pivot arm 972, 974. The illustrated first and second pivot arms 972, 974 are pivotably supported on the lifter 866 by the rod 976. In particular, the flanges 918A, 918B define first and second holes 980A, 980B that are configured to align with first and second holes 982A, 982B of the first and second arms 972, 974, respectively. The respective hole 982A, 982B of each arm 972, 974 is located intermediate the first end 978 and a second, opposite end 984 of each arm 972, 974. The rod 976 is received within each hole 980A, 980B, 982A, 982B such that the rod 976 extends between the flanges 918A, 918B of the body 914 of the lifter 866 and the first and second arms 972, 974. The rod 976 defines a pivot axis 986, which extends parallel to the rotational axis 890 (FIG. 41). The last lifter pin 920A (and roller 921A) is supported between each first end 978 of the arms 972, 974. Accordingly, the last lifter pin 920A is pivotable with the pivot arms 972, 974 about the pivot axis 986 toward or away from the rotational axis 890 (i.e., the lifter 866).

The lifter 866 further includes a detent assembly 988 positioned at the second end 984 of the first pivot arm 972 and opposite the last lifter pin 920A (FIGS. 41 and 42). The detent assembly 988 includes a first recess 990 and a second recess 992 defined by the lifter 866, and a ball or detent 993 configured to be selectively received in each of the first and second recesses 990, 992. In the illustrated embodiment, the first recess 990 and the second recess 992 are defined by an outer surface 991 of the flange 918A. The first recess 990 is positioned radially closer to the rotational axis 890 than the second recess 992. The detent assembly 988 further includes a spring 994 configured to bias the detent 993 into one or the other of the first and second recesses 990, 992. The detent 993 and the spring 994 are positioned within a cavity 995 at the second end 984 of the first pivot arm 972. The spring 994 is configured to bias the detent 993 away from the first pivot arm 972 toward the flange 918A (from the frame of reference of FIG. 41) relative to the rotational axis 890.

With reference to FIG. 42, the lifter 866 includes a first stop member 996A and a second stop member 996B. The illustrated first stop member 996A extends axially from the outer surface 991 of the flange 918A relative to the rotational axis 890. Additionally, the first stop member 996A extends from a first end radially outward to a second, opposite end. The first stop member 996A is configured to engage the first pivot arm 972 proximate the second end 984 of the first pivot arm 972. The lifter 866 may further include another first stop member positioned on an outer surface of the other flange 918B. The illustrated second stop member 996B is defined by a side edge of each of the first and second flanges 918A, 918B. In particular, the second stop member 996B is positioned radially closer to the rotational axis 890 than the pivot axis 986. The second stop member 996B is configured to engage the first end 978 of each of the first and second pivot arms 972, 974.

Figure 45:
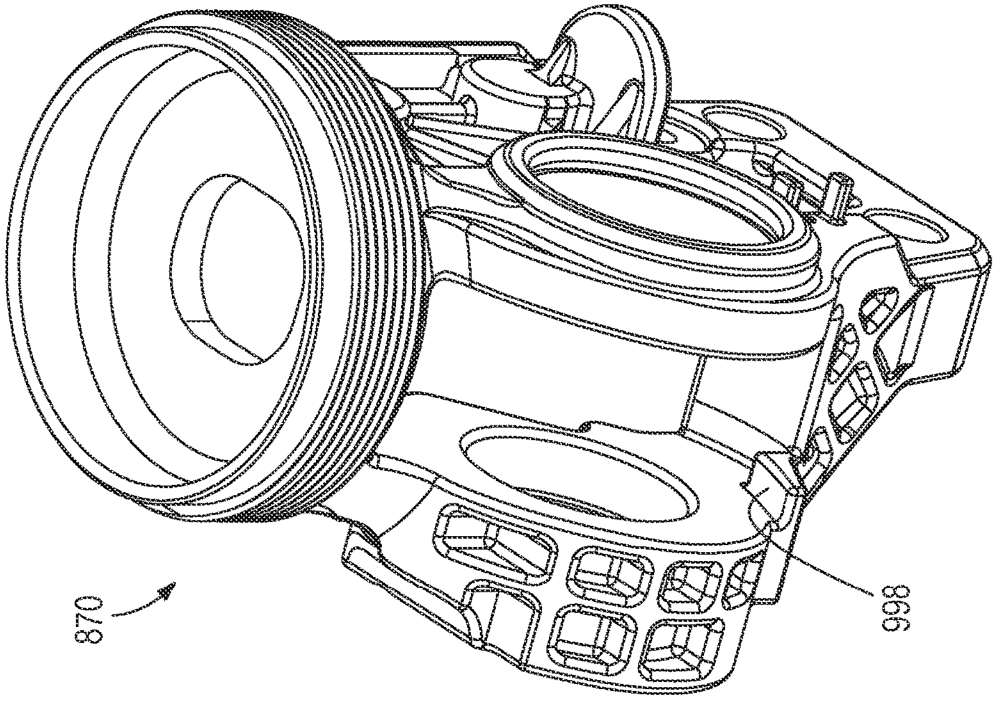
FIG. 45 is a perspective view of the frame of FIG. 40.
Figure 48:
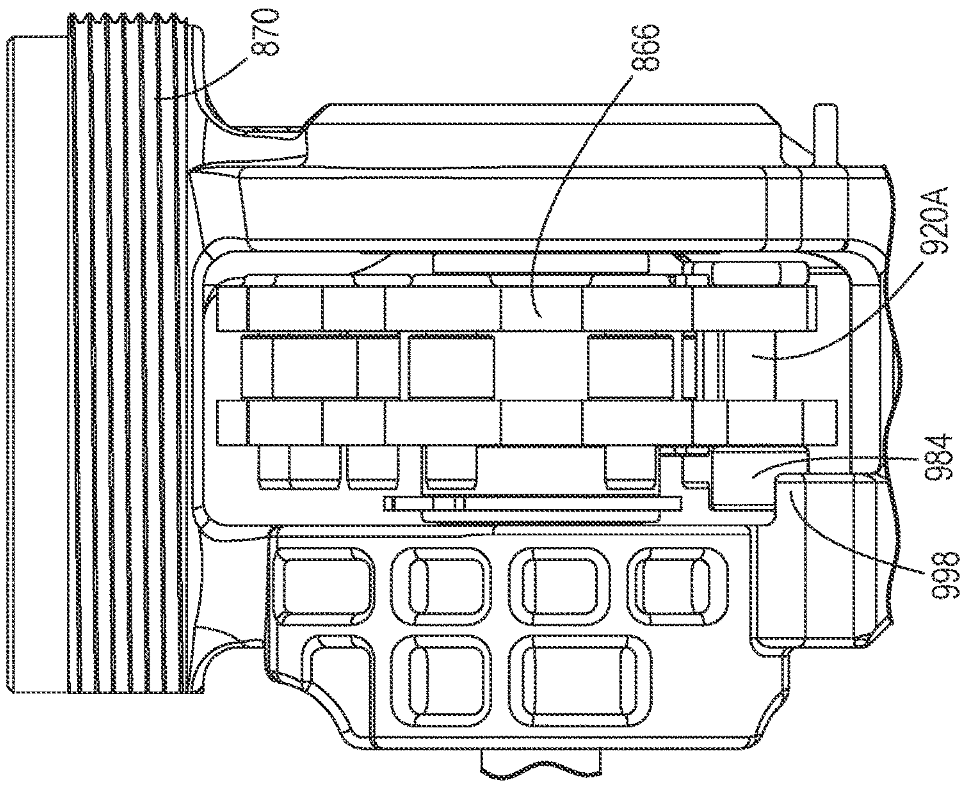
FIG. 48 is a side view of the lifter assembly of FIG. 47, illustrating an engagement portion of the frame of FIG. 40 engaging with the pivot pin assembly of FIG. 43.

With reference to FIGS. 45 and 48, the frame 870 includes an engagement member 998 extending axially inward relative to the rotational axis 890 from an inner surface of the frame 870 toward the lifter 866. The engagement member 998 is positioned axially below the outer surface 991 of the flange 918A and proximate the plurality of pins 920. Furthermore, the engagement member 998 is positioned at a predetermined location on the frame 870. The predetermined location is selected based on a position of the last lifter pin 920A at a specific point of rotation of the lifter 866. The specific point of rotation is the point in the lifter rotation just before the last lifter roller 921A is configured to engage a lowermost driver tooth 874A (i.e., when the driver blade 826 is nearing the TDC position). The engagement member 998 is configured to engage the pivot pin assembly 970 (i.e., the first and second pivot arms 972, 974) for moving or pivoting the last lifter pin 920A/roller 921A. A combination of the pivot pin assembly 970 and the lowermost tooth 874A of the driver blade 826 defines a kickout arrangement 936 located between the last lifter roller 921A and the lifter 866. As explained in greater detail below, the last lifter pin 920A is selectively pivotable relative to the lifter 866.

Figure 43:
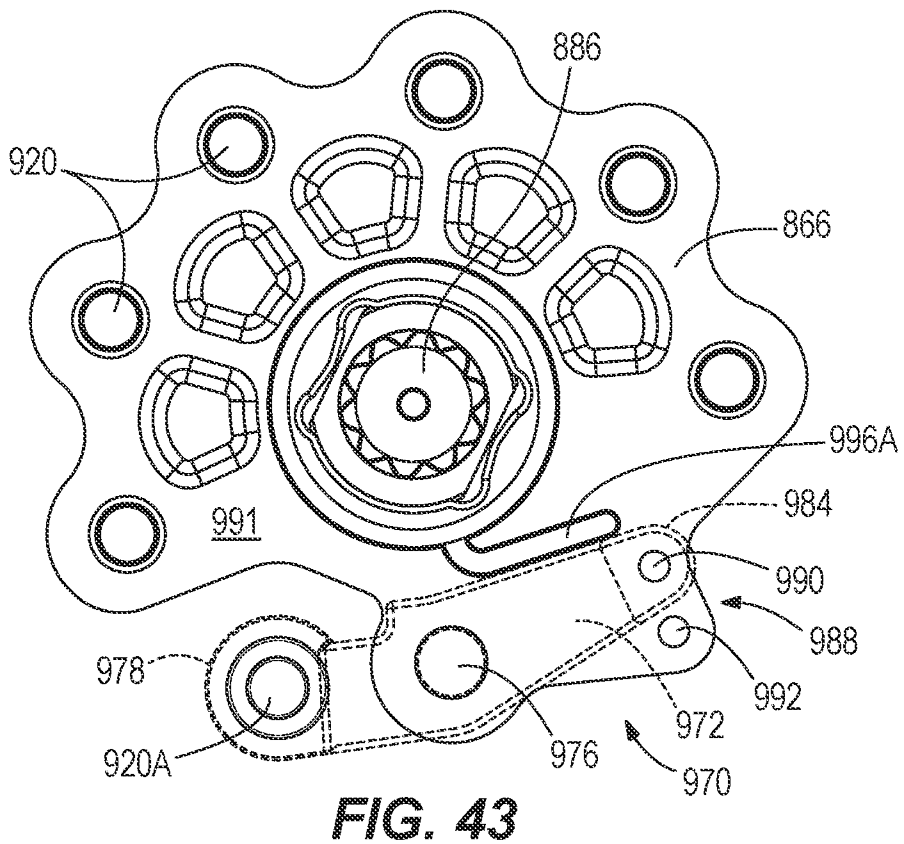
FIG. 43 is a front view of the lifter assembly of FIG. 41, illustrating a pivot pin assembly of the lifter of FIG. 40 in a first position.
Figure 44:
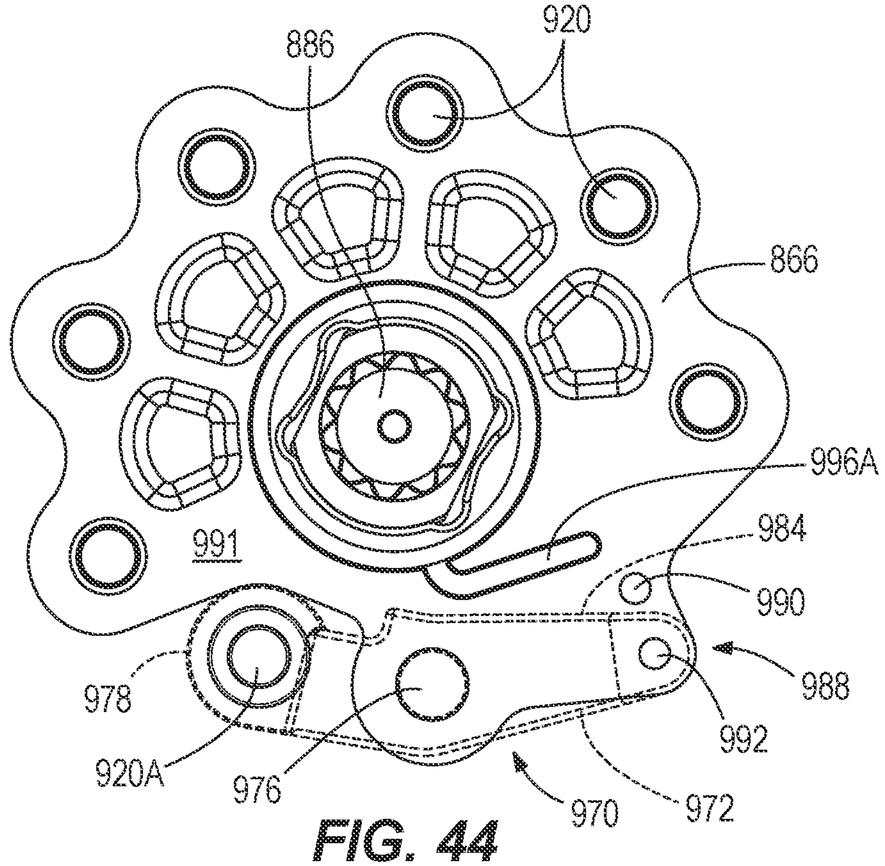
FIG. 44 is another front view of the lifter assembly of FIG. 41, illustrating the pivot pin assembly of FIG. 43 adjusted into a second position.

With reference to FIGS. 43 and 44, the pivot pin assembly 970 is movable relative to the lifter 866 between a first position (FIG. 43), in which the detent assembly 988 releasably couples the second end 984 of the first pivot arm 972 to the first recess 990 for maintaining the last lifter pin 920A (and roller 921A) in a radially outward position, and a second position (FIG. 44), in which the detent assembly 988 releasably couples the second end 984 of the first pivot arm 972 to the second recess 992 for maintaining the last lifter pin 920A (and roller 921A) in a radially inward position. The pivot pin assembly 970 is in the second position relative to the lifter 866 when returning the driver blade 826 from the BDC position toward the TDC position. The pivot pin assembly 970 is pivoted to the first position just before the driver blade 826 reaches the TDC position. Further, the detent assembly 988 is configured to maintain the pivot pin assembly 970 in both the first and second positions. The first and second stop members 996A, 996B, respectively, limit the movement of the pivot pin assembly 970 between the first and second positions.

Figure 46:
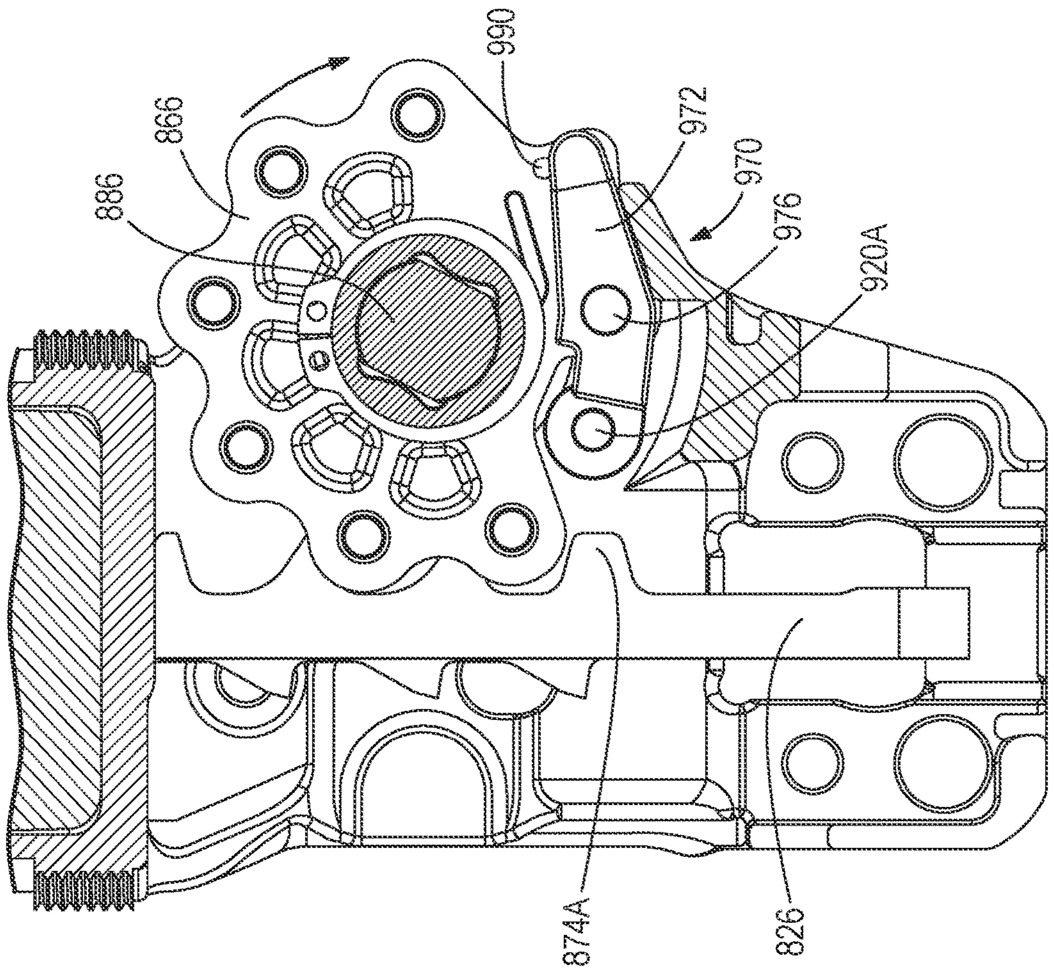
FIG. 46 is a front cross-sectional view of the lifter assembly of FIG. 39 illustrating the driver blade nearing a TDC position, and the pivot pin assembly of FIG. 44 in the second position.
Figure 47:
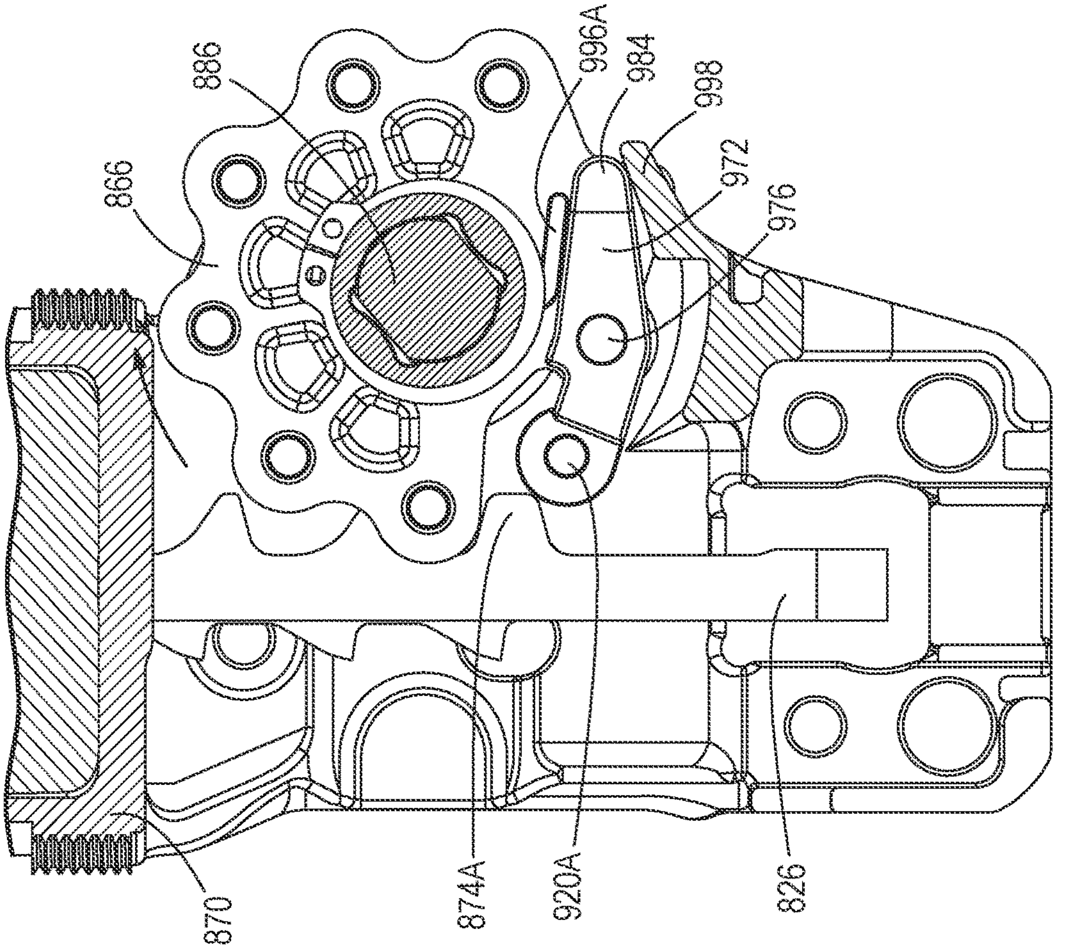
FIG. 47 is another front cross-sectional view of the lifter assembly of FIG. 39 illustrating the driver blade approaching the TDC position such that a lowermost tooth of the driver blade engages a last lifter roller of the lifter of FIG. 40.

More specifically, as illustrated in FIGS. 46-52, the lifter 866 is in the second position when returning the driver blade 826 from the BDC position to the TDC position (e.g., FIG. 46). The engagement member 998 is configured to engage the second end 984 of the first pivot arm 972 of the pivot arm assembly 970 before the driver blade 826 reaches the TDC position (FIGS. 47 and 48). The engagement member 998 is configured to apply a force to the pivot arm assembly 970 to overcome a biasing force of the detent assembly 988 for pivoting the pivot pin assembly 970 radially outward (counter-clockwise from the frame of reference of FIG. 47) relative to the rotational axis 890 from the second position toward the first position.

Figure 50:
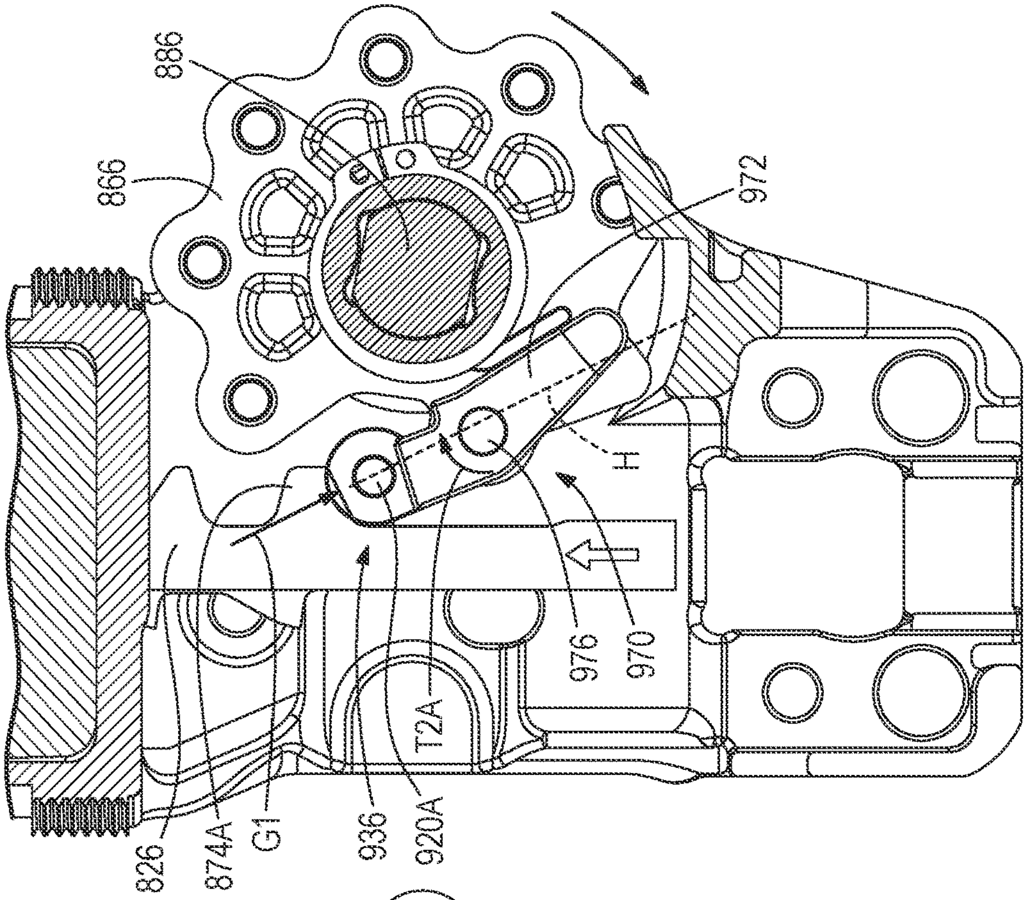
FIG. 50 is another front cross-section view of the lifter assembly of FIG. 39 illustrating the driver blade at the TDC position.
Figure 49:
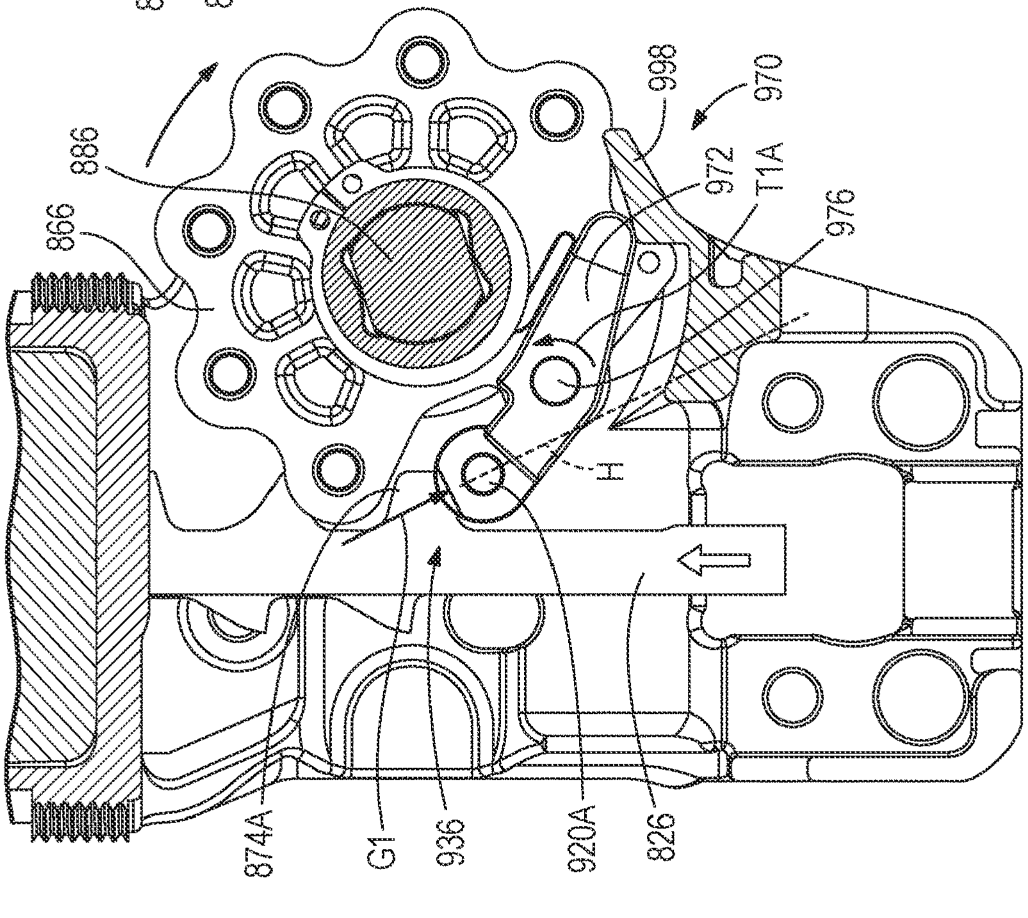
FIG. 49 is a front cross-sectional view of the lifter assembly of FIG. 39, illustrating the pivot pin assembly of FIG. 43 in the first position as the driver blade reaches the TDC position.

With particular reference to FIGS. 49 and 50, as the driver blade 826 approaches the TDC position, a contact normal (i.e., arrow G1 in FIG. 49) perpendicular to a line tangent to both the last lifter roller 921A and the surface on the lowermost tooth 874A on the driver blade 826 with which the roller 921A is in contact is formed. A reaction force is applied to the last lifter pin 920A (i.e., to the first end 978 of the pivot pin assembly 970) along the contact normal G1, which is oriented along a line of action H located below the pivot axis 986 of the pivot pin assembly 970, from the frame of reference of FIG. 49. Thus, a reaction torque (arrow T1A) is applied to the pivot pin assembly 970 in a counter-clockwise direction (from the frame of reference of FIG. 47), thereby maintaining the pivot pin assembly 970 in the first position (along with the biasing force of the detent assembly 988) as the driver blade 826 is moved toward the TDC position. The line of action H of the contact normal G1 remains below the pivot axis 986 of the pivot pin assembly 970 until the lifter 866 reaches the TDC position. Thereafter, as shown in FIG. 50, the contact normal G1 between the lowermost tooth 874A and the last lifter roller 921A changes direction such that the line of action H is located above the pivot axis 986 of the pivot pin assembly 970. Thus, the reaction torque (arrow T2A) exerted on the pivot pin assembly 970 by the driver blade 826 is redirected in a clockwise direction (from the frame of reference of FIG. 50), thereby overcoming the biasing force of the detent assembly 988 and causing the pivot pin assembly 970 to pivot about the pivot axis 986 from the first position shown in FIG. 48 toward the second position shown in FIG. 52.

Figure 52:
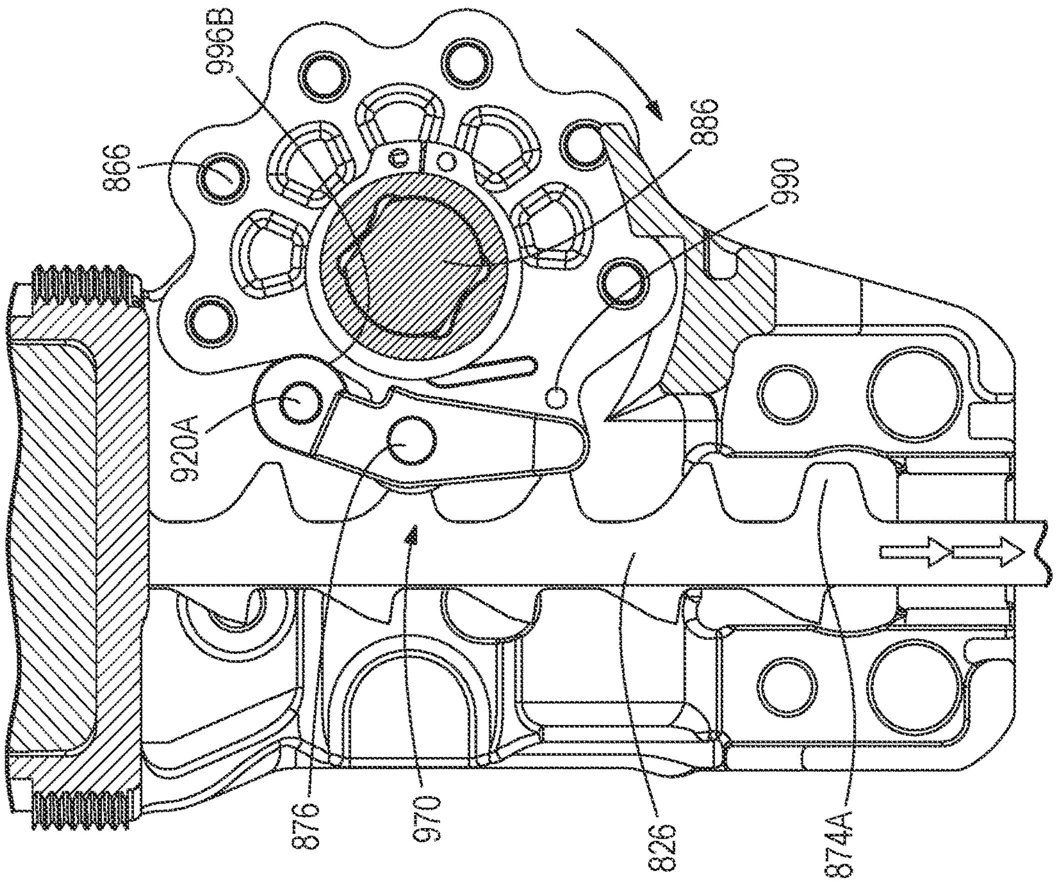
FIG. 52 is yet still another front cross-sectional view of the lifter assembly of FIG. 39 illustrating the continued rotation of the lifter and the pivot pin assembly of FIG. 44 in the second position.
Figure 51:
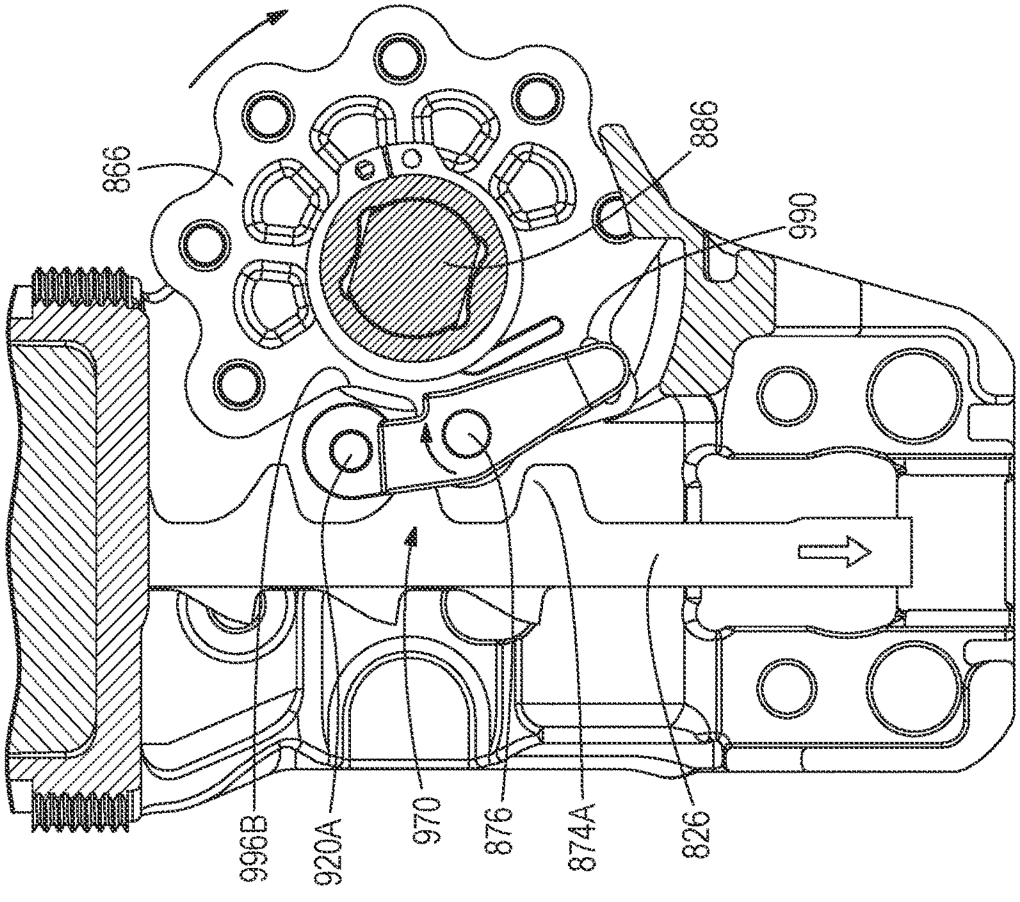
FIG. 51 is yet another front cross-sectional view of the lifter assembly of FIG. 29 illustrating the pivot pin assembly of FIG. 44 in the second position after the driver blade has reached the TDC position.

As shown in FIGS. 51-52, the last lifter roller 921A has rotated past the lowermost tooth 874A such that there is no contact between the last lifter roller 921A and the driver blade 826, and the driver blade 826 is moved toward the BDC position by the force of the compressed gas. As such, there is no longer any reaction torque imparted on the pivot pin assembly 970 by the driver blade 826 and the pivot pin assembly 970 remains in the second position as the driver blade 826 is moved toward the BDC position, and then from the BDC position toward the TDC position again.

During a driving cycle in which a fastener is discharged into a workpiece, the lifter 866 returns the piston and the driver blade 826 from the BDC position toward the TDC position (FIGS. 39 and 46-47). In particular, the pivot pin assembly 970 (and the last lifter roller 921A) is in the second position when returning the driver blade 826 from the BDC position toward the TDC position. The detent assembly 988 releasably couples the second end 984 of the pivot arm 972 to the second recess 992. Before the driver blade 826 reaches the TDC position, the engagement member 998 engages the second end 984 of the pivot arms 972, 974, thereby causing the pivot pin assembly 970 to pivot about the pivot axis 986 from the second position toward the first position against the bias of the detent assembly 988. The first stop member 996A engages with the first pivot arm 972 proximate the second end 984, thereby limiting the pivoting movement of the pivot pin assembly 970. Subsequently, the detent assembly 988 releasably couples the second end 984 of the first pivot arm 972 to the first recess 990, thereby maintaining the pivot pin assembly 970 into the first position.

As the driver blade 826 approaches the TDC position, the lowermost tooth 874A engages the last lifter roller 921A, and the reaction torque T1A exerted on the pivot pin assembly 970 by the drive blade 826 is oriented in a counter-clockwise direction (from the frame of reference of FIG. 49). When the driver blade 826 reaches the TDC position, the orientation of the reaction torque exerted on the pivot pin assembly 970 by the driver blade 826 is reversed (i.e., by the change in direction of the contact normal G1 between the lowermost tooth 874A and the last lifter roller 921A to above the pivot axis 986 of the pivot pin assembly 970) such that the reaction torque T2A is oriented in clockwise direction (from the frame of reference of FIG. 50), thereby overcoming the biasing force of the detent assembly 988 and rotating the pivot pin assembly 970 from the first position toward the second position. Thereafter, the pivot pin assembly 970 no longer engages the driver blade 826, and the piston and the driver blade 826 are thrust downward toward the BDC position by the compressed air (e.g., in the cylinder 18 above the piston, FIG. 2). Therefore, due to the kickout arrangement 936, the last lifter roller 921A may "kick out" or move relatively quickly out of the way of the driver blade 826 (i.e., lowermost tooth 874A) after the driver blade 826 reaches the TDC position.

Upon a fastener being driven into a workpiece, the driver blade 826 is in the driven or BDC position. Additionally, the second stop member 996B has limited the movement of the pivot pin assembly 970 relative to the second recess 992 such that the detent assembly 988 engages the second recess 992 and maintains the pivot pin assembly 970 in the second position. Thereafter, the continued driving of the drive unit (e.g., drive unit 40, FIG. 2) rotates the lifter 866 for returning the driver blade 826 toward the TDC position. Similar to FIGS. 1-7 of the first embodiment, a controller may deactivate the drive unit when the driver blade 826 is in the ready position. The driver blade 826 (and the piston) is held in the ready position until released by user activation of a trigger (trigger 58, FIG. 1), which initiates another driving cycle.

In particular, when the lifter 866 is moving the driver blade 826 toward the TDC position, forces (from the gas being compressed in the cylinder 18) act on the drive teeth 874. The forces are at a maximum on the lowermost tooth 874A as the driver blade 826 approaches the TDC position such that the lowermost tooth 874A may experience a high amount of wear by sliding contact with the last lifter roller 921A as the last lifter roller 921A rotates past the lowermost tooth 874A. The kickout arrangement 936 is configured to permit limited movement of the pivot pin assembly 970 (i.e., the last lifter pin 920A and roller 921A) between the first position and the second position such that the last lifter roller 921A is moved quickly out of the way of the drive blade 826 to release the driver blade 826 and initiate a fastener driving operation, thereby reducing wear on the lifter 866 (i.e., the last lifter roller 921A) and damage that might otherwise be caused to the drive unit by a momentary reaction torque applied to the drive unit as the driver blade 826 reaches the TDC position.

FIGS. 53-58 illustrate a sixth embodiment of a kickout arrangement 1136 of a lifter assembly 1088, with like components and features as the embodiment of the lifter assembly 88 of the fastener driver 10 shown in FIGS. 1-7 being labeled with like reference numerals plus "1000". The lifter assembly 1088 is utilized for a fastener driver similar to the fastener driver 10 of FIGS. 1-7 and, accordingly, the discussion of the fastener driver 10 above similarly applies to the kickout arrangement 1136 of the lifter assembly 1088 and is not re-stated. Rather, only differences between the kickout arrangement 136 and of the lifter 66 of FIGS. 1-7 and the kickout arrangement 1136 and the lifter 1066 of FIGS. 53-58 are specifically noted herein, such as differences in a last one of the lifter pins.

Figure 53:
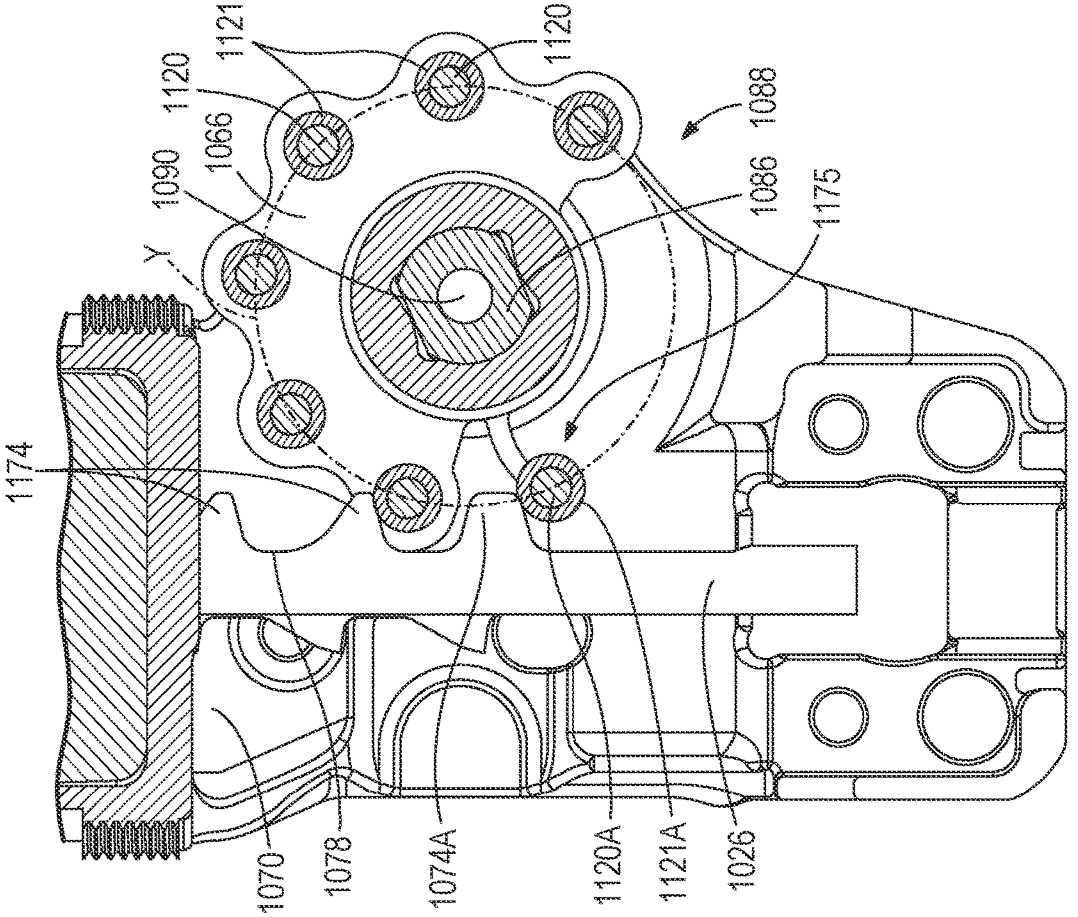
FIG. 53 is a front cross-sectional view of a lifter assembly in accordance with a sixth embodiment of the invention, illustrating a driver blade of the powered fastener driver nearing a TDC position.
Figure 56:
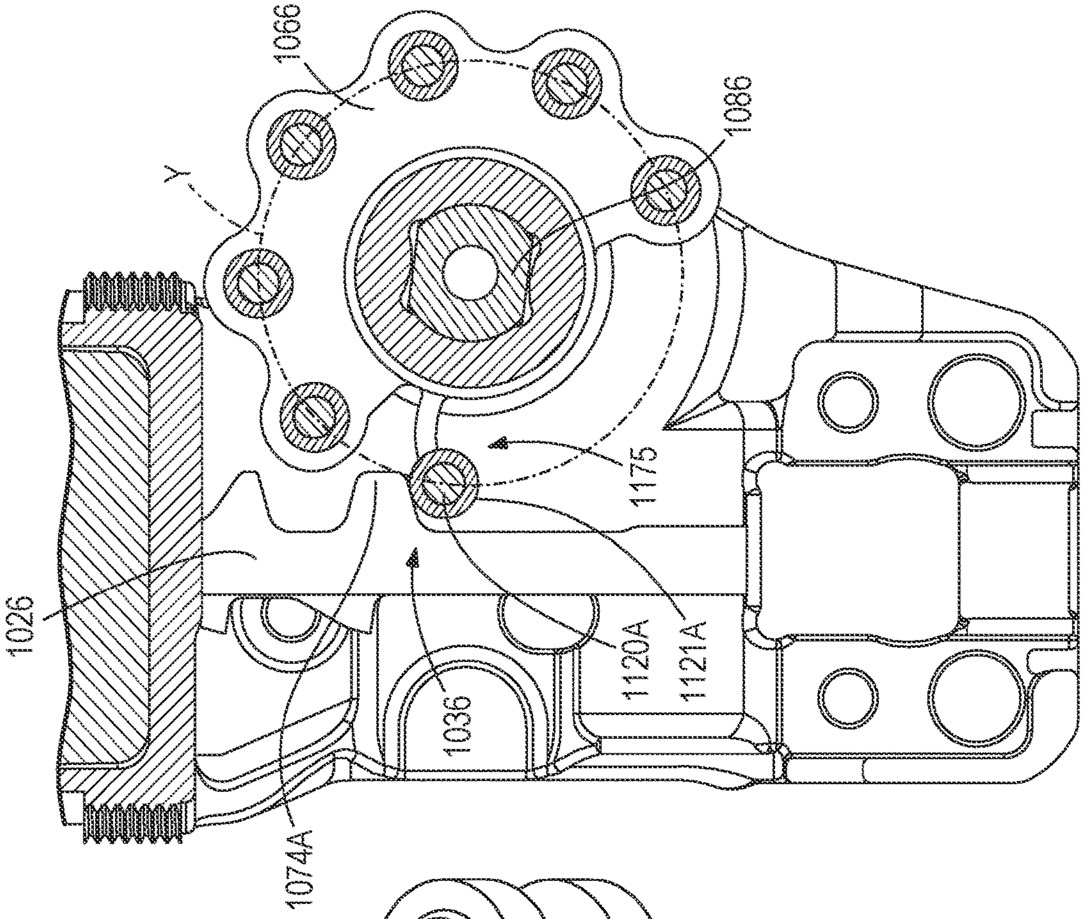
FIG. 56 is a front cross-sectional view of the lifter assembly of FIG. 53 illustrating a lowermost tooth of the driver blade of FIG. 53 engaging a last lifter roller of the lifter of FIG. 54.

With reference to FIG. 53, the driver blade 1026 includes a plurality of lift teeth 1074 formed along an edge 1078 of the driver blade 1026. Further, the powered fastener driver includes a frame 1070 positioned within a housing (e.g., housing 30, FIG. 1). The frame 1070 is configured to support the lifter assembly 1088 within the housing.

Figure 54:
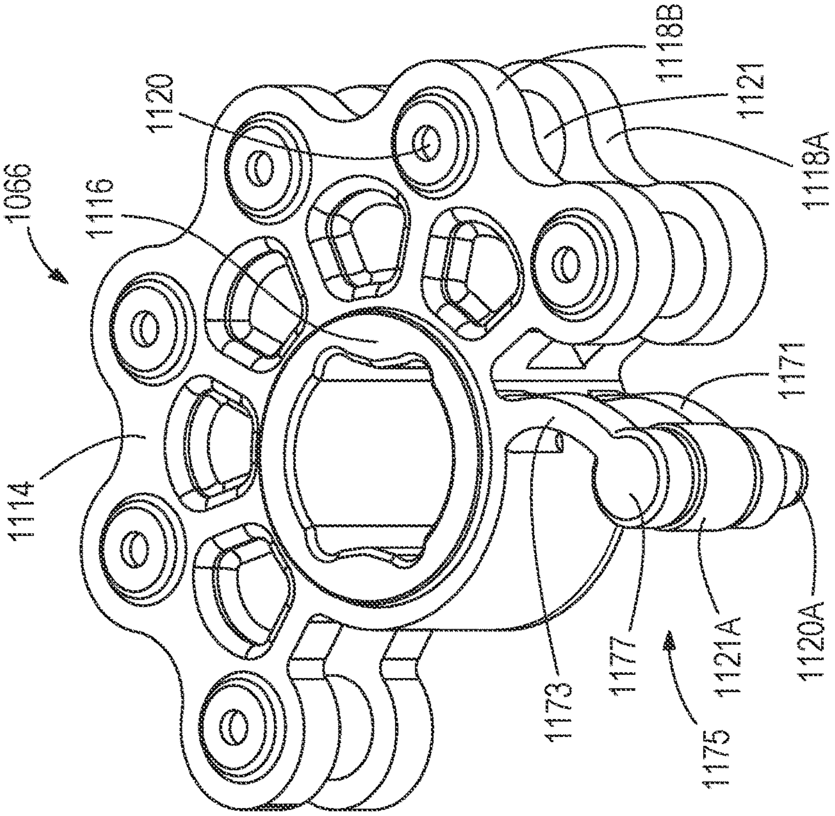
FIG. 54 is a perspective of a portion of the lifter assembly of FIG. 53 illustrating a lifter of a first construction of the lifter assembly.

With reference to FIGS. 53-54, the lifter assembly 1088 includes a drive unit (e.g., drive unit 40 of FIG. 2) having an output shaft 1086, and a lifter 1066 coupled for co-rotation with the output shaft 1086. The output shaft 1086 defines a rotational axis 1090. The lifter 1066 includes a hub 1116, a plurality of pins 1120 extending between flanges 1118A, 1118B (FIG. 54) of a body 1114 of the lifter 1066 (except for a last lifter pin 1120A), and rollers 1121 supported upon the pins 1120. Each roller 1121 is rotatably supported on the respective pin 1120. Further, the rollers 1121 sequentially engage the lift teeth 1074 formed on the driver blade 1026 as the driver blade 1026 is returned from the BDC position toward the TDC position.

The last lifter pin 1120A (and last lifter roller 1121A) is cantilevered from the hub 1116. In the illustrated embodiment, the lifter 1066 includes a first arm 1171 and a second arm 1173 extending from the first flange 1118A and the second flange 1118B, respectively. Each of the first arm 1171 and the second arm 1173 is a leaf spring to form a leaf spring assembly 1175. The last lifter pin 1120A and roller 1121A are supported at an end 1177 of the leaf spring assembly 1175. A cover (not shown) may fixedly couple the last lifter pin 1120A to the end 1177 of the leaf spring assembly 1175.

As shown in FIG. 53, the plurality of lifter pins 1120, including the last lifter pin 1120A, are located on a circumference Y of the lifter 1066 relative to the rotational axis 1090. A combination of the leaf spring assembly 1175 and a lowermost tooth 1074A of the driver blade 1026 defines a kickout arrangement 1136 located between the lifter 1066 and the driver blade 1026. As explained in greater detail below, the last lifter pin 1120A and roller 1121A are movable relative to the lifter 1066 such that the last lifter pin 1120A and roller 1121A are no longer located on the circumference Y.

Figure 55:
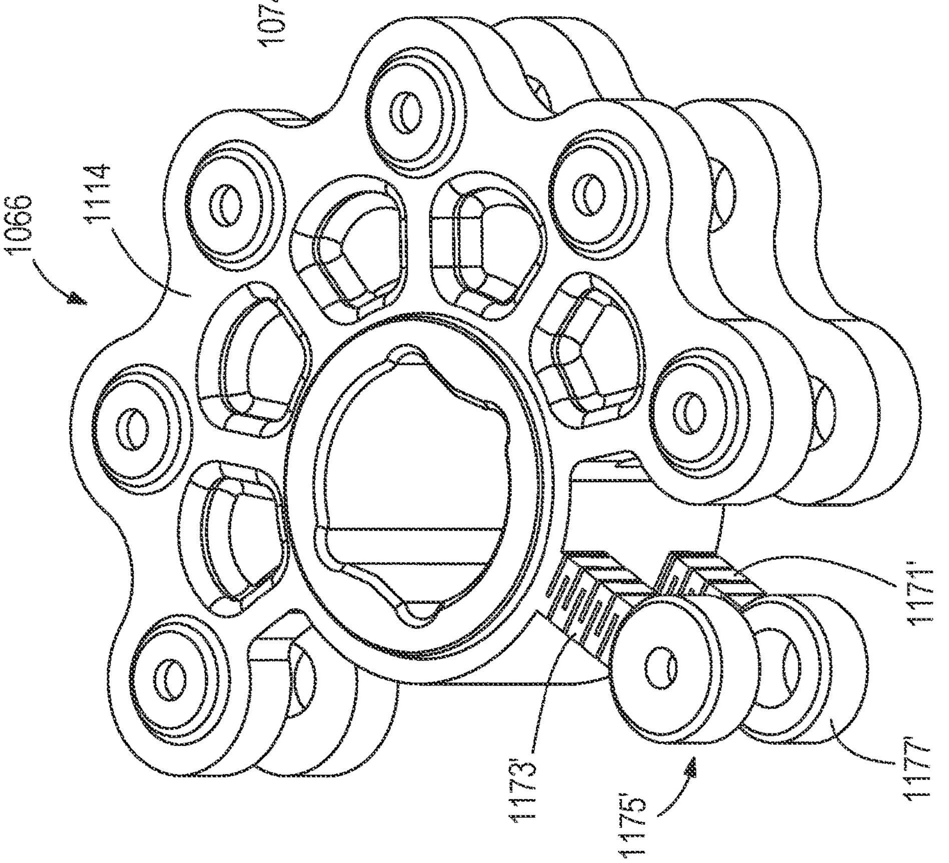
FIG. 55 is a perspective view of a portion of the lifter assembly of FIG. 53 illustrating a lifter of a second construction of the lifter assembly.
Figure 57:
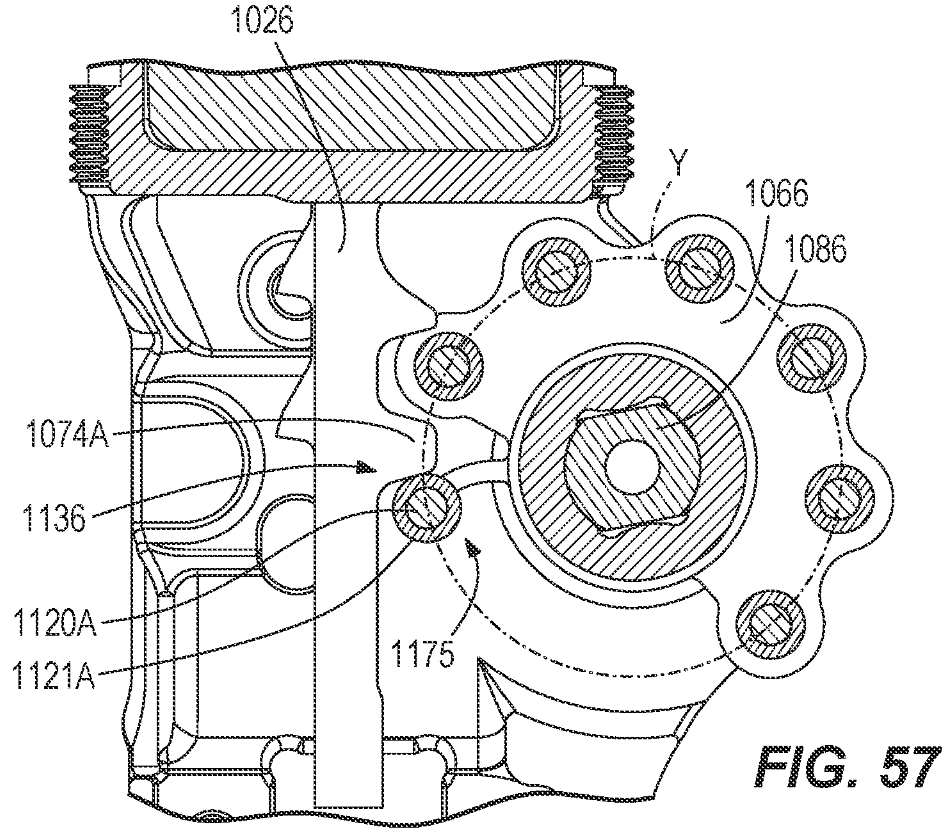
FIG. 57 is another front cross-sectional view of the lifter assembly of FIG. 53, illustrating the last lifter roller of FIG. 56 in a first position relative to the lifter.
Figure 58:
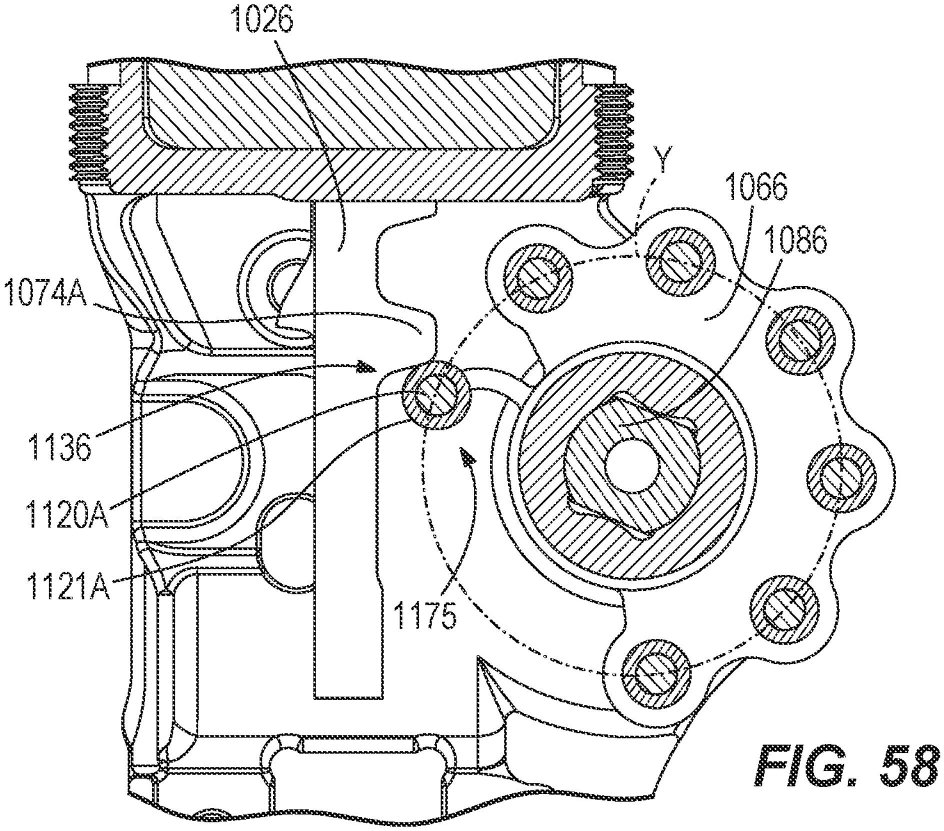
FIG. 58 is yet another front cross-section view of the lifter assembly of FIG. 53 illustrating the driver blade at the TDC position.

With reference to FIG. 55, in alternative embodiments, each of the first arm 1171' and the second arm 1173' is configured to include multiple bends to form the leaf spring assembly 1175'.

With reference to FIGS. 53 and 56-58, the last lifter roller 1121A is movable relative to the hub 1116 between a first position (FIG. 53), in which the last lifter roller 1121A (and pin 1120A) is located on the circumference Y defined by the lifter 1066, and a second position, in which the last lifter roller 1121A (and pin 1120A) is deflectable (e.g., radially inward from the frame of reference of FIG. 58) relative to the rotational axis 1090. The last lifter roller 1121A is in the first position relative to the lifter 1066 when returning the driver blade 1026 from the BDC position toward the TDC position. The last lifter roller 1121A is deflectable from the first position into the second position after the driver blade 1026 reaches the TDC position.

More specifically, the leaf spring assembly 1175 is selected having a stiffness sufficient to apply a predetermined force necessary to the leaf spring assembly 1157 to maintain the last lifter pin 1120A and roller 1121A in the first position until the driver blade 1026 reaches the TDC position. In particular, as the driver blade 1026 is returned from the BDC position toward the TDC position, reaction forces (from gas being compressed in the cylinder 18) act on the driver teeth 1074. A resultant reaction force from these forces is applied to the rotary lifter 1066 (i.e., the lifter pins 1120) as the lifter 1066 approaches the TDC position. As the lifter 1066 approaches the TDC position, the forces increase toward a maximum force on a lower most tooth 1074A such that the reaction force increases to a maximum value that is greater than the predetermined force of the leaf spring assembly 1175. As such, after the lifter 1066 reaches the TDC position, the resultant reaction force from the driver blade 1026 on the lifter 1066 (i.e. the last lifter roller 321A) exceeds the predetermined force of the leaf spring assembly 1175, and the last lifter roller 1121A is moved from the first position toward the second position against the bias of the leaf spring assembly 1175. As the driver blade 1026 is driven from the TDC position to the BDC position, the driver blade 1026 no longer contacts the lifter 1066 to apply the reaction force, and as such the leaf spring assembly 1175 rebounds to return the last lifter roller 1121A from the second position to the first position relative to the output shaft 1086.

During a driving cycle in which a fastener is discharged into a workpiece, the lifter 1066 returns the piston and the driver blade 1026 from the BDC position toward the TDC position. In particular, the last lifter roller 1121A is in the first position when returning the driver blade 1026 from the BDC position toward the TDC position. After the driver blade 1026 reaches the TDC position, the reaction force reaches the maximum value, thereby exceeding the predetermined force of the leaf spring assembly 1175 and adjusting the last lifter roller 1121A from the first position to the second position.

Subsequently, the last lifter roller 1121A of the lifter 1066 moves away from the lowermost tooth 1074A of the driver blade 1026 to release the driver blade 1026. Thereafter, the lifter 1066 no longer engages the driver blade 1026, and the piston and the driver blade 1026 are thrust downward toward the BDC position by the compressed air (e.g., in the cylinder 18 above the piston, FIG. 2). As the driver blade 1026 is displaced toward the BDC position, the driver blade 1026 no longer contacts the lifter 1066 to apply the reaction force, and the leaf spring assembly 1175 rebounds to move the last lifter roller 1121A from the second position toward the first position again (e.g., radially outward from the frame of reference of FIG. 58). Therefore, due to the kickout arrangement 1136, the last lifter roller 1121A may “kick out” or move relatively quickly out of the way of the driver blade 1026 (i.e., lowermost tooth 1074A) after the driver blade 1026 reaches the TDC position.

Upon a fastener being driven into a workpiece, the driver blade 1026 is in the driven or BDC position. Additionally, the leaf spring assembly 1175 applies the biasing force to move the last lifter pin 1120A and roller 1121A from the second position toward the first position. Thereafter, the continued driving of the drive unit (e.g., drive unit 40, FIG. 2) rotates the lifter 1066 for returning the driver blade 1026 toward the TDC position. Similar to FIGS. 1-7 of the first embodiment, a controller may deactivate the drive unit when the driver blade 1026 is in the ready position. The driver blade 1026 (and the piston) is held in the ready position until released by user activation of a trigger (trigger 58, FIG. 1), which initiates another driving cycle.

In particular, when the lifter 1066 is moving the driver blade 1026 toward the TDC position, the forces (from the gas being compressed in the cylinder 18) act on the lowermost tooth 1074A as the driver blade 1026 approaches the TDC position such that the lowermost tooth 1074A may experience a high amount of wear by sliding contact with the last lifter roller 1121A as the last lifter roller 1121A rotates past the lowermost tooth 1074A. The kickout arrangement 1136 is configured to permit limited movement of the last lifter roller 1121A relative to the lifter 1066 between the first position and the second position such that the last lifter roller 1121A is moved quickly out of the way of the drive blade 1026 to release the driver blade 1026 and initiate a fastener driving operation, thereby reducing wear on the lifter 1066 (i.e., the last lifter roller 1121A) and damage that might otherwise be caused to the drive unit by a momentary reaction torque applied to the drive unit as the driver blade 1026 reaches the TDC position.

Figure 59:
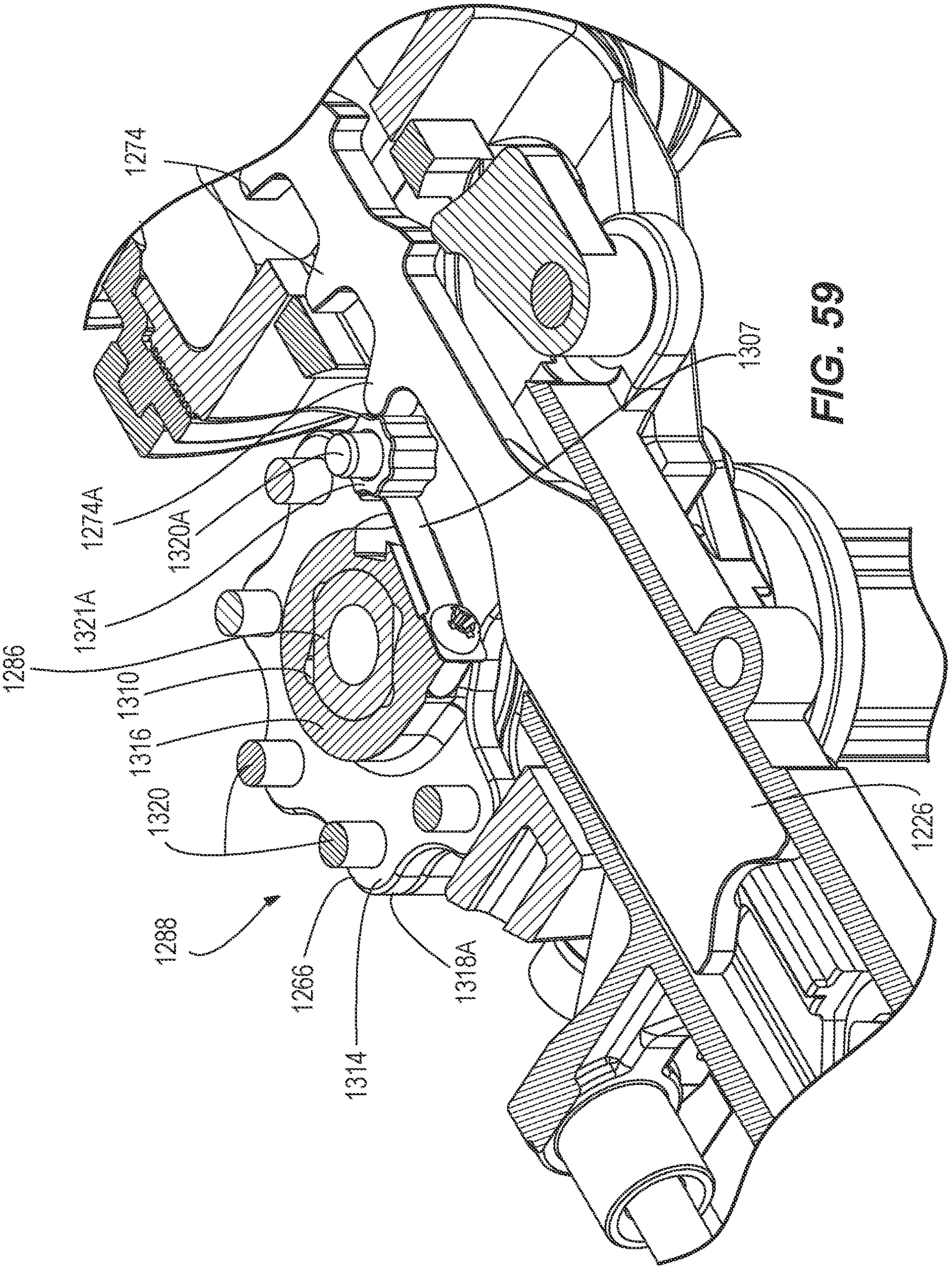
FIG. 59 is a perspective cross-sectional view of a portion of a powered fastener driver illustrating a lifter assembly in accordance with another embodiment of the invention.
Figure 61A:
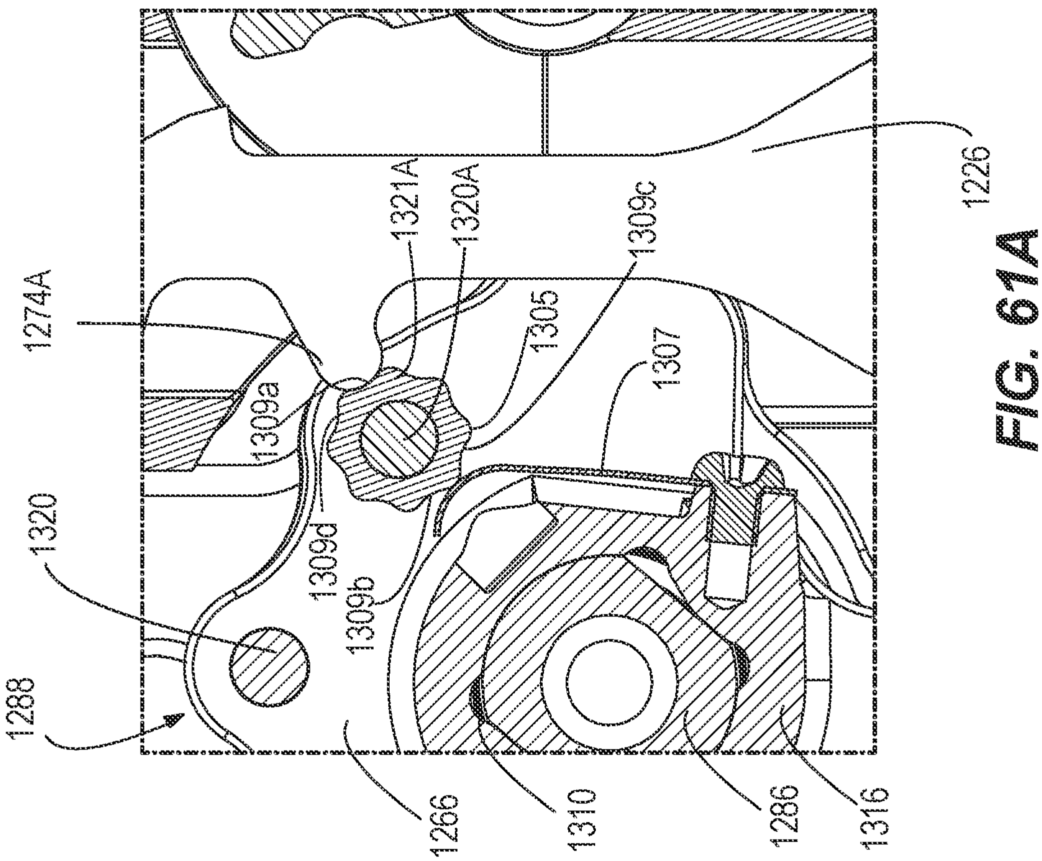
FIG. 61A is another front cross-sectional view of the lifter assembly of FIG. 59 illustrating the lifter roller rotated towards an intermediate rotational orientation, which compresses a biasing member prior to the driver blade reaching TDC.
Figure 60:
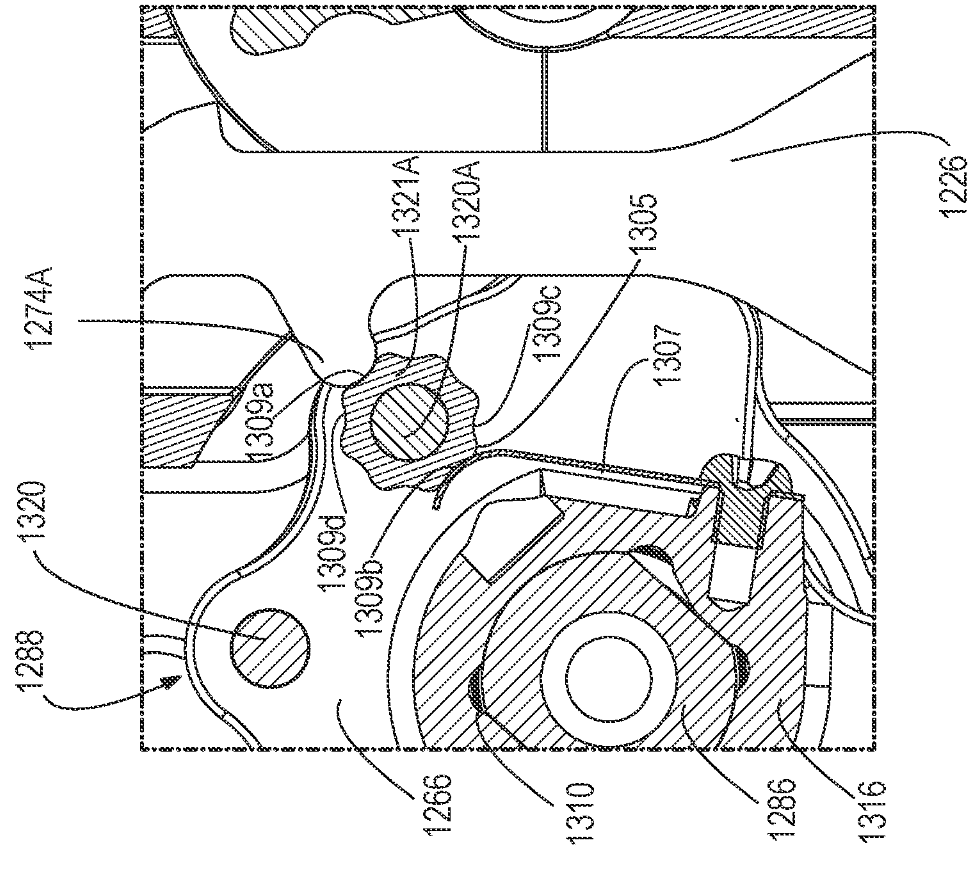
FIG. 60 is a front cross-sectional view of the lifter assembly of FIG. 59 illustrating a means for aligning a lifter roller with a lowermost tooth of a driver blade to facilitate meshing between the lowermost tooth and the lifter roller.
Figure 61B:
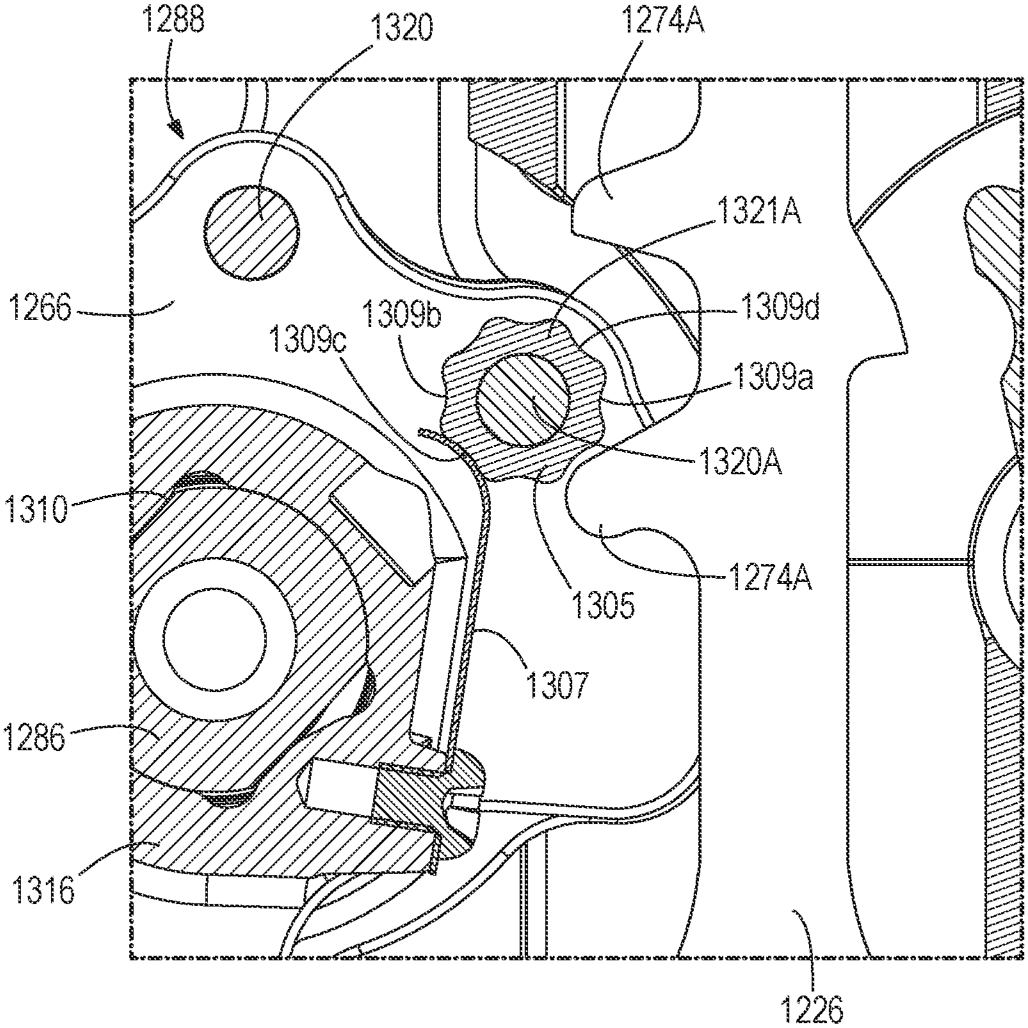
FIG. 61B is another front cross-sectional view of the lifter assembly of FIG. 59 illustrating the lifter roller rotated towards a second rotational orientation, where the driver blade is released and moving towards BDC.

FIGS. 59-61B illustrate a seventh embodiment of a lifter assembly 1288, with like components and features as the embodiment of the lifter assembly 88 of the fastener driver 10 shown in FIGS. 1-7 being labeled with like reference numerals plus "1200". The lifter assembly 1288 is utilized for a fastener driver similar to the fastener driver 10 of FIGS. 1-7 and, accordingly, the discussion of the fastener driver 10 above similarly applies to the lifter assembly 1288 and is not re-stated. Rather, only differences between the lifter assembly 88 of FIGS. 1-7 and the lifter 1266 of FIGS. 59-61 are specifically noted herein, such as differences in a last one of the lifter pins.

The lifter 1266 includes a body 1314 having a hub 1316 through which an aperture 1310 extends, a first flange 1318A radially extending from one end of the hub 1316, and a second flange (not shown) radially extending from an opposite end of the hub 1316 and spaced from the first flange 1318A. Further, the lifter 1266 includes a plurality of pins 1320 extending between the flanges 1318A and at least one roller 1321A supported upon at least one of the pins 1320. The roller 1321A or the pins 1320 sequentially engage the lift teeth 1274 formed on the driver blade 1226 as the driver blade 1226 is returned from the BDC position toward the TDC position. In the illustrated embodiment, the last lifter pin 1320A of the lifter 1266 includes the roller 1321A. In other embodiments, each pin 1320 may include a roller.

The roller 1321A includes a non-cylindrical outer peripheral surface having one or more engagement sections 1309*a*-*d* (FIGS. 60, 61A, and 61B) that may be aligned and engageable with the last tooth 1274A of the driver blade 1226 for holding the driver blade 1226 in a ready position prior to initiating a fastener driving operation. For example, the roller 1321A includes a plurality of radial protrusions 1305 that define valleys therebetween, which form the engagement sections 1309*a*-*d* of the roller 1321A. The construction of the roller 1321A reduces stress on the driver blade tooth 1274A and the last roller 1321A when holding the driver blade 1226 at the ready/TDC position. In the illustrated embodiment, the roller 1321A includes a plurality of valleys. For example, the roller 1321A may include eight valleys. In other embodiments, the roller 1321A may include more or fewer valleys.

Now with reference to FIGS. 59-61B, the lifter 1266 also includes a means for aligning one of the engagement section 1309*a*-*d* of the roller 1321A with the last blade tooth 1274A to facilitate re-meshing between the last blade tooth 1274A and one of the engagement sections 1309*a*-*d* of the roller 1321A. In the illustrated embodiment, the means for aligning the engagement section 1309*a*-*d* positions the roller 1321A in a first rotational orientation (e.g., relative to the pin 1320A, FIG. 60) so a first engagement section 1309*a* of the roller 1321A is aligned with the last blade tooth 1274A. Further, the means for aligning includes a biasing member 1307 having a first end coupled to the hub 1316 of the lifter 1266 and a second end in engagement with a second engagement section 1309*b* of the roller 1321A. In particular, the biasing member 1307 is a leaf spring and engages the second engagement section 1309*b*, which is 180 degrees from the first engagement section 1309*a*.

Without the means for aligning the roller 1321A, the blade tooth 1274A may the contact one of the protrusion 1305 of the last lifter roller 1321A if the roller 1321A is not in the desired rotational orientation, which may increase stress on the driver blade 1226 and/or the roller 1321A. As shown in FIG. 60, the biasing member 1307 is configured to limit the rotational movement of the roller 1321A to facilitate proper meshing between the last blade tooth 1274A and the roller 1321A. In other words, the biasing member 1307 biases the roller 1321A toward a desired or first rotational orientation to ensure the last tooth 1274A on the driver blade 1226 engages the engagement section 1309*a* between adjacent radial protrusions 1305 instead of the protrusion 1305 itself.

As shown in FIGS. 60, 61A, and 61B, the biasing member 1307 may be preloaded and the force of the biasing member 1307 prevents the roller 1321A from rotating when the driver blade tooth 1274A is moving from TDC to BDC (FIG. 60). As the driver blade 1226 approaches TDC (FIG. 61A), the roller 1321A overcomes the force of the biasing member 1307, which allows the roller 1321A to move against the bias of the biasing member 1307.

For example, during a driving cycle in which a fastener is discharged into a workpiece, the lifter 1266 returns the piston and the driver blade 1226 from BDC towards TDC. In particular, the last lifter roller 1321A is in the first rotational orientation (FIG. 60) when returning the driver blade 1226 from the BDC towards TDC. As the driver blade 1226 approaches TDC, the reaction force reaches the maximum value, thereby exceeding the predetermined force of the biasing member 1307 and adjusting the last lifter roller 1321A from the first rotational orientation (FIG. 60) to an intermediate rotational orientation (FIG. 61A), and then to a second rotational orientation (FIG. 61B). In the intermediate rotational orientation, the second end of the biasing member 1307 is compressed and moves over the protrusion 1305 of the roller 1321A. Once the driver blade 1226 reaches TDC, the last tooth 1274 of the blade 1226 is released (FIG. 61B) so the driver blade 1226 can move towards BDC. Concurrently, the biasing member 1307 engages a third engagement section 1309*c*, which restricts further movement of the roller 1321A and aligns a fourth engagement section 1309*d* with the end portion of the last blade tooth 1274A to facilitate re-meshing between the last blade tooth 1274A and the fourth engagement section 1309*d* for a subsequent fastener driving event. In the illustrated embodiment, the third engagement section 1309*c* is positioned directly adjacent the second engagement section 1309*b* and the fourth engagement section 1309*d* is positioned directly adjacent the first engagement section 1309*a*. In other embodiments, the biasing member 1307 may traverse one or more engagement sections during the fastener driving event.

Figure 62:
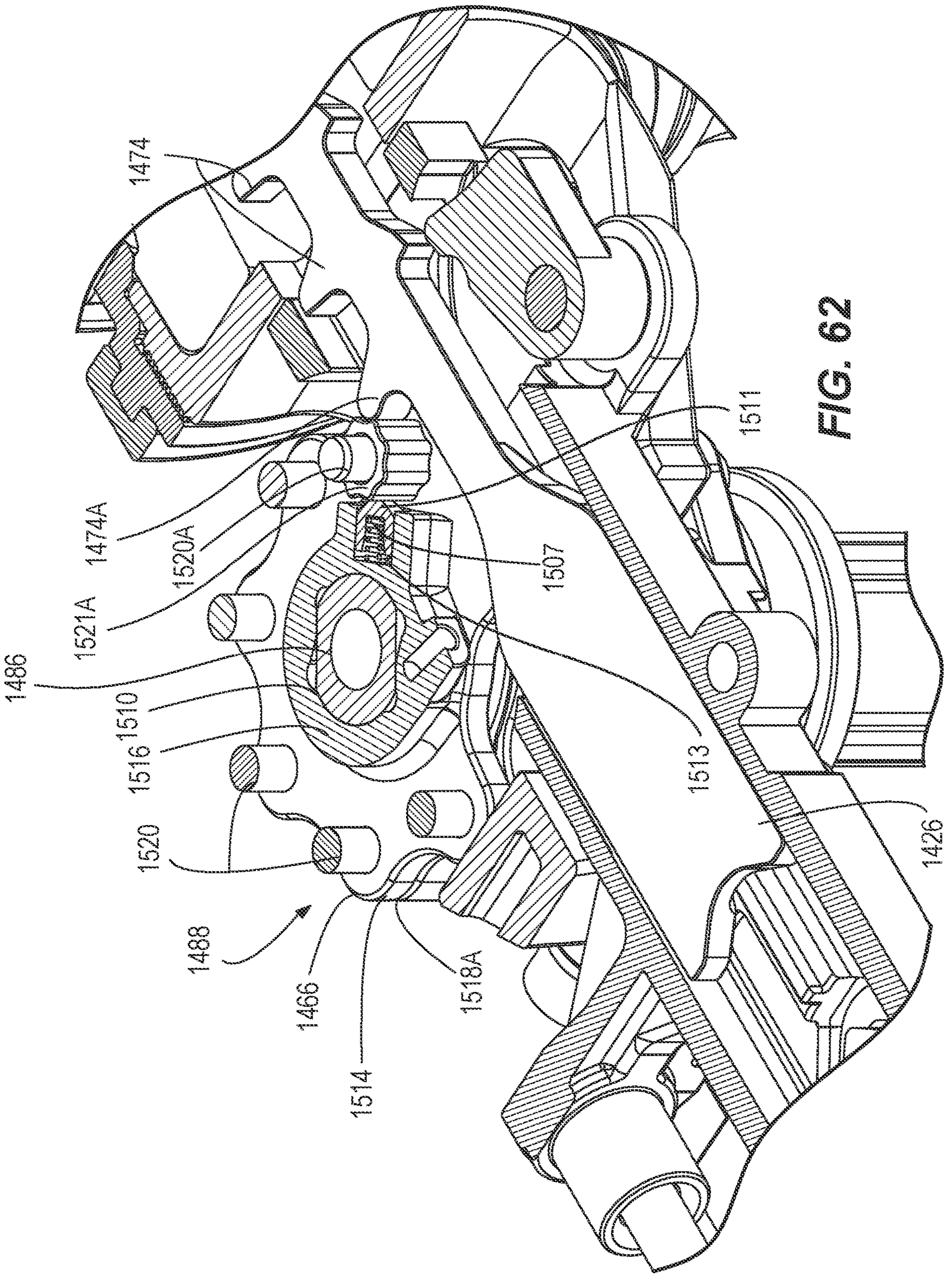
FIG. 62 is a perspective cross-sectional view of a portion of a powered fastener driver illustrating a lifter assembly in accordance with another embodiment of the invention.
Figure 63:
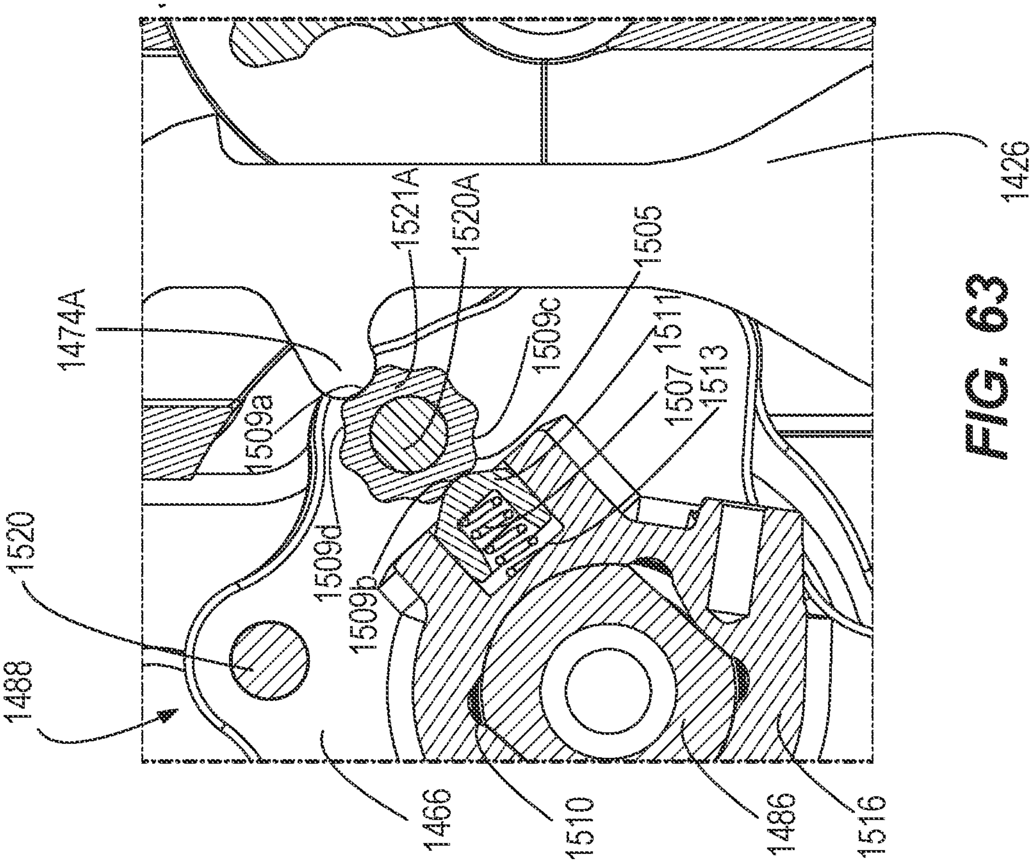
FIG. 63 is a front cross-sectional view of the lifter assembly of FIG. 62 illustrating a means for aligning a lifter roller with a lowermost tooth of a driver blade to facilitate meshing between the lowermost tooth and the lifter roller according to another embodiment of the invention.

FIG. 62-64 illustrate an eighth embodiment of a lifter assembly 1488, with like components and features as the embodiment of the lifter assembly 88 of the fastener driver 10 shown in FIGS. 1-7 being labeled with like reference numerals plus "1400". The lifter assembly 1488 is utilized for a fastener driver similar to the fastener driver 10 of FIGS. 1-7 and, accordingly, the discussion of the fastener driver 10 above similarly applies to the lifter assembly 1488 and is not re-stated. Rather, only differences between the lifter assembly 88 of FIGS. 1-7 and the lifter 1466 of FIGS. 62-64 are specifically noted herein, such as differences in a last one of the lifter pins.

The lifter 1466 includes a body 1514 having a hub 1516 through which an aperture 1510 extends, a first flange 1518A radially extending from one end of the hub 1516, and a second flange (not shown) radially extending from an opposite end of the hub 1516 and spaced from the first flange 1518A. Further, the lifter 1466 includes a plurality of pins 1520 extending between the flanges 1518A and at least one roller 1521A supported upon at least one of the pins 1520. The roller 1521A or the pins 1520 sequentially engage the lift teeth 1474 formed on the driver blade 1426 as the driver blade 1426 is returned from the BDC position toward the TDC position. In the illustrated embodiment, the last lifter pin 1520A of the lifter 1466 includes the roller 1521A. In other embodiments, each pin 1520 may include a roller.

The roller 1521A includes a non-cylindrical outer peripheral surface having one or more engagement sections that may be aligned and engageable with the last tooth 1474A of the driver blade 1426 for holding the driver blade 1426 in a ready position prior to initiating a fastener driving operation. For example, the roller 1521A includes a plurality of radial protrusions 1505 that define valleys therebetween, which forms the engagement sections 1509*a-d* of the roller 1521A. The construction of the roller 1521A reduces stress on the driver blade tooth 1474A and the last roller 1521A when holding the driver blade 1426 at the ready/TDC position. In the illustrated embodiment, the roller 1521A includes a plurality of valleys 1509.

Now with reference to FIGS. 62-64B, the lifter 1466 also includes a means for aligning one of the engagement section 1509*a-d* of the roller 1521A with the last blade tooth 1474A to facilitate re-meshing between the last blade tooth 1474A and one of the engagement sections 1509*a-d* of the roller 1521A. In the illustrated embodiment, the means for aligning the engagement section 1509*a-d* positions the roller 1521A in a first rotational orientation (e.g. relative to the pin 1520A, FIG. 63) so a first engagement section 1509*a* of the roller 1521A is aligned with the last blade tooth 1474A. Further, the means for aligning includes a biasing member 1507 and an engagement member 1511 (e.g., a ball pin) supported within a recess 1513 formed in the body 1514 of the lifter 1466. The biasing member 1507 urges the engagement member 1511 into contact with a second engagement section 1509*b* of the roller 1521A. In particular, the biasing member 1507 is a compression spring that biasing the engagement member 1511 into engagement with the second engagement section 1509*b*, which is 180 degrees from the first engagement section 1509*a*.

Figure 64A:
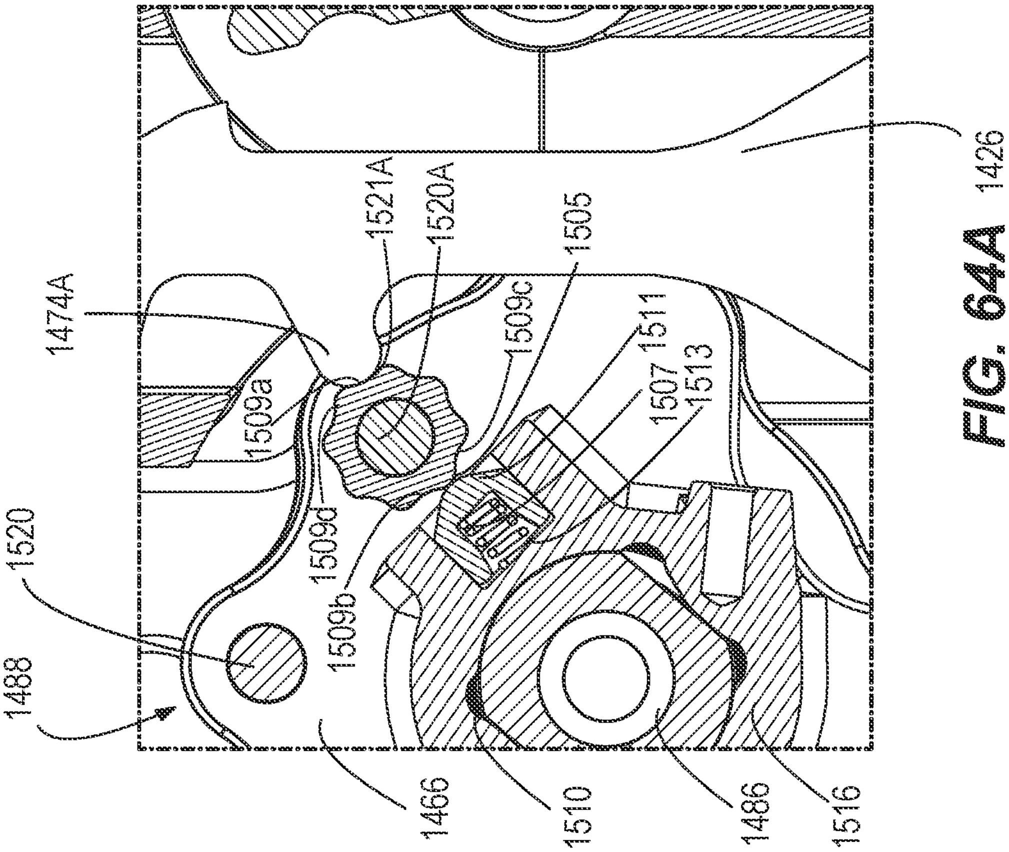
FIG. 64A is another front cross-sectional view of the lifter assembly of FIG. 62 illustrating the lifter roller rotated towards an intermediate rotational orientation, which compresses a biasing member prior to the driver blade reaching TDC.
Figure 64B:
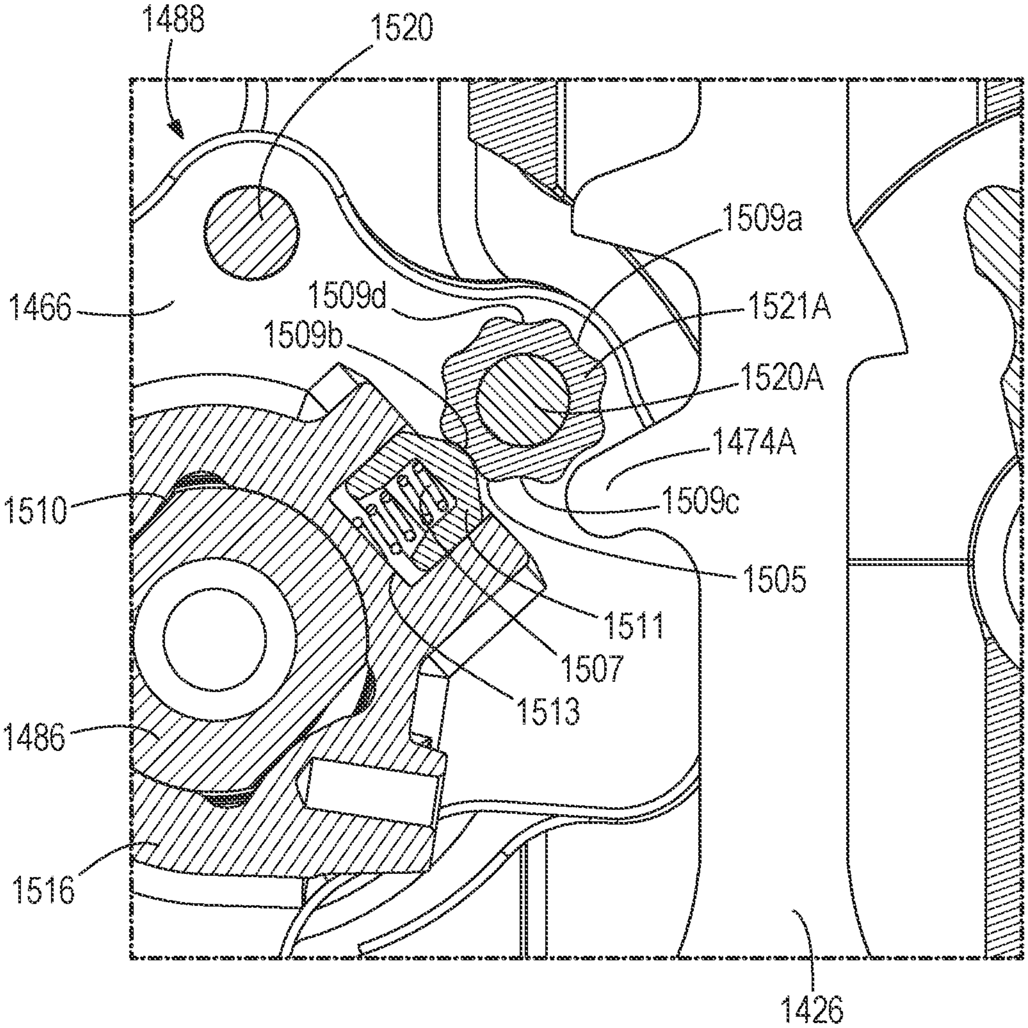
FIG. 64B is another front cross-sectional view of the lifter assembly of FIG. 62 illustrating the lifter roller rotated towards a second rotational orientation, where the driver blade is released and moving towards BDC.

As shown in FIGS. 63, 64A and 64B, the biasing member 1507 may be preloaded and the force of the biasing member 1507 urges the engagement member 1511 into engagement with the roller 1521A, which prevents the roller 1521A from rotating when the driver blade tooth 1574A is moving from TDC to BDC (FIG. 63). As the driver blade 1574A approaches TDC, the roller 1521A overcomes the force of the biasing member 1507, which allows the roller 1521A to move against the bias of the biasing member 1507.

For example, during a driving cycle in which a fastener is discharged into a workpiece, the lifter 1466 returns the piston and the driver blade 1426 from the BDC towards TDC. In particular, the last lifter roller 1521A is in the first position (FIG. 63) when returning the driver blade 1426 from BDC towards TDC. As the driver blade 1426 approaches TDC, the reaction force reaches the maximum value, thereby exceeding the predetermined force of the biasing member 1507 and adjusting the last lifter roller 1521A from the first rotational orientation (FIG. 63) to an intermediate rotational orientation (FIG. 64A), and to a second rotational orientation (FIG. 64B). In the intermediate rotational orientation, the engagement member 1511 compresses the biasing member 1507 within the recess 1513 so the engagement member 1511 can move over the protrusion 1505 of the roller 1521A. Once the driver blade 1226 reaches TDC, the last tooth 1474 of the blade 1426 is released (FIG. 64B) so the driver blade 1426 can move towards BDC. Concurrently, the engagement member 1511 engages a third engagement section 1509*c*, which restricts further movement of the roller 1521A and positions a fourth engagement section 1509*d* in the first rotational orientation to facilitate re-meshing between the last blade tooth 1474A and the fourth engagement section 1509*d* for a subsequent fastener driving event. In the illustrated embodiment, the third engagement section 1509*c* is positioned directly adjacent the second engagement section 1509*b* and the fourth engagement section 1509*d* is positioned directly adjacent the first engagement section 1509*a*. In other embodiments, the engagement member 1511 may traverse one or more engagement sections during the fastener driving event.

Figure 65:
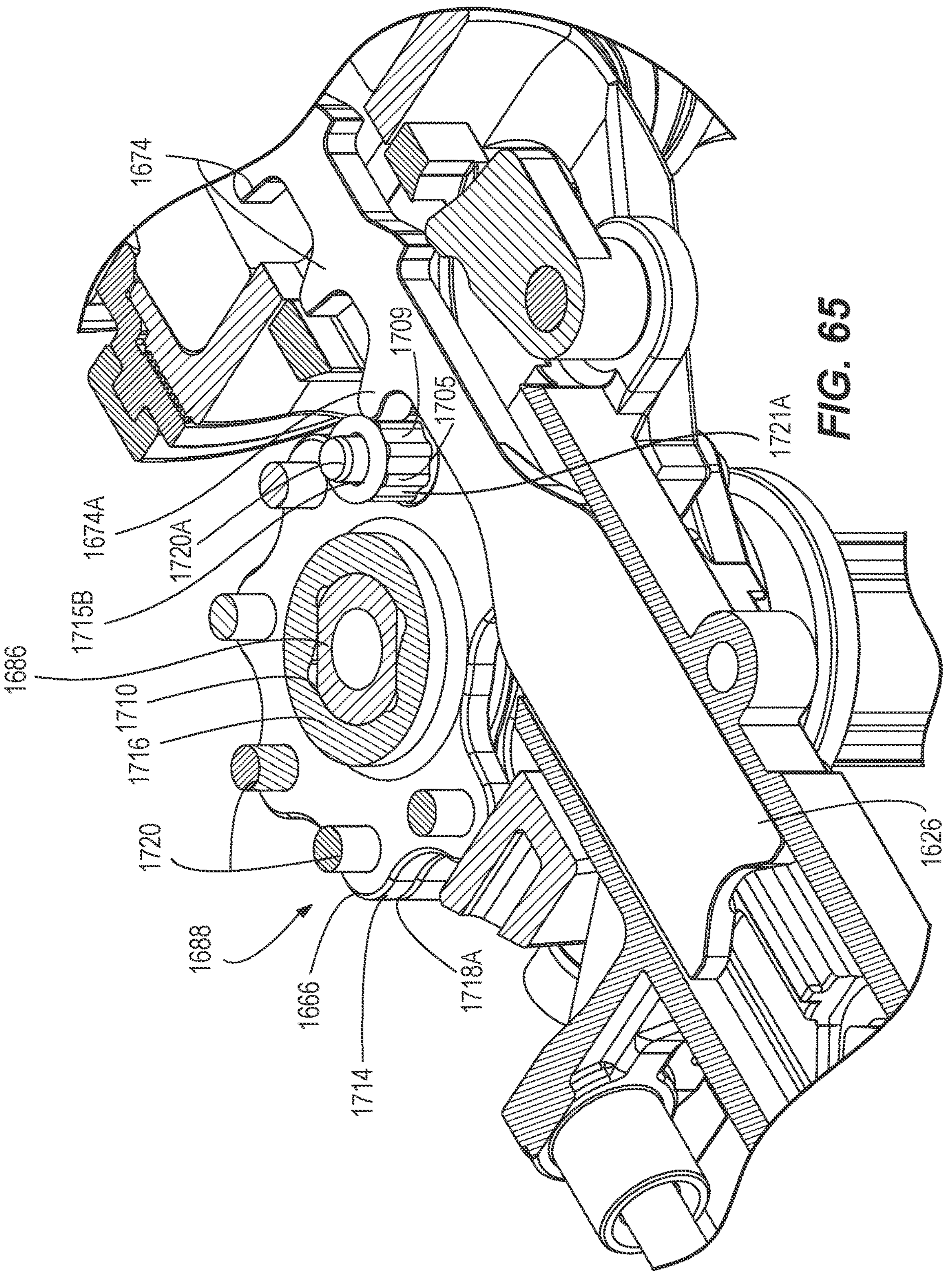
FIG. 65 is a perspective cross-sectional view of a portion of a powered fastener driver illustrating a lifter assembly in accordance with another construction of the invention.
Figure 66:
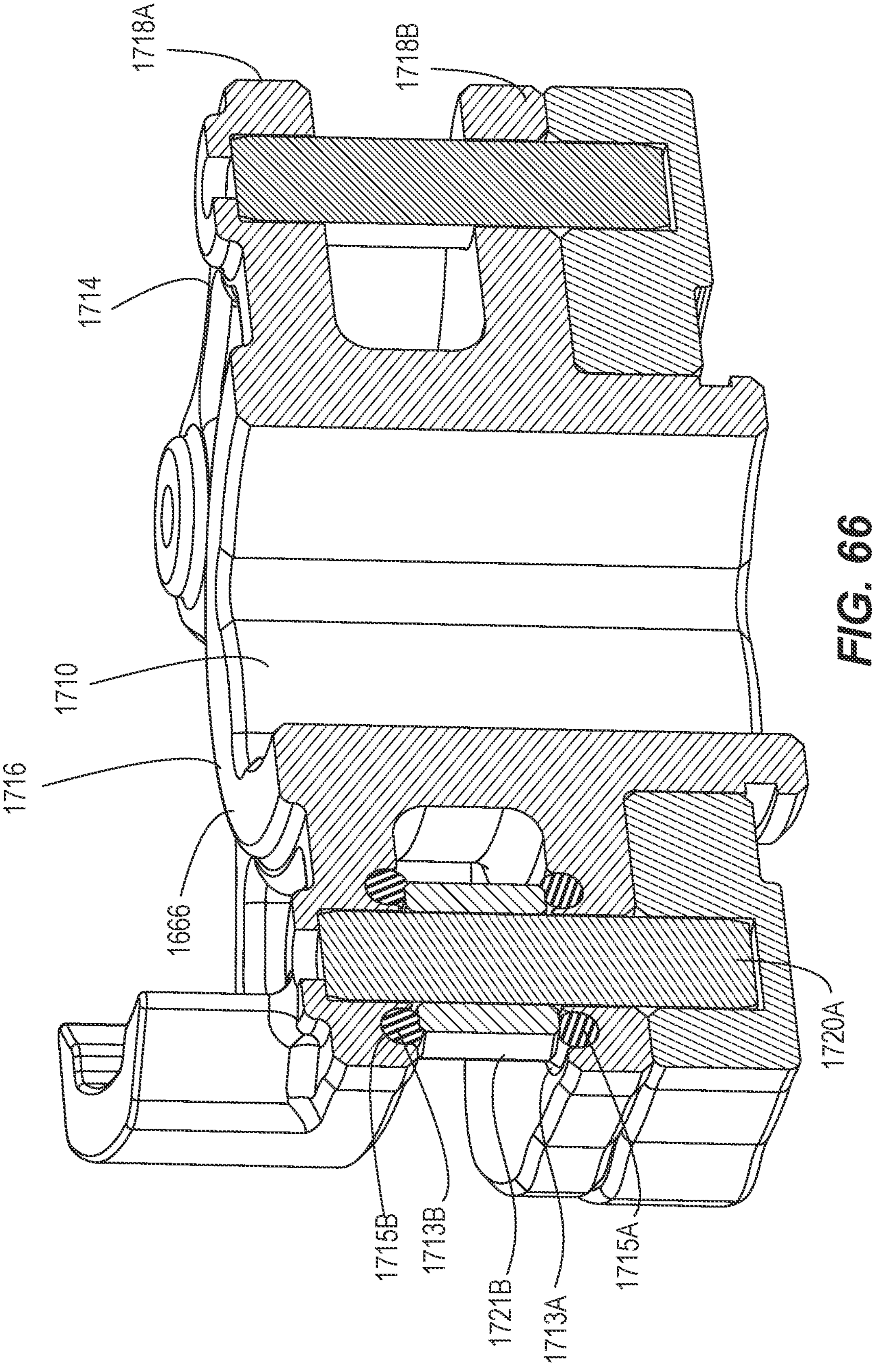
FIG. 66 is a cross-sectional view of a lifter of the lifter assembly of FIG. 65 illustrating a means for aligning a lifter roller with a lowermost tooth of a driver blade to facilitate meshing between the lowermost tooth and the lifter roller according to another embodiment of the invention.
Figure 67:
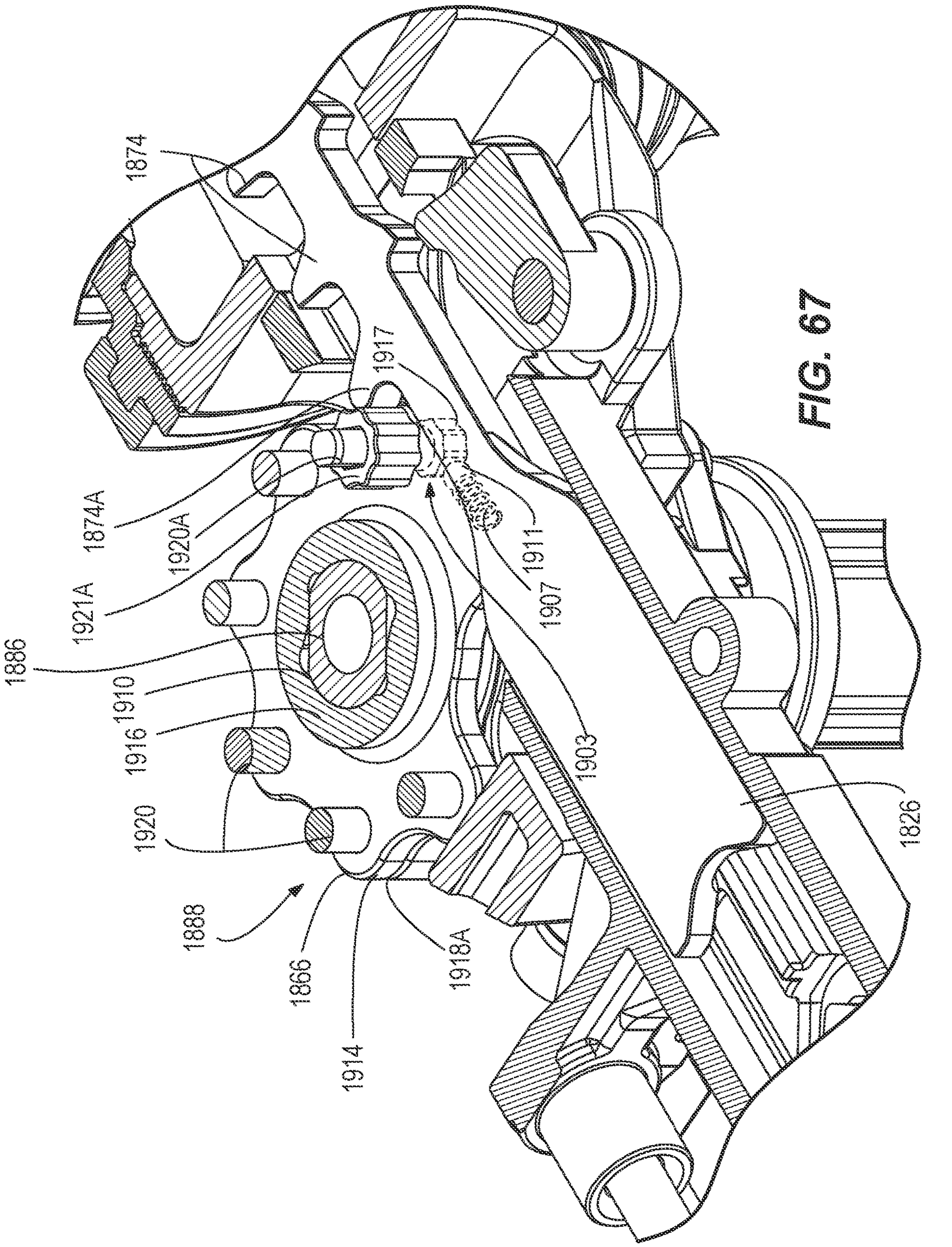
FIG. 67 is a perspective cross-sectional view of a portion of a powered fastener driver illustrating a lifter assembly in accordance with another embodiment of the invention.
Figure 68:
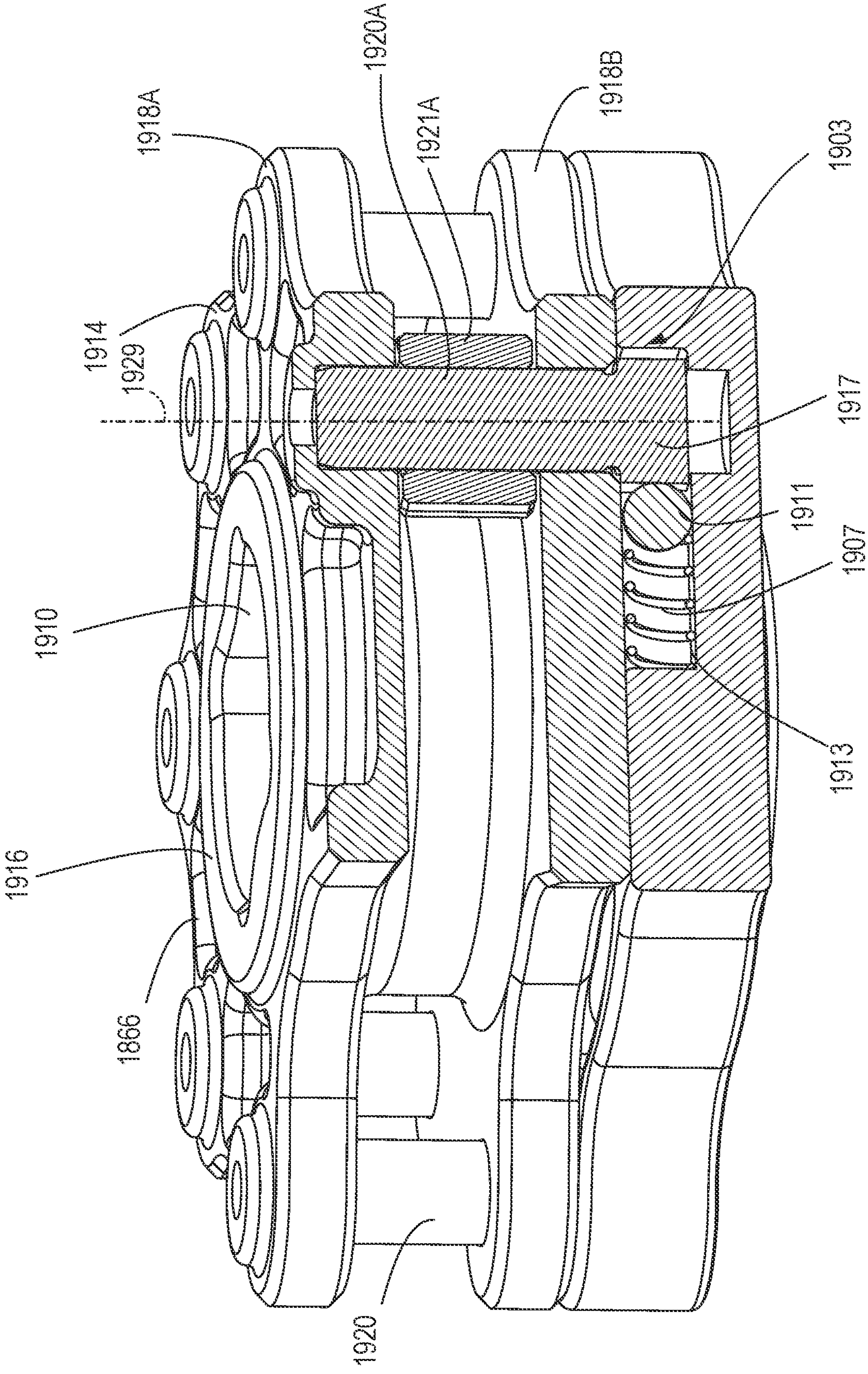
FIG. 68 is a cross-sectional view of a lifter of the lifter assembly of FIG. 67 illustrating a means for aligning a pin assembly with a lowermost tooth of a driver blade to facilitate meshing between the lowermost tooth and the pin assembly according to another embodiment of the invention.

FIGS. 65 and 66 illustrate a ninth embodiment of a lifter assembly 1688, with like components and features as the embodiment of the lifter assembly 88 of the fastener driver 10 shown in FIGS. 1-7 being labeled with like reference numerals plus "1600". The lifter assembly 1688 is utilized for a fastener driver similar to the fastener driver 10 of FIGS. 1-7 and, accordingly, the discussion of the fastener driver 10 above similarly applies to the lifter assembly 1688 and is not re-stated. Rather, only differences between the lifter assembly 88 of FIGS. 1-7 and the lifter 1666 of FIGS. 65 and 66 are specifically noted herein, such as differences in a last one of the lifter pins.

The lifter 1666 includes a body 1714 having a hub 1716 through which an aperture 1710 extends, a first flange 1718A radially extending from one end of the hub 1716, and a second flange 1718B (FIG. 66) radially extending from an opposite end of the hub 1716 and spaced from the first flange 1718A. Further, the lifter 1666 includes a plurality of pins 1720 extending between the flanges 1718A and at least one roller 1721A supported upon at least one of the pins 1720. The roller 1721A includes a non-cylindrical outer peripheral surface having one or more engagement sections 1709 that may be aligned and engageable with the last tooth 1674A of the driver blade 1626 for holding the driver blade 1626 in a ready position prior to initiating a fastener driving operation. For example, the roller 1721A includes a plurality of radial protrusions 1705 that define valleys therebetween, which forms the engagement sections 1709 of the roller 1721A. The construction of the roller 1721A reduces stress on the driver blade tooth 1674A and the last roller 1721A when holding the driver blade 1626 at the ready/TDC position.

Now with reference to FIG. 66, the lifter 1666 also includes a means for aligning one of the engagement sections 1709 of the roller 1721A with the last blade tooth 1674A to facilitate re-meshing between the last blade tooth 1674A and one of the engagement sections 1709 of the roller 1721A. In the illustrated embodiment, the means for aligning the engagement section 1709 positions the roller 1721A in a first rotational orientation (e.g. relative to the pin 1720A) so a first engagement section of the roller 1721A is aligned with the last blade tooth 1674A. Further, the means for aligning includes one or more friction inducing members, such as friction rings 1715A, 1715B positioned between the body 1714 and the roller 1721A. The one or more friction rings 1715A, 1715B (e.g., an O-ring) are supported within one or more recesses 1713A, 1713B formed in the body 1714 of the lifter 1666. A first friction ring 1715A is positioned within a first recess 1713A formed in the first flange 1718A (e.g., on a first side of the roller 1721A) and a second friction ring 1715B is positioned within a second recess 1713B formed in the second flange 1718B (e.g., on a second side of the roller 1721A). In other words, the first and second friction rings 1715A, 1715B are positioned on opposing sides of the roller 1721A.

The friction rings 1715A, 1715B reduce the amount of free spin the roller 1721A has after the driver blade 1626 is released, which reduces risk of random roller positioning. For example, as the driver blade 1626 approaches TDC, the roller 1721A overcomes the force of the friction rings 1715A, 1715B, which allows the roller 1721A to rotate towards a second rotational orientation. Once the driver blade 1626 is released, the friction rings 1715A, 1715B dissipate rotational energy of the roller 1721A, so the roller 1721A effectively stays in the second rotational orientation (e.g., the orientation the roller 1721A last contacted the last tooth 1674A of the driver blade 1626). During a subsequent fastener driving, the roller remains in the second rotational orientation where a second engagement section aligns with the end portion of the tooth of the driver blade. For example, the second engagement section may be positioned proximate the first engagement section. The use of the friction rings 1715A, 1715B also limits the effect of the grease quantity in roller 1721A.

FIG. 67-70 illustrate a tenth embodiment of a lifter assembly 1888, with like components and features as the embodiment of the lifter assembly 88 of the fastener driver 10 shown in FIGS. 1-7 being labeled with like reference numerals plus "1800". The lifter assembly 1888 is utilized for a fastener driver similar to the fastener driver 10 of FIGS. 1-7 and, accordingly, the discussion of the fastener driver 10 above similarly applies to the lifter assembly 1888 and is not re-stated. Rather, only differences between the lifter assembly 88 of FIGS. 1-7 and the lifter 1866 of FIGS. 67-70 are specifically noted herein, such as differences in a last one of the lifter pins.

The lifter 1866 includes a body 1914 having a hub 1916 through which an aperture 1910 extends, a first flange 1918A radially extending from one end of the hub 1916, and a second flange 1918B (FIG. 68) radially extending from an opposite end of the hub 1916 and spaced from the first flange 1918A. Further, the lifter 1866 includes a plurality of pins 1920 extending between the flanges 1918A, 1918B. A last pin assembly 1903 includes a last pin 1920A and a roller 1921A supported upon and co-rotatable with the last pin 1920A. For example, the last pin 1920A may be coupled to the roller 1921A via a double-D profile or other connection feature (e.g., a key/keyway arrangement or spline, etc.). The roller 1921A or the pins 1920 sequentially engage the lift teeth 1874 formed on the driver blade 1826 as the driver blade 1826 is returned from the BDC position toward the TDC position.

The roller 1921A includes a non-cylindrical outer peripheral surface having one or more engagement sections 1909*a*, 1909*b* that may be aligned and engageable with the last tooth 1874A of the driver blade 1826 for holding the driver blade 1826 in a ready position prior to initiating a fastener driving operation. For example, the roller 1921A includes a plurality of radial protrusions 1905 that define valleys therebetween, which forms the engagement sections 1909*a*, 1909*b*. The construction of the roller 1921A reduces stress on the driver blade tooth 1874A and the last roller 1921A when holding the driver blade 1826 at the ready/TDC position.

Now with reference to FIGS. 68-70B, the last pin 1920A also includes a pin head 1917 supported within a recess 1913 formed in the body 1914 of the lifter 1866. The pin head 1917 also includes a non-cylindrical outer peripheral surface similar to the roller 1921A. For example, pin head 1917 also includes a plurality of radial protrusions 1923 that define valleys therebetween, which form pin engagement sections 1927*a*, 1927*b*. The pin engagement sections 1927*a*, 1927*b* are offset from the engagement sections 1909*a*, 1909*b* in a direction of a rotational axis 1929 of the rotary lifter 1866.

The lifter 1866 also includes a means for aligning one of the engagement sections 1909*a*, 1909*b* of the roller 1921A with the last blade tooth 1874A to facilitate re-meshing between the last blade tooth 1874A and one of the engagement sections 1909*a*, 1909*b* of the roller 1921A. In the illustrated embodiment, the means for aligning the engagement section 1909*a*, 1909*b* positions the roller 1921A in a first rotational orientation (e.g. relative to the lifter body 1914) so a first engagement section 1309*a* of the roller 1321A is aligned with the last blade tooth 1274A. In particular, the means for aligning includes a biasing member 1907 (e.g., a compression spring) and an engagement member 1911 (e.g., a ball detent) supported within a recess 1913 formed in the body 1914 of the lifter 1866. Further, the means for aligning is supported within the second flange 1918B of the lifter 1866. The biasing member 1907 biases the engagement member 1911 into contact with a first pin engagement section 1927*a* of the pin head 1917. In particular, the biasing member 1907 is a compression spring.

Figure 70A:
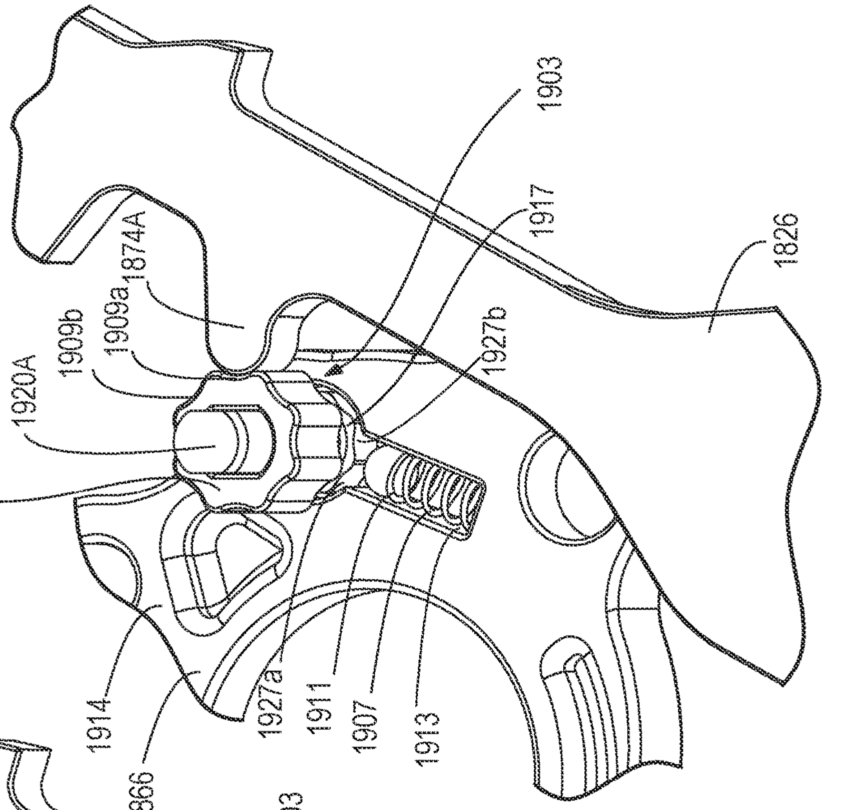
FIG. 70A is another is a partial cutaway view of a portion of the lifter assembly of FIG. 67 illustrating the pin assembly rotated towards an intermediate rotational orientation, which allows driver blade to be fired from TDC to BDC.
Figure 69:
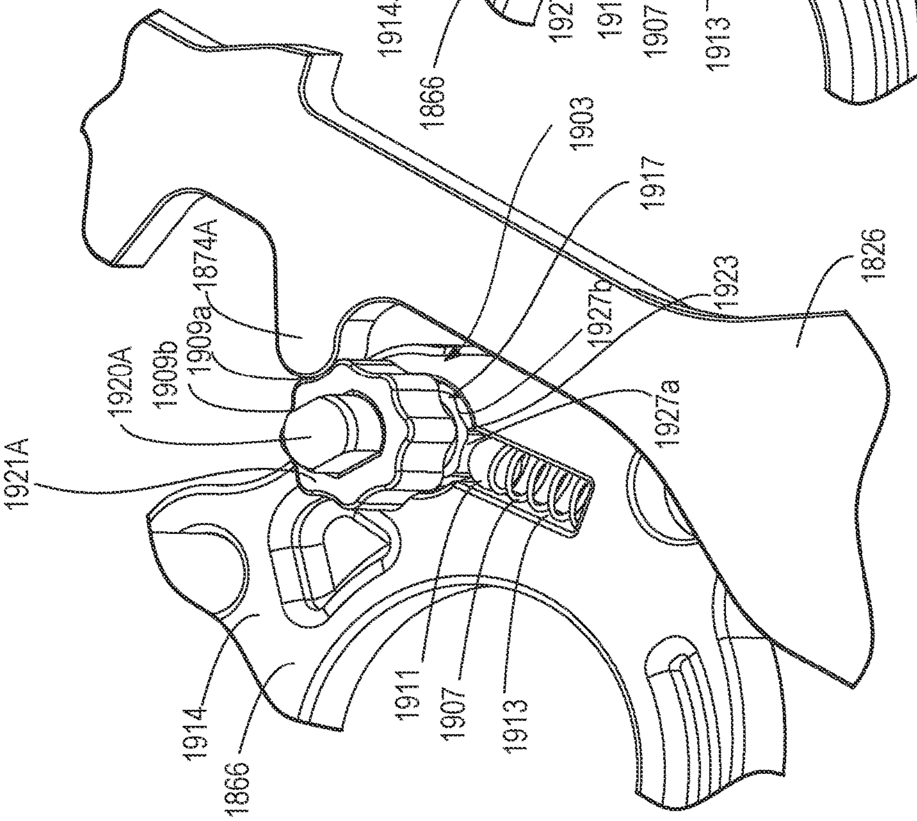
FIG. 69 is a partial cutaway view of a portion of the lifter assembly of FIG. 67 illustrating the pin assembly being biased by the aligning means towards a first rotational orientation to facilitate meshing between the lowermost tooth of a driver blade the pin assembly.
Figure 70B:
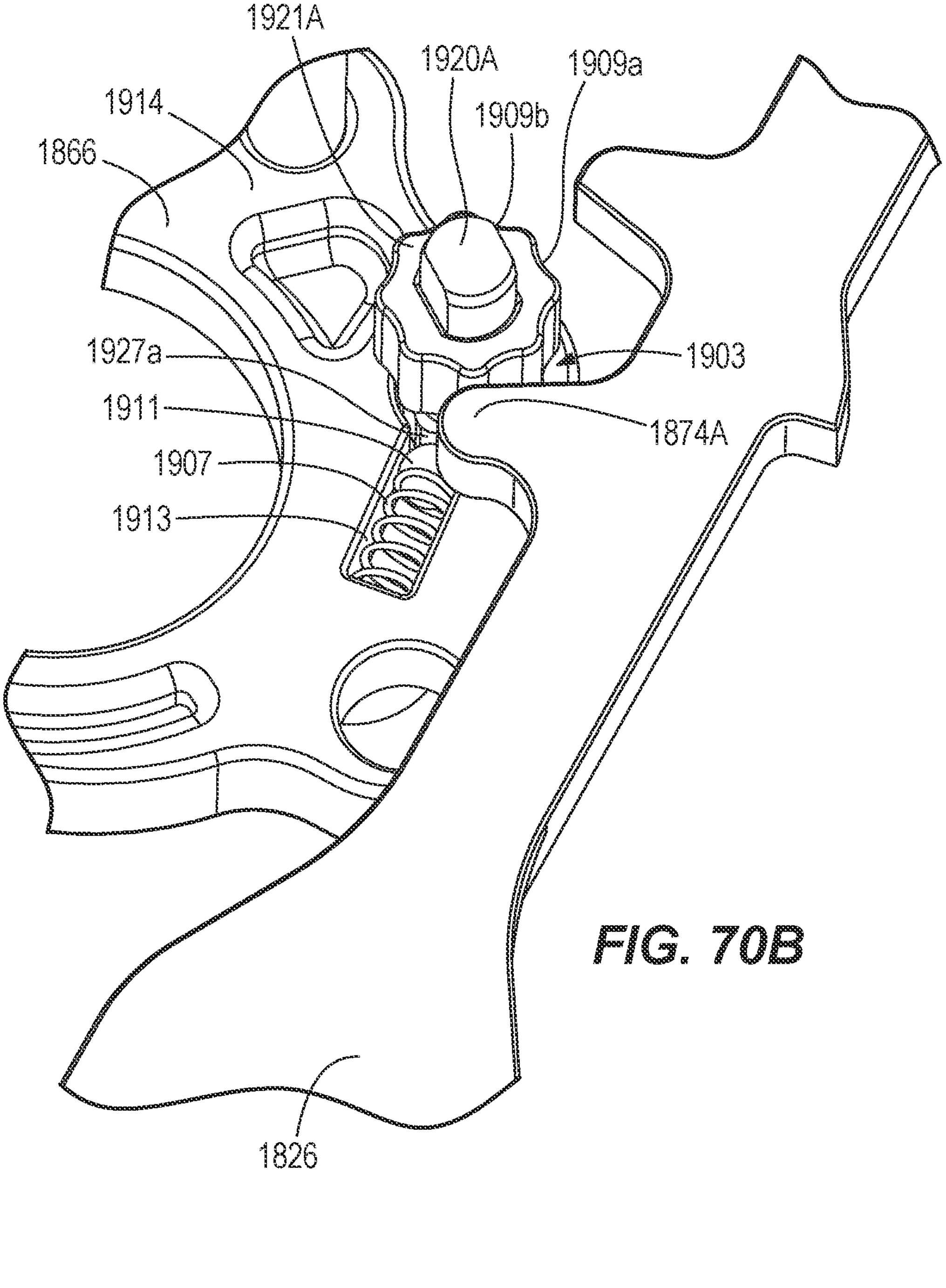
FIG. 70B is another is a partial cutaway view of a portion of the lifter assembly of FIG. 67 illustrating the pin assembly rotated towards a second rotational orientation, where the driver blade is released and moving towards BDC
Figure 71:
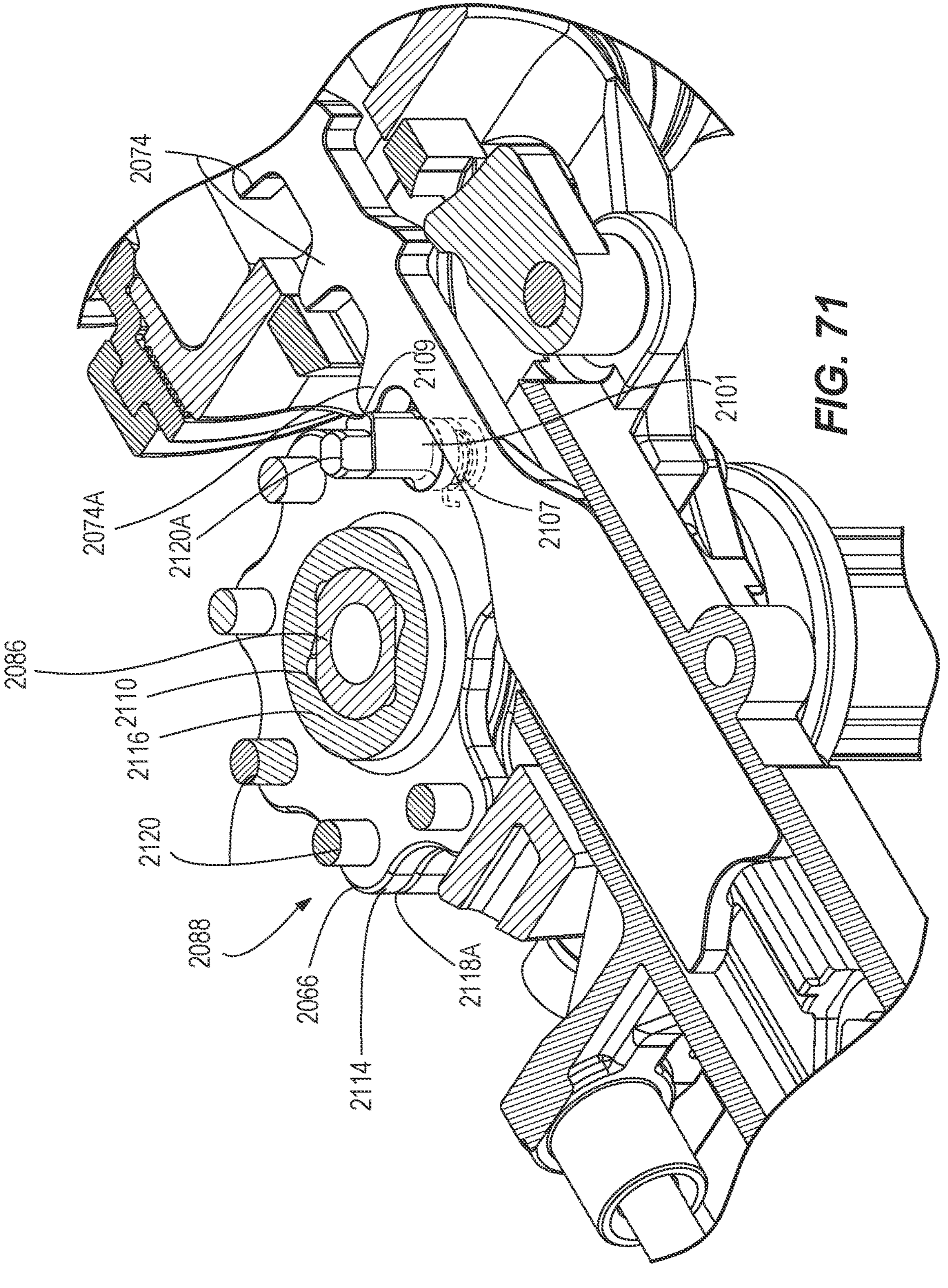
FIG. 71 is a perspective cross-sectional view of a portion of a powered fastener driver illustrating a lifter assembly in accordance with another construction of the invention.
Figure 72:
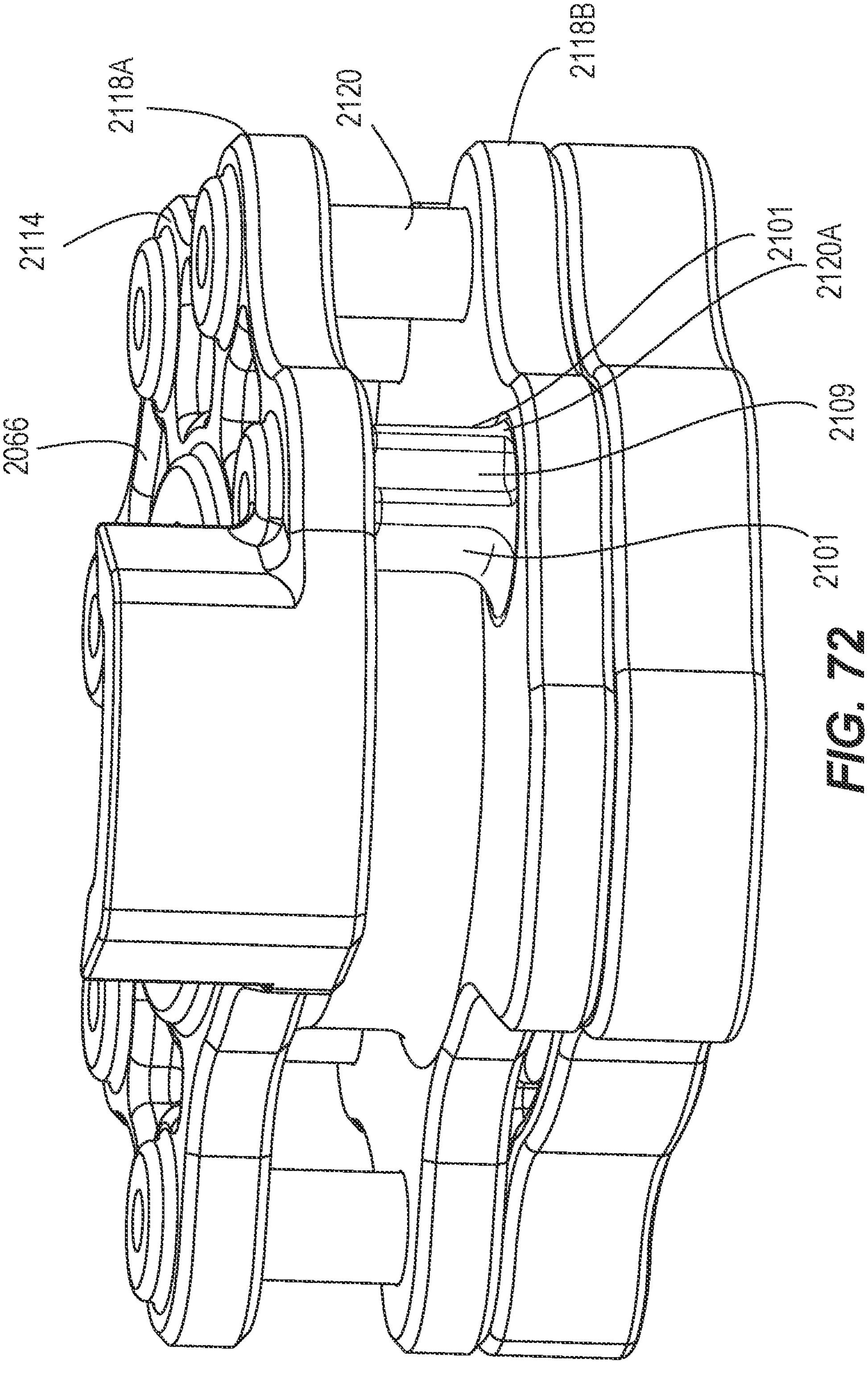
FIG. 72 is a side view of a lifter of the lifter assembly of FIG. 71.

As shown in FIGS. 69, 70A and 70B, the biasing member 1907 may be preloaded and the force of the biasing member 1907 urges the engagement member 1911 into contact with the first pin engagement section 1927*a* of the pin head 1917, which prevents the pin assembly 1903 from rotating when the driver blade tooth 1874A is moving from TDC to BDC (FIG. 70A). As the driver blade 1874A approaches TDC, the pin head 1917 overcomes the force of the biasing member 1907, which allows the pin assembly 1903 to move against the bias of the biasing member 1907.

For example, during a driving cycle in which a fastener is discharged into a workpiece, the lifter 1866 returns the piston and the driver blade 1826 from BDC towards TDC. In particular, the pin assembly 1903 is in a first rotational orientation (FIG. 69) when returning the driver blade 1826 from BDC towards TDC. In the first rotational orientation, the first engagement section 1909*a* of the roller 1921A is aligned with the last blade tooth 1874A and the first pin engagement section 1927*a* is aligned with the engagement member 1911, which restricts rotational movement of the pin assembly 1903. As the driver blade 1826 approaches the TDC position, the reaction force reaches the maximum value, thereby exceeding the predetermined force of the biasing member 1907 and adjusting the pin assembly 1903 from the first rotational orientation (FIG. 69) to an intermediate rotational orientation (FIG. 70A), and to a second rotational orientation (FIG. 70B). In the intermediate rotational orientation, the engagement member 1911 compresses the biasing member 1907 within the recess 1913 so the engagement member 1911 can move over the protrusion 1923 of the pin head 1917 as the pin assembly 1903 rotates. Once the driver blade 1826 reaches TDC, the last tooth 1874 of the blade 1826 is released (FIG. 70B) and the driver blade 1826 moves towards BDC. Concurrently, the biasing member 1907 urges the engagement member 1911 into engagement with a second pin engagement section 1927*b*, which restricts further movement of the pin assembly 1903 and positions a second engagement section 1909*b* in the first rotational orientation to facilitate re-meshing between the last blade tooth 1874A and the second engagement section 1909*d* for a subsequent fastener driving event. In the illustrated embodiment, the second pin engagement section 1927*b* is positioned directly adjacent the first pin engagement section 1927*a* and the second engagement section 1909*b* is positioned directly adjacent the first engagement section 1909*a*. In other embodiments, the engagement member 1911 may traverse one or more pin engagement sections 1927*a*, 1927*b* during the fastener driving event.

FIG. 71-74 illustrate an eleventh embodiment of a lifter assembly 2088, with like components and features as the embodiment of the lifter assembly 88 of the fastener driver 10 shown in FIGS. 1-7 being labeled with like reference numerals plus "2000". The lifter assembly 2088 is utilized for a fastener driver similar to the fastener driver 10 of FIGS. 1-7 and, accordingly, the discussion of the fastener driver 10 above similarly applies to the lifter assembly 2088 and is not re-stated. Rather, only differences between the lifter assembly 88 of FIGS. 1-7 and the lifter 2066 of FIGS. 71-74 are specifically noted herein, such as differences in a last one of the lifter pins.

The lifter 2066 includes a body 2114 having a hub 2116 through which an aperture 2110 extends, a first flange 2118A radially extending from one end of the hub 2116, and a second flange 2118B (FIG. 68) radially extending from an opposite end of the hub 2116 and spaced from the first flange 2118A. Further, the lifter 2066 includes a plurality of pins 2120 extending between the flanges 2118A, 2118B. In the illustrated embodiment, the last pin 2120A defines a roller that rotatable relative to the body 2114. In other words, it should be appreciated that the roller may be integrally formed on the last pin 2120A. The pins 2120 sequentially engage the lift teeth 2074 formed on the driver blade 2026 as the driver blade 2026 is returned from the BDC position toward the TDC position.

The last pin 2120A includes a non-cylindrical outer peripheral surface having an engagement section 2109 that may be aligned and engageable with the last tooth 2074A of the driver blade 2026 for holding the driver blade 2026 in a ready position prior to initiating a fastener driving operation. For example, the last pin 2120A includes a pair of opposing flat surfaces 2101 and the engagement section 2109 defined therebetween. The last tooth 2074A of the driver blade 2026 engages the engagement section 2109 of the last pin 2120A, which reduces stress on the driver blade tooth 2074A and the last roller 2121A when holding the driver blade 2026 at the ready/TDC position.

Figure 74:
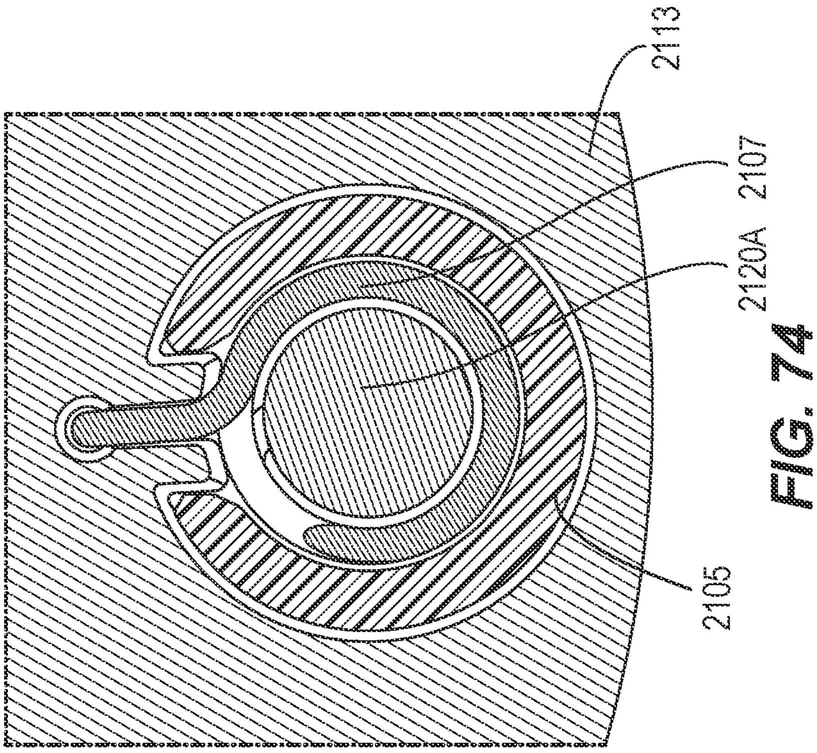
FIG. 74 is a front cross-sectional view of the lifter assembly of FIG. 71 illustrating the aligning means.
Figure 73:
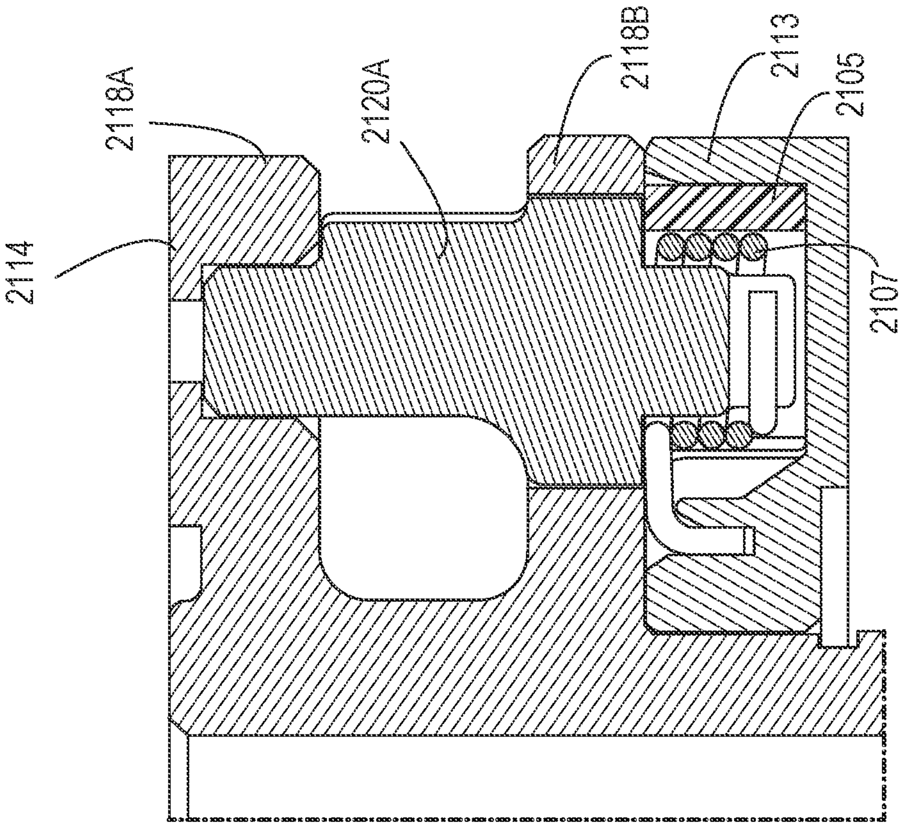
FIG. 73 is a side cross-sectional view of the lifter assembly of FIG. 71 illustrating a means for aligning a drive pin with a lowermost tooth of a driver blade to facilitate meshing between the lowermost tooth and the lifter roller according to another embodiment of the invention.

Now with reference to FIGS. 73 and 74, the lifter 2066 also includes a means for aligning the engagement section 2109 of the last pin 2120A with the last blade tooth 2074A to facilitate re-meshing between the last blade tooth 2074A the engagement section 1309 of the last pin 2120A. In the illustrated embodiment, the means for aligning the engagement section 2109 positions the last pin 2120A in a first rotational orientation (e.g., relative to the lifter 2066, FIG. 71) so the engagement section 2109 is aligned with the last blade tooth 2074A. Further, the means for aligning includes a bushing 2105 surrounding a portion of the pin 2120A, a biasing member 2107 positioned between the bushing 2105 and the pin 2120A, and a retaining member 2113 securing the bushing 2105 and biasing member 2107 to the body 2114 (e.g., the second flange 2118B) of the lifter 2066. In the illustrated embodiment, the biasing member 2107 is a torsion spring that urges the pin 2120A desired or first rotational orientation and allows the pin 2120A to rotate in both a clockwise (e.g., against the force of the torsion spring) and counterclockwise (e.g., from the force of the torsion spring) direction. In addition, the bushing 2105 is formed of a metallic material (e.g., steel, aluminum, etc.), which reduces wear on the pin 2120A.

As the driver blade 2074A approaches TDC, the pin 2120A overcomes the force of the biasing member 2107, which allows the pin 2120A to rotate against the bias of the biasing member 2107. For example, during a driving cycle in which a fastener is discharged into a workpiece, the lifter 2066 returns the piston and the driver blade 2026 from the BDC position toward the TDC position. In particular, the pin 2120A is in a first rotational orientation when returning the driver blade 2026 from the BDC position toward the TDC position. After the driver blade 2026 reaches the TDC position, the reaction force reaches the maximum value, thereby exceeding the predetermined force of the biasing member 2107 and rotating the pin 2120A from the first rotational orientation to a second rotational orientation (e.g., in a clockwise direction), which releases the driver blade 2026. Once the blade 2026 is released, the biasing member 2107 rotates the pin 2120A in an opposite direction (e.g., a counterclockwise direction) to return the first position or desired rotational orientation.

Figure 75:
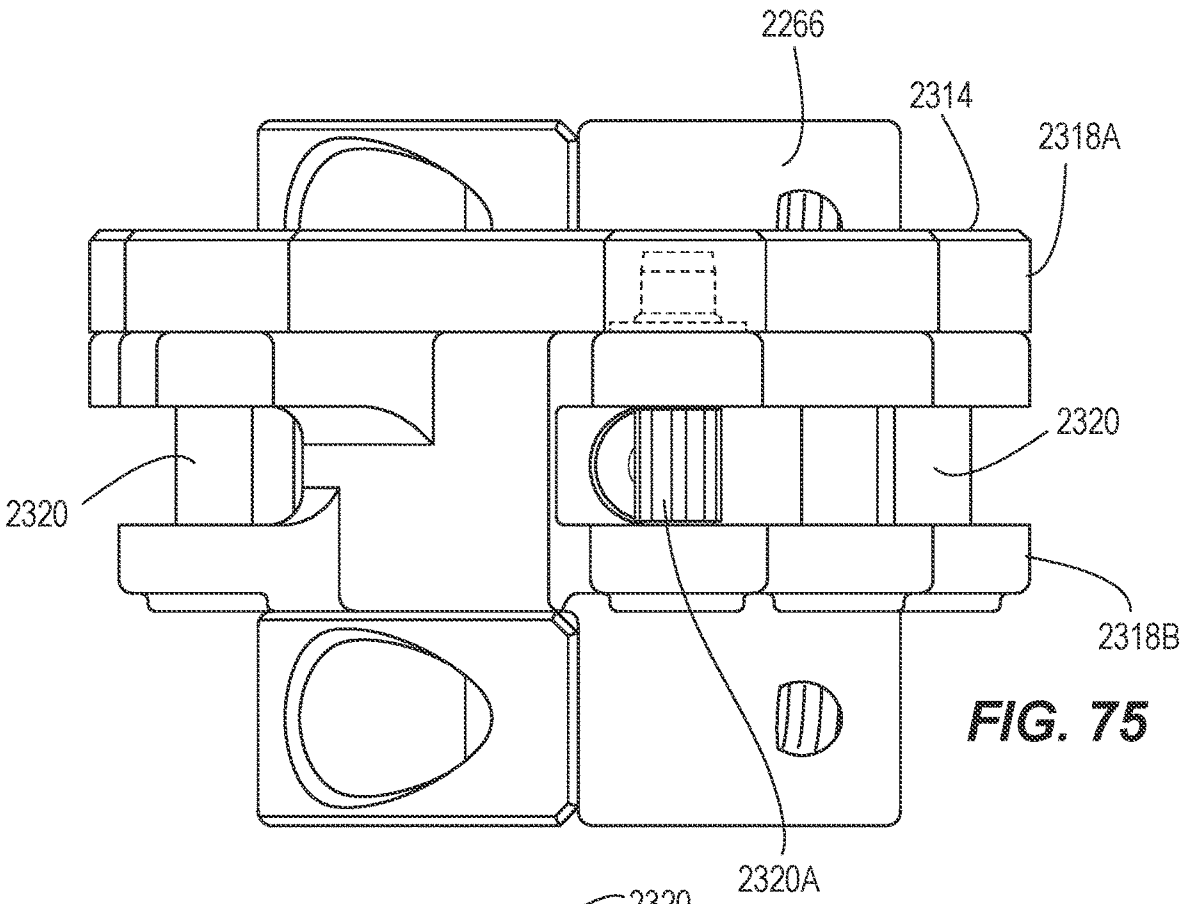
FIG. 75 is a side view of a lifter having a drive pin in accordance with another construction of the invention.
Figure 76:
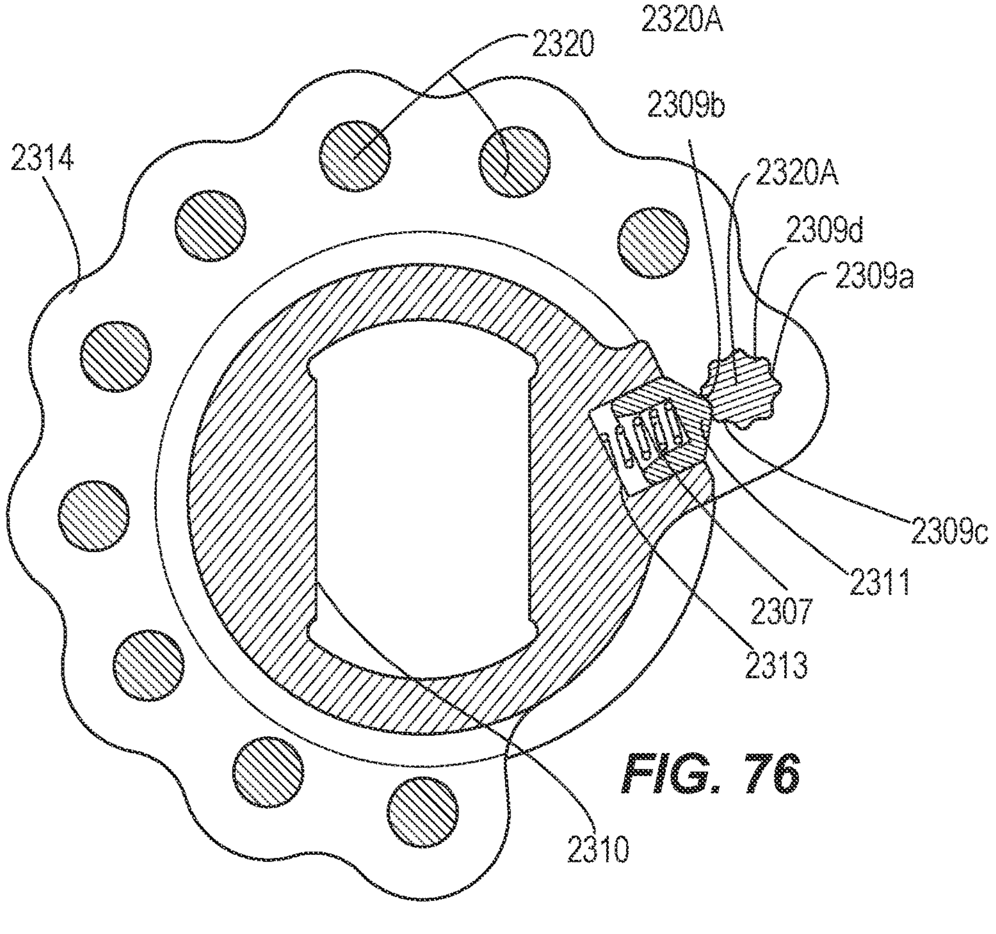
FIG. 76 is a front cross-sectional view of the lifter assembly of FIG. 75 illustrating a means for aligning the drive pin with a lowermost tooth of a driver blade to facilitate meshing between the lowermost tooth and the lifter roller according to another embodiment of the invention.
Figure 77:
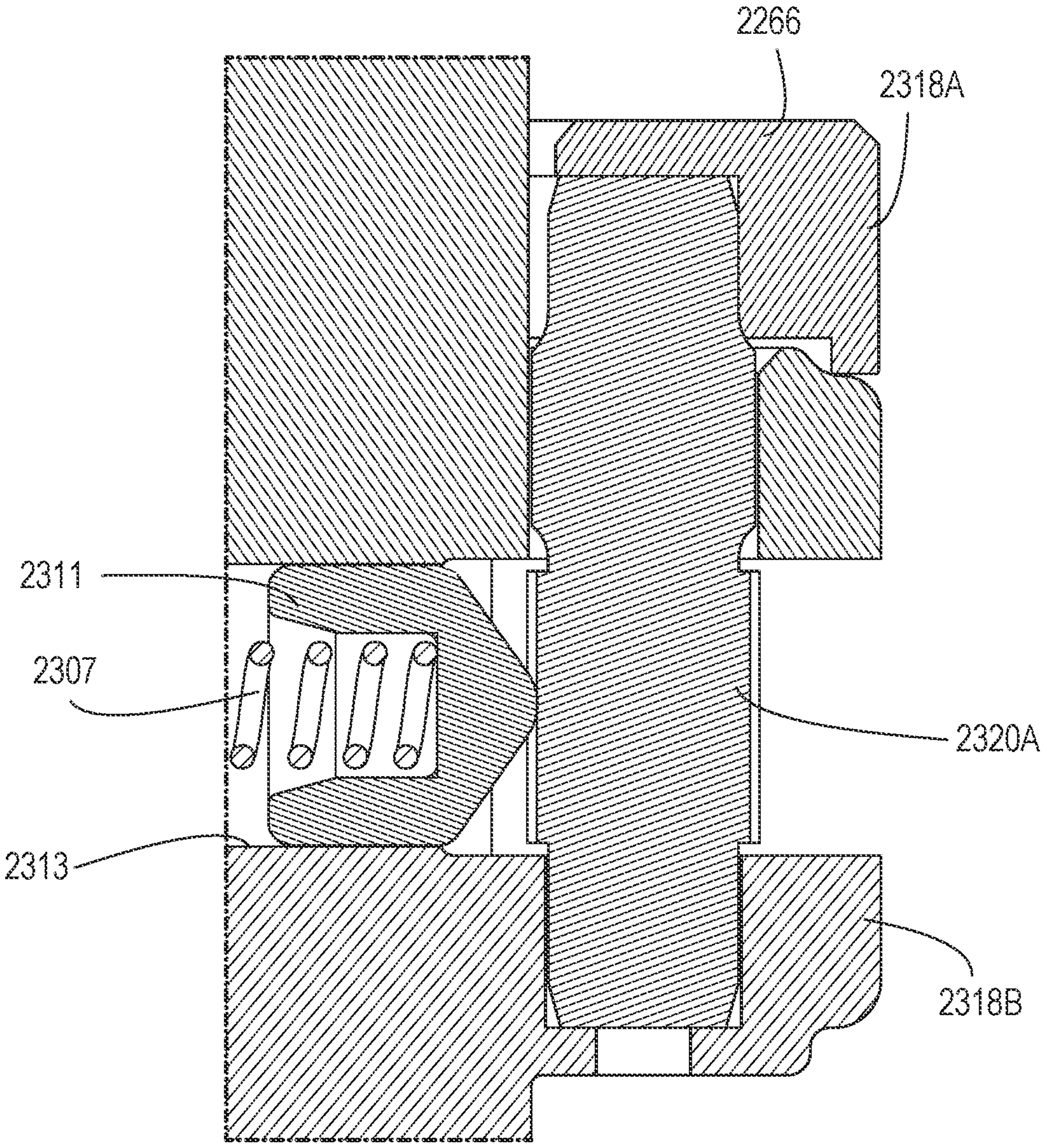
FIG. 77 is a side cross-sectional view of the lifter assembly of FIG. 75 illustrating the engagement between the engagement member and the drive pin.
Figure 78:
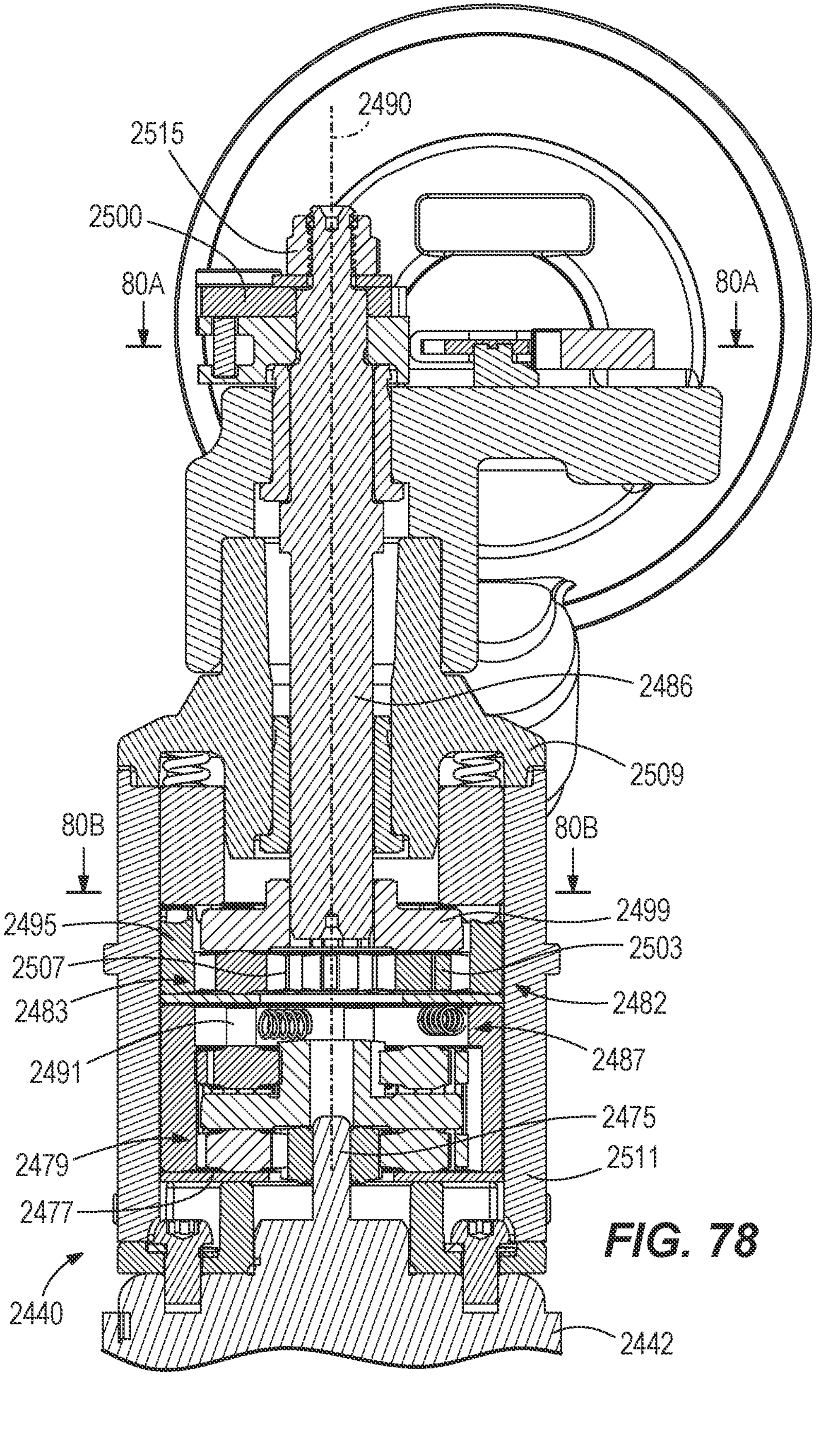
FIG. 78 is a cross-sectional view of a drive unit of a powered fastener driver according to another embodiment, illustrating a motor and a transmission having a carrier defining a torque input member and an output shaft and a lifter defining a torque output member for providing torque to a driver blade of the powered fastener driver.

FIG. 75-77 illustrate a twelfth embodiment of a lifter 2266, with like components and features as the embodiment of the lifter 66 of the fastener driver 10 shown in FIGS. 1-7 being labeled with like reference numerals plus "2200". A lifter assembly is utilized for a fastener driver similar to the fastener driver 10 of FIGS. 1-7 and, accordingly, the discussion of the fastener driver 10 above similarly applies to the lifter assembly and is not re-stated. Rather, only differences between the lifter 66 of FIGS. 1-7 and the lifter 2266 of FIGS. 75-77 are specifically noted herein, such as differences in a last one of the lifter pins.

The lifter 2266 includes a body 2314 having a hub, a first flange 2318A radially extending from one end of the hub 2316, and a second flange 2318B (FIG. 75) radially extending from an opposite end of the hub 2316 and spaced from the first flange 2318A. Further, the lifter 2266 includes a plurality of pins 2320 extending between the flanges 2318A, 2318B. In the illustrated embodiment, the last pin 2320A defines a roller rotatable relative to the body 2314. In other words, it should be appreciated that the roller may be integrally formed on the last pin 2320A. The pins 2320 sequentially engage the lift teeth formed on the driver blade (not shown) as the driver blade is returned from the BDC position toward the TDC position.

The last pin 2320A includes a non-cylindrical outer peripheral surface having one or more engagement sections 2309*a-d* that may be aligned and engageable with the last tooth of the driver blade for holding the driver blade in a ready position prior to initiating a fastener driving operation. For example, the last pin 2320A includes a plurality of radial protrusions 2305 that define engagement sections 2309*a-d* therebetween. The last tooth of the driver blade engages one of the engagement sections 2309*a-d* of the last pin 2320A, which reduces stress on the driver blade tooth and the last roller when holding the driver blade at the ready/TDC position Now with reference to FIGS. 76 and 77, the lifter 2266 also includes a means for aligning one of the engagement sections 2309*a-d* of the last pin 2320A with the last blade tooth to facilitate re-meshing between the last blade tooth and one of the engagement sections 2309*a-d* of the last pin 2320A. In the illustrated embodiment, the means for aligning the engagement section 2309 positions the last pin 2320A in a first rotational orientation (e.g. relative to the lifter body 2314) so a first engagement section 2309*a* is aligned with the last blade tooth. Further, the means for aligning includes a biasing member 2307 (e.g., a compression spring) and an engagement member 2311 (e.g., a ball detent) supported within a recess 2313 formed in the body 2314 of the lifter 2266. More particularly, the means for aligning is positioned between the first and second flanges 2218A, 2218B. The biasing member 2307 urges the engagement member 2311 into engagement with one of the engagement sections 2309*a-d* (i.e., a second engagement section

2309*b*) of the last pin 2320A. In particular, the biasing member 2307 is a compression spring.

As the driver blade approaches TDC, the last pin 2320A overcomes the force of the biasing member 2307, which allows the last pin 2320A to move against the bias of the biasing member 2307. For example, during a driving cycle in which a fastener is discharged into a workpiece, the lifter 2266 returns the piston and the driver blade from BDC towards the TDC. In particular, the last pin 2320A is in the first position when returning the driver blade from the BDC position toward the TDC position. As the driver blade approaches TDC, the reaction force reaches the maximum value, thereby exceeding the predetermined force of the biasing member 2307 and adjusting the last pin 2320A from the first rotational orientation to an intermediate rotational orientation, and then to a second rotational orientation. In the intermediate rotational orientation, the engagement member 2311 compresses the biasing member 2307 so the engagement member 2311 can move over the protrusion 2305 of the last pin 2320A. Once the driver blade reaches TDC, the last tooth of the blade is released so the driver blade can move towards BDC. Concurrently, the biasing member 2307 urges the engagement member 2311 into engagement a third engagement section 2309*c*, which restricts further movement of the last pin 2320A and positions a fourth engagement section 2309*d* in the first rotational orientation to facilitate re-meshing between the last blade tooth and the fourth engagement section 2309*d* for a subsequent fastener driving event.

FIGS. 78-82B illustrate another embodiment drive unit 2440, with like components and features as the embodiment of the drive unit 40 of the fastener driver 10 shown in FIG. 2 being labeled with like reference numerals plus "2400". The drive unit 2440 is utilized for a fastener driver similar to the fastener driver 10 of FIGS. 1-7 and, accordingly, the discussion of the fastener driver 10 above similarly applies to the drive unit 2440 and is not re-stated. Rather, only differences between the drive unit 40 of FIG. 2 and the drive unit 2440 of FIGS. 78-82B are specifically noted herein.

The drive unit 2440 includes an electric motor 2442 and a transmission 2482 positioned downstream of the motor 2442. The transmission 2482 includes an input 2475 (i.e., a motor output shaft) and includes an output shaft 2486 extending to a lifter 2500, which is operable to move a driver blade 2426 (FIG. 79) from the driven position to the ready position, as explained in greater detail below. In other words, the transmission 2482 provides torque to the lifter 2500 from the motor 2442. The transmission 2482 is configured as a planetary transmission having three planetary stages 2477, 2479, 2483. Each planetary stage 2477, 2479, 2483 includes a ring gear, a carrier, and multiple planet gears coupled to the carrier for relative rotation therewith. In alternative embodiments, the transmission may be a single-stage planetary transmission, or a multi-stage planetary transmission including any number of planetary stages.

A one-way clutch mechanism 2487 incorporated in the transmission 2482. More specifically, the one-way clutch mechanism 2487 includes a carrier 2491, which is also a component in the second planetary stage 2479. The one-way clutch mechanism 2487 permits a transfer of torque to the output shaft 2486 of the transmission 2482 in a single (i.e., first) rotational direction, yet prevents the motor 2442 from being driven in a reverse direction in response to an application of torque on the output shaft 2486 of the transmission 2482 in an opposite, second rotational direction. In the illustrated embodiment, the one-way clutch mechanism 2487 is incorporated with the second planetary stage 2479 of the transmission 2482. In alternative embodiments, the one-way clutch mechanism 2487 may be incorporated into the first planetary stage 2477, for example.

The last planetary stage 2483 includes a ring gear 2495, a carrier 2499, and multiple planet gears 2503 coupled to the carrier 2499 for relative rotation therewith. The second planetary stage 2479 further includes an output pinion that is enmeshed with the planet gears 2503 which, in turn, are rotatably supported upon the carrier 2499 of the last planetary stage 2483 and enmeshed with a toothed interior peripheral portion 2507 of the ring gear 2495. Unlike the ring gears of the first and second planetary stages 2477, 2479, the ring gear 2495 of the third planetary stage 2483 is rotatable relative to a transmission cover 2509 adjacent a transmission housing 2511. The carrier 2499 is coupled to the output shaft 2486 through a kickout arrangement 2536 described in more detail below. In the illustrated embodiment, the carrier 2499 is a torque input member that is configured to transmit torque to from the drive unit 2440 and the output shaft 2486 and the lifter 2500 defines a torque output member, which is in selective driving connection with and downstream of the torque input member. The torque output member configured to receive torque from the torque input member in a first rotational direction for returning the driver blade 2426 from the bottom-dead-center position toward the top-dead-center position.

Figure 79:
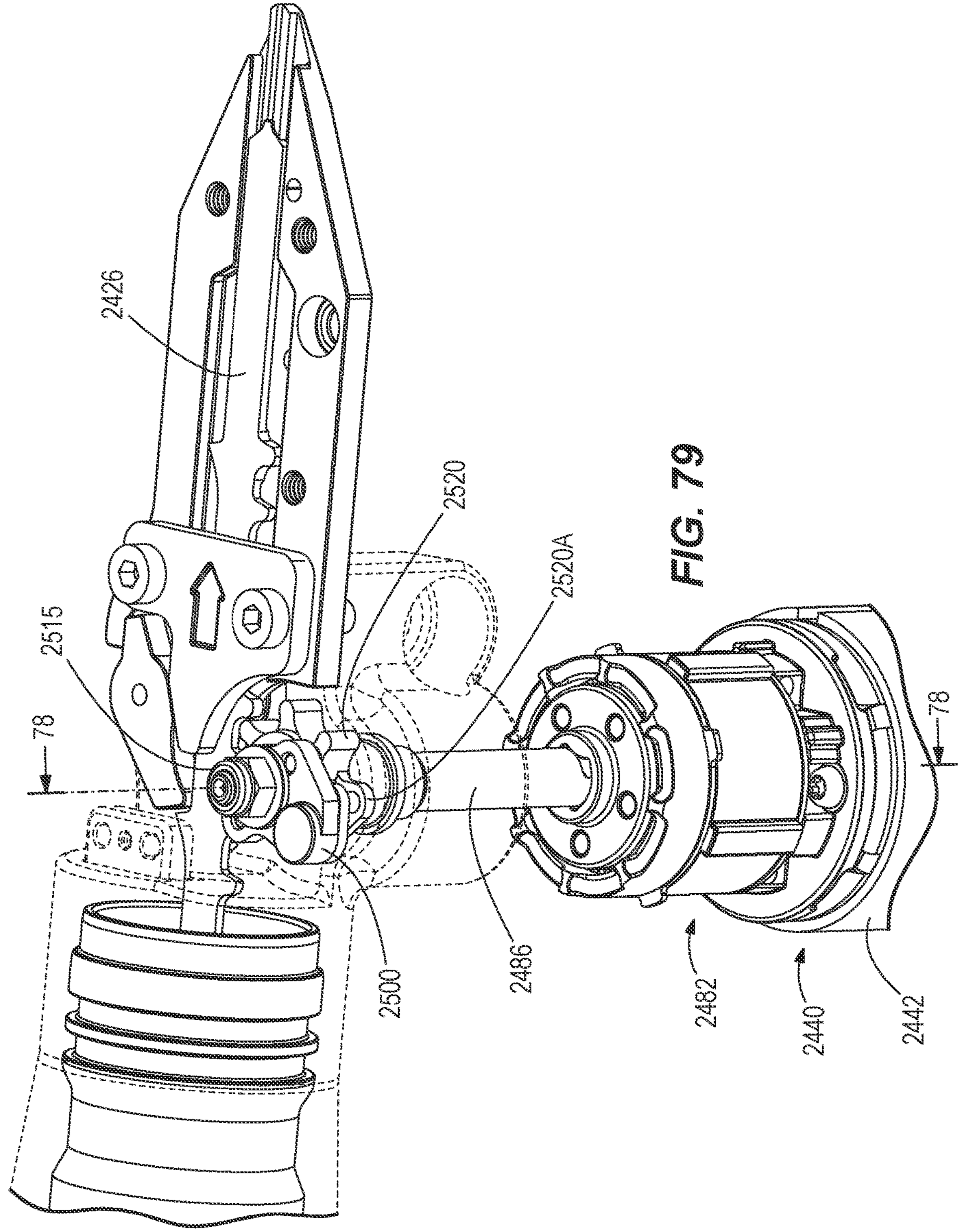
FIG. 79 is a perspective view of a portion of the powered fastener driver with portions of a housing removed to illustrate the drive unit of FIG. 78.
Figure 80B:
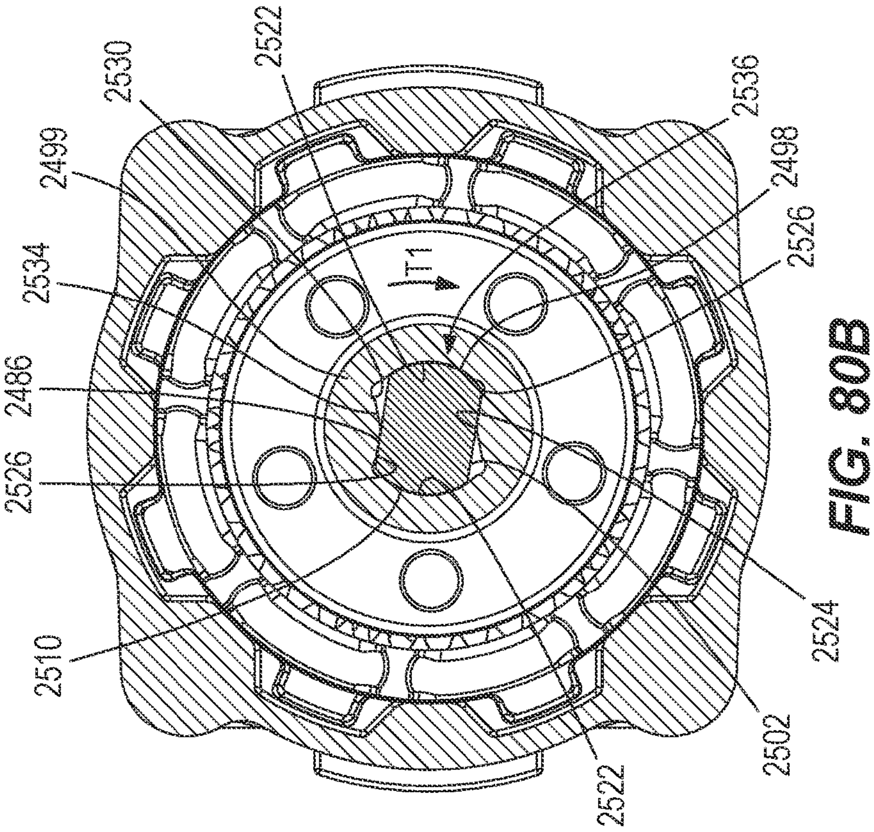
FIG. 80B is a front cross-sectional view of the drive unit of FIG. 78 about the line 80B-80B illustrating the torque output member in a first rotational position relative to the torque input member when the driver blade is in the position shown in FIG. 80A.
Figure 80A:
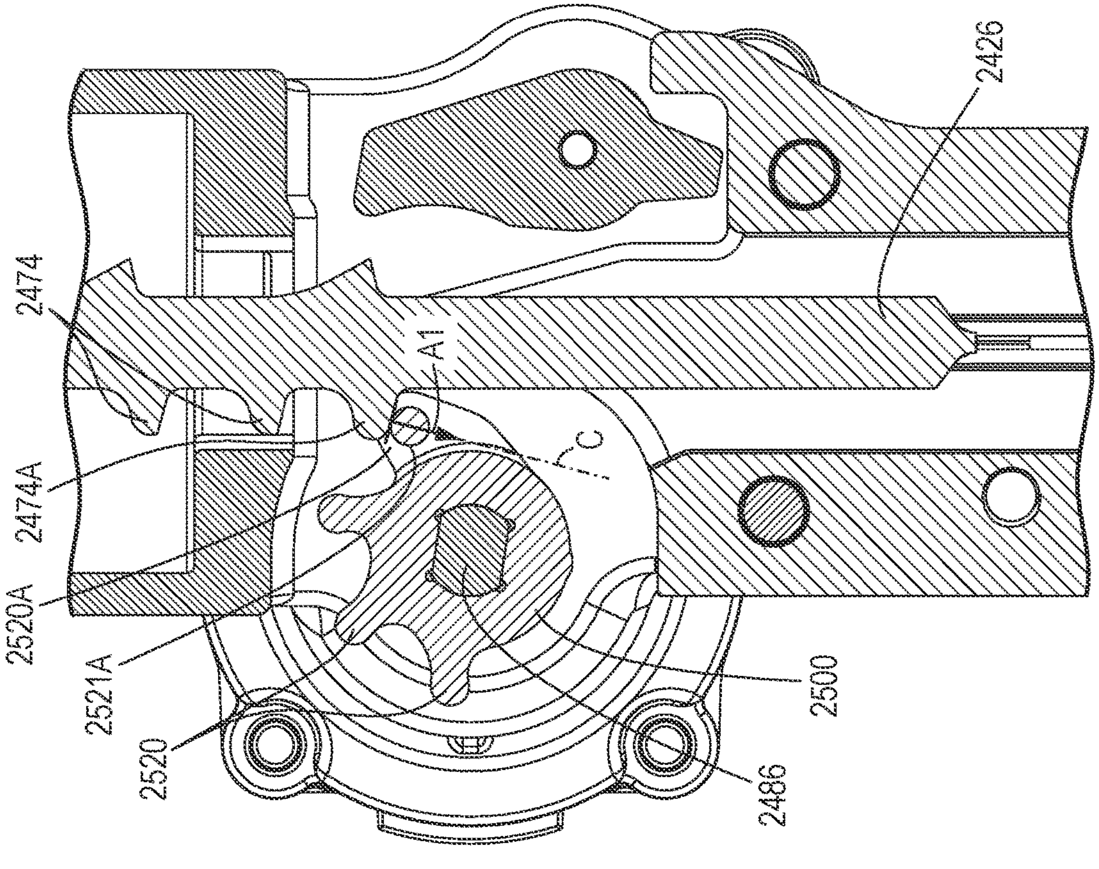
FIG. 80A is a front cross-sectional view of the lifter of FIG. 78 about the line 80A-80A illustrating the driver blade of the powered fastener driver near a TDC position.

As shown in FIGS. 79 and 80A, the lifter 2500 is coupled to the output shaft 2486 for relative rotation therewith. In the illustrated embodiment, the lifter 2500 has a D-shaped profile that engages the output shaft 2486 and a fastener 2515 (FIG. 79, e.g., a nut) is threadably coupled to an end portion of the output shaft 2486 to secure the lifter 2500 to output shaft 2486. Further, the lifter 2500 has a unitary body defining a plurality of teeth 2520 that sequentially engage lift teeth 2474 formed on the driver blade 2426 as the driver blade 2426 is returned from the BDC position toward the TDC position. A last tooth 2520A of the lifter 2500 includes a roller 2521A that engages a last or lowermost tooth 2474A of the driver blade 2426 as the driver blade 2426 reaches the TDC position.

Now with reference to FIG. 80B, the carrier 2499 includes an aperture 2510 that is partly defined by two opposed curvilinear segments 2522 and two opposed protrusions 2524 that extend radially inward of a base circle A coinciding with the curvilinear segments 2522. Each of the protrusions 2524 includes flat segments 2526, 2530 and an apex 2534 between the segments 2526, 2530. Thus, the aperture 2510 is also partly defined by the protrusions 2524, in addition to the curvilinear segments 2522. As explained in further detail below, each curvilinear segment 2522 is configured to engage with the respective cylindrical portion 2498 of the output shaft 2486, while each protrusion 2524 is configured to engage with a corresponding flat portion 2502 on an outer peripheral surface of the output shaft 2486.

Each of the first and second flat segments 2526, 2530 of each of the protrusions 2524 is configured to alternately engage with the respective flat portion 2502 of the output shaft 2486. Accordingly, the first flat segments 2526 may be considered a driving lug and each flat portion 2502 may be considered a driven lug. A combination of the first flat segment 2526, the second flat segments 2530, and flat portion 2502 defines the kickout arrangement 2536 located between the carrier 2499 and the output shaft 2486.

Figure 81B:
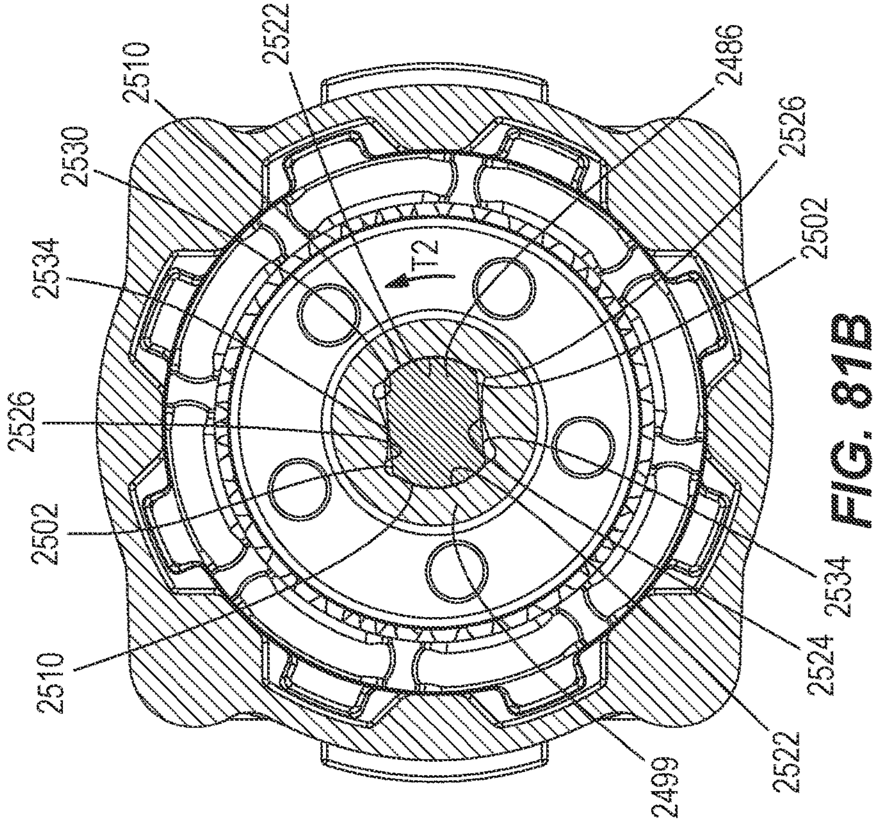
FIG. 81B is another front cross-sectional view of the drive unit of FIG. 78 about the line 80B-80B illustrating the torque output member in an intermediate rotational position relative to the torque input member when the driver blade is in the position shown in FIG. 81A.
Figure 81A:
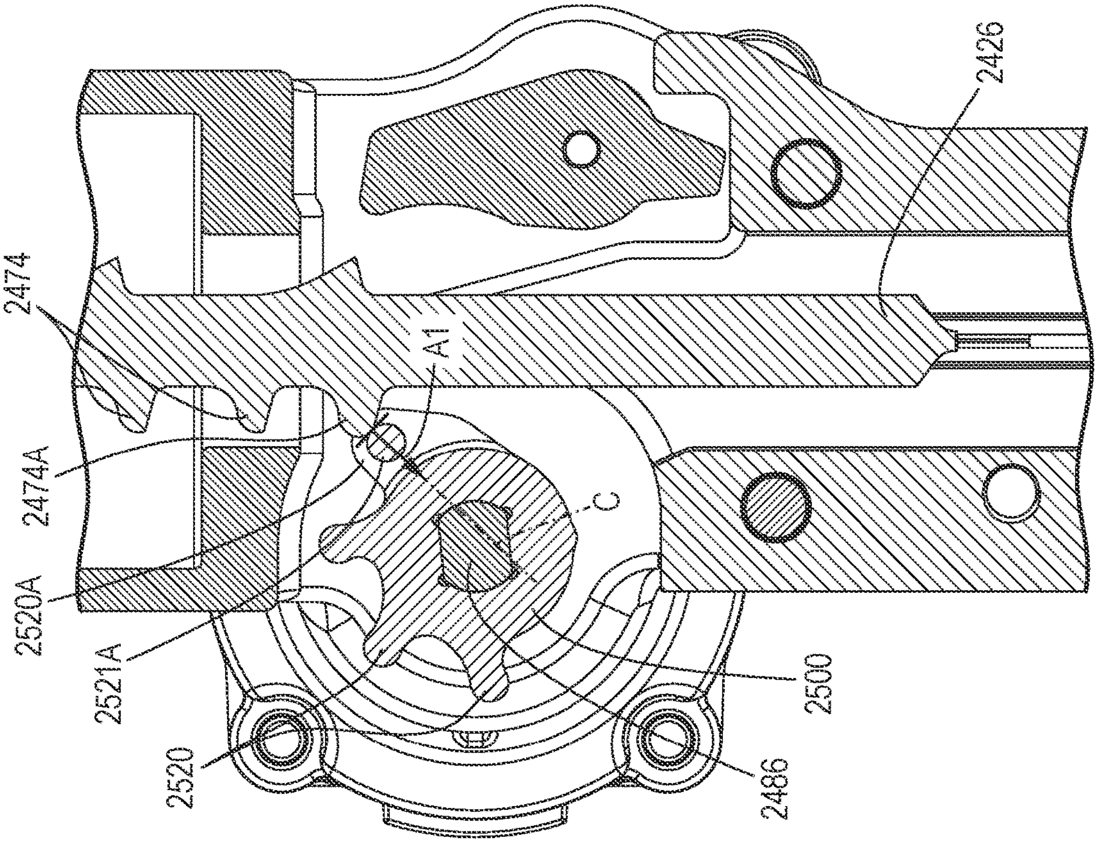
FIG. 81A is another front cross-sectional view of the lifter of FIG. 78 about the line 80A-80A illustrating the driver blade in the TDC position.
Figure 82B:
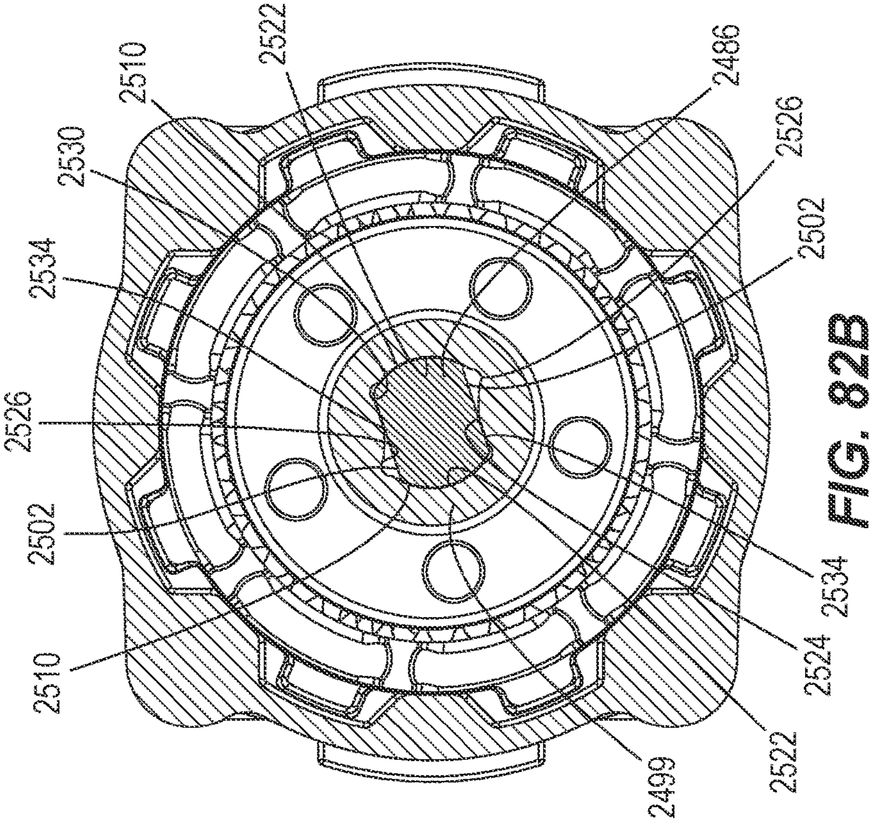
FIG. 82B is another front cross-sectional view of the drive unit of FIG. 78 about the line 80B-80B illustrating the torque output member in a second rotational position relative to the torque input member when the driver blade is in the position shown in FIG. 82A.
Figure 82A:
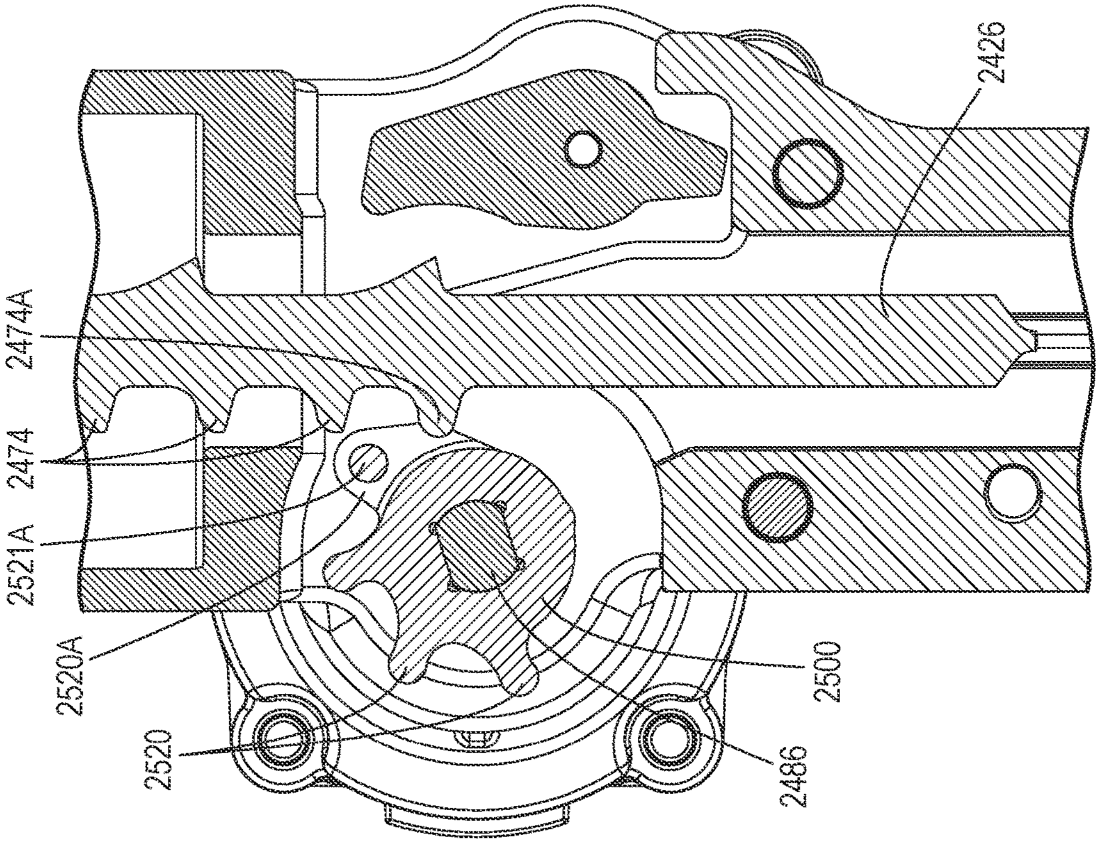
FIG. 82A is another front cross-sectional view of the lifter of FIG. 78 about the line 80A-80A illustrating the driver blade moving from the TDC position toward a BDC position.
Figure 83:
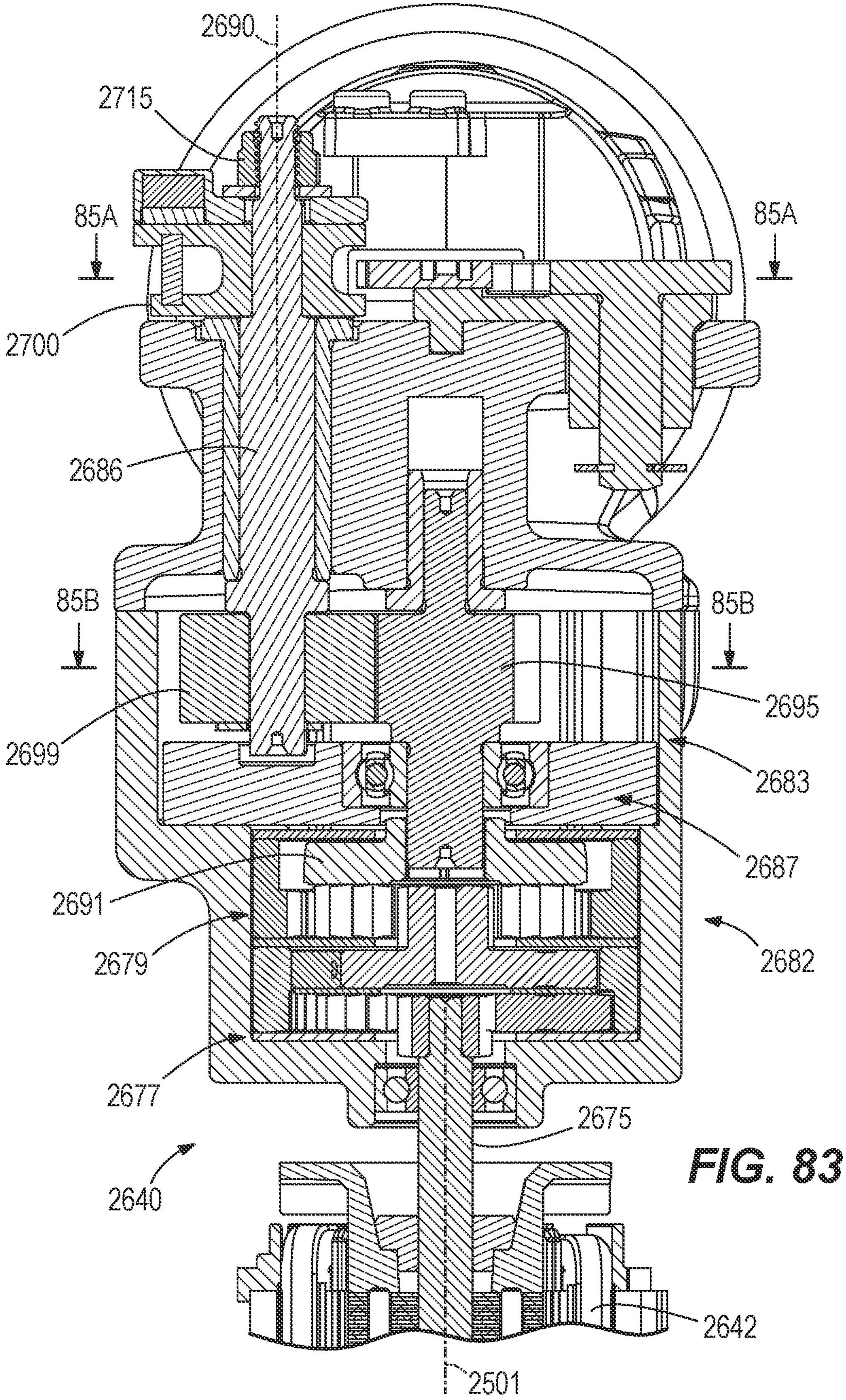
FIG. 83 is a cross-sectional view of a drive unit of a powered fastener driver according to another embodiment, illustrating a motor and a transmission having a driven gear and a spur gear defining a torque input member and an output shaft and a lifter defining a torque output member for providing torque to a driver blade of the powered fastener driver.

With reference to FIGS. 80B, 81B, and 82B, the output shaft 2486 and the lifter 2500 (e.g., the torque output member) is movable relative to the carrier 2499 (e.g., the torque input member) between a first position (FIG. 80B), in which the flat portions 2502 of the output shaft 2486 are engaged with the respective first flat segments 2526 of the carrier 2499, and a second position (FIG. 82B), in which the output shaft 2486 and the lifter 2500 is rotated relative to the carrier 2499 (i.e., about a rotational axis 2490) such that the second flat segments 2530 are engaged with the respective flat portions 2502 when the lifter 2500 moves towards the TDC position (FIGS. 80A, 81A, 82A). The output shaft 2486 and the lifter 2500 is in the first position relative to the carrier 2499 when returning the driver blade 2426 from the BDC position toward the TDC position. The output shaft 2486 and the lifter 2500 rotates (in a counter-clockwise direction from the frame of reference of FIG. 80B) to the second position relative to the carrier 2499 after the driver blade 2426 reaches the TDC position. In other words, the aperture 2510 is configured to selectively allow rotation of the output shaft 2486 and the lifter 2500 relative to the carrier 2499.

More specifically, as illustrated in FIGS. 80A, 80B, as the driver blade 2426 approaches the TDC position, a contact normal (i.e., arrow A1 in FIG. 80B) perpendicular to a line tangent to both a last lifter roller 2521A and the surface on a lowermost tooth 2474A on the driver blade 2426 with which the roller 2521A is in contact is formed. Since the lifter 2500 and the output shaft 2486 are coupled for co-rotation, a reaction force T1 is applied to the output shaft 2486 along the contact normal A1, which is oriented along a line of action C located below the rotational axis of the lifter 2500, which is coaxial with the rotational axis 2490 of the output shaft 2486, from the frame of reference of FIG. 80B. Thus, a reaction torque (arrow T1) is applied to the output shaft 2486 in a clockwise direction (from the frame of reference of FIG. 80B), thereby maintaining the output shaft 2486 in the first position as the driver blade 2426 is moved toward the TDC position. The line of action C of the contact normal A1 remains below the rotational axis of the lifter 2500 until the lifter 2500 reaches the TDC position. Thereafter, as shown in FIG. 81A, the contact normal A1 between the lowermost tooth 2474A and the last lifter roller 2521A changes direction such that the line of action C is located above the rotational axis of the lifter 2500. Thus, as shown in FIG. 81B, the reaction torque (arrow T2) exerted on the output shaft 2486 by the driver blade 2426 is redirected in a counter-clockwise direction (from the frame of reference of FIG. 80B), thereby causing the output shaft 2486 to rotate about the carrier 2499 from the first position shown in FIG. 80B to the second position shown in FIG. 82B.

FIGS. 83-87B illustrate another embodiment drive unit 2640, with like components and features as the embodiment of the drive unit 40 of the fastener driver 10 shown in FIG. 2 being labeled with like reference numerals plus “2600”. The drive unit 2640 is utilized for a fastener driver similar to the fastener driver 10 of FIGS. 1-7 and, accordingly, the discussion of the fastener driver 10 above similarly applies to the drive unit 2640 and is not re-stated. Rather, only differences between the drive unit 40 of FIG. 2 and the drive unit 2640 of FIGS. 83-87B are specifically noted herein.

The drive unit 2640 includes an electric motor 2642 and a transmission 2682 positioned downstream of the motor 2642. The transmission 2682 includes an input 2675 (i.e., a motor output shaft) and includes an output shaft 2686 extending to a lifter 2700, which is operable to move a driver blade 2626 (FIG. 84) from the driven position to the ready position, as explained in greater detail below. In other words, the transmission 2682 provides torque to the lifter 2700 from the motor 2642. The transmission 2682 is configured as a planetary transmission having two planetary stages 2677, 2679 and a spur gear stage 2683. Each planetary stage 2677, 2679 includes a ring gear, a carrier, and multiple planet gears coupled to the carrier for relative rotation therewith. In alternative embodiments, the transmission may be a single-stage planetary transmission, or a multi-stage planetary transmission including any number of planetary stages.

A one-way clutch mechanism 2687 incorporated in the transmission 2682. More specifically, the one-way clutch mechanism 2687 includes a carrier 2691, which is also a component in the second planetary stage 2679. The one-way clutch mechanism 2687 permits a transfer of torque to the output shaft 2686 of the transmission 2682 in a single (i.e., first) rotational direction, yet prevents the motor 2642 from being driven in a reverse direction in response to an application of torque on the output shaft 2686 of the transmission 2682 in an opposite, second rotational direction. In the illustrated embodiment, the one-way clutch mechanism 2687 is incorporated with the second planetary stage 2679 of the transmission 2682. In alternative embodiments, the one-way clutch mechanism 2687 may be incorporated into the first planetary stage 2677, for example.

The spur gear stage 2683 includes a first, drive spur gear 2695 and a second, driven spur gear 2699 meshed with the drive spur gear 2695 for relative rotation therewith. The motor 2642, the planetary stages 2677, 2679, and the drive spur gear 2695 are coaxial with a first rotational axis 2501, which is offset from a second rotational axis 2690 that is coaxial with the driven spur gear 2699. As such, the second rotational axis 2690 is also coaxial with the output shaft 2686 and the lifter 2500. The construction of the transmission 2682 reduces the overall size of the fastener driver. In the illustrated embodiment, the spur gear stage 2683 has a gear ratio of 1:1. In other embodiments, spur gear stage 2683 may have an alternative gear ratio. The driven spur gear 2699 is coupled to the output shaft 2686 through a kickout arrangement 2736 (FIG. 85B) described in more detail below. In the illustrated embodiment, the driven spur gear 2699 is a torque input member that is configured to transmit torque to from the drive unit 2640 and the output shaft 2686 and the lifter 2700 defines a torque output member, which is in selective driving connection with and downstream of the torque input member. The torque output member configured to receive torque from the torque input member in a first rotational direction for returning the driver blade 2626 from the bottom-dead-center position toward the top-dead-center position.

Figure 84:
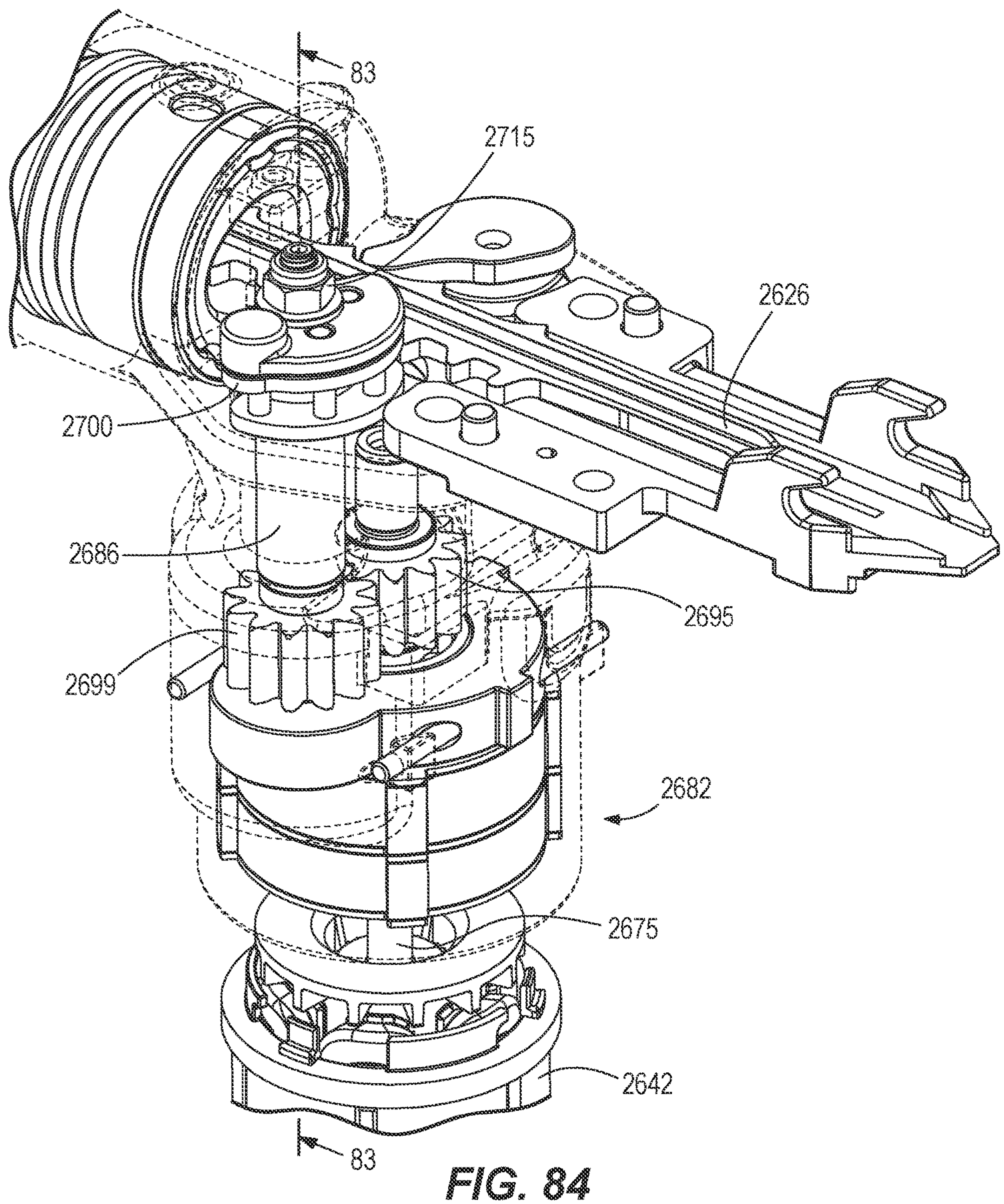
FIG. 84 is a perspective view of a portion of the powered fastener driver with portions of a housing removed to illustrate the drive unit of FIG. 83.
Figure 85B:
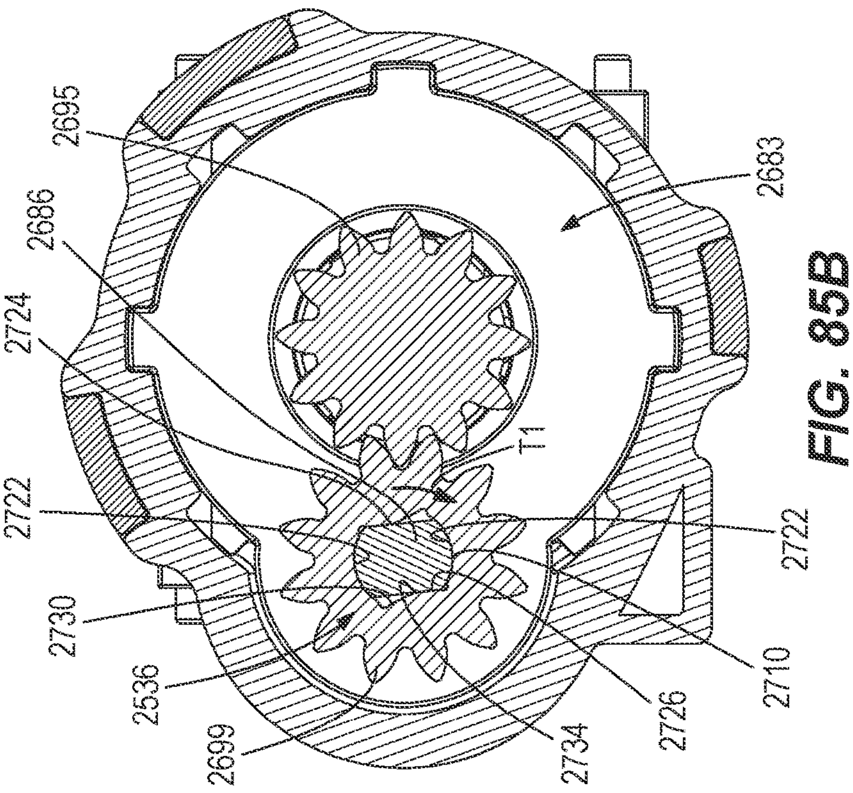
FIG. 85B is a front cross-sectional view of the drive unit of FIG. 83 about the line 85B-85B illustrating the torque output member in a first rotational position relative to the torque input member when the driver blade is in the position shown in FIG. 80A.
Figure 85A:
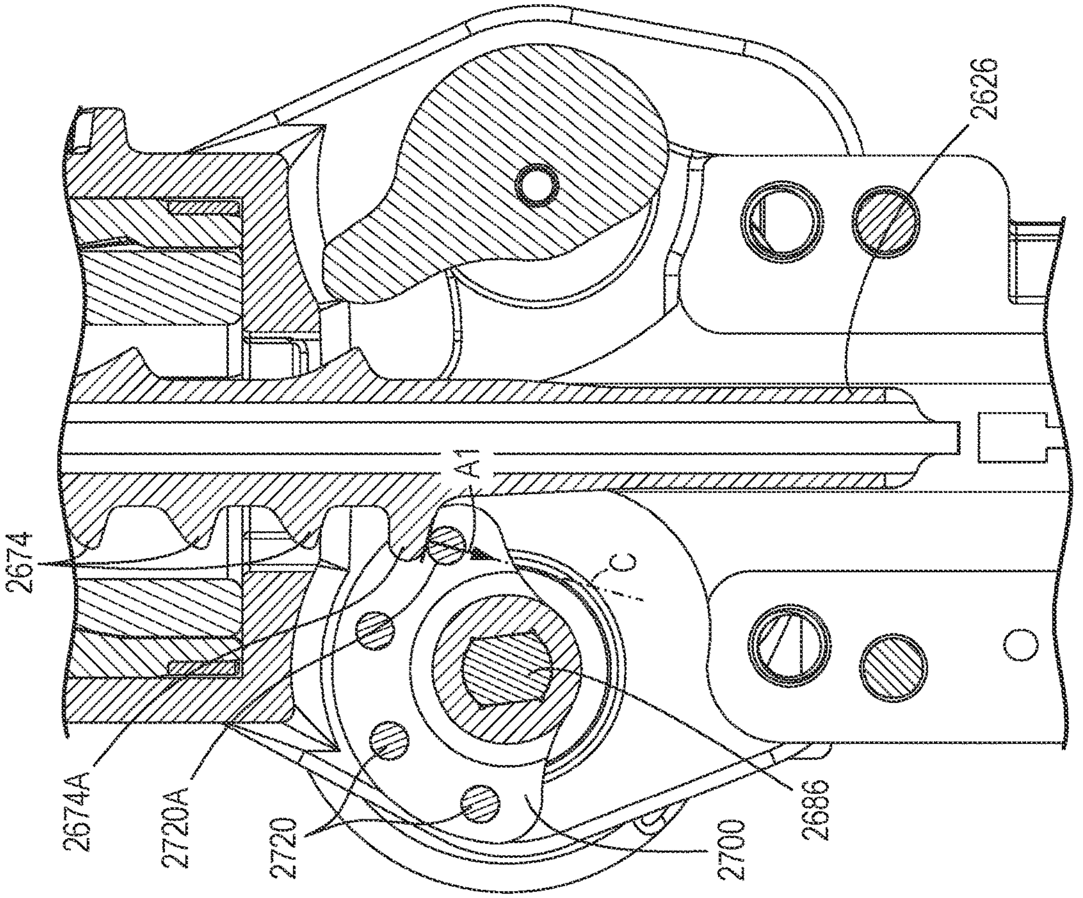
FIG. 85A is a front cross-sectional view of the lifter of FIG. 83 about the line 85A-85A illustrating a driver blade of the powered fastener driver near a TDC position.

As shown in FIGS. 84 and 85A, the lifter 2700 is coupled to the output shaft 2686 for relative rotation therewith. In the illustrated embodiment, the lifter 2700 has a D-shaped profile that engages the output shaft 2686 and a fastener 2715 (FIG. 83, e.g., a nut) is threadably coupled to an end portion of the output shaft 2686 to secure the lifter 2700 to output shaft 2686. Further, the lifter 2700 has a body having a plurality of pins 2720 that sequentially engage lift teeth 2674 formed on the driver blade 2626 as the driver blade 2626 is returned from the BDC position toward the TDC position. A last pin 2720A of the lifter 2700 may be rotatably supported on the lifter 2700 and engages a last or lowermost tooth 2474A of the driver blade 2626 as the driver blade 2626 reaches the TDC position.

Now with reference to FIG. 85B, the driven spur gear 1699 includes an aperture 2710 that is partly defined by two opposed curvilinear segments 2722 and two opposed protrusions 2724 that extend radially inward of a base circle A coinciding with the curvilinear segments 2722. Each of the protrusions 2724 includes flat segments 2726, 2730 and an apex 2734 between the segments 2726, 2730. Thus, the aperture 2710 is also partly defined by the protrusions 2724, in addition to the curvilinear segments 2722. As explained in further detail below, each curvilinear segment 2722 is configured to engage with the respective cylindrical portion 2698 of the output shaft 2686, while each protrusion 2724 is configured to engage with a corresponding flat portion 2702 on an outer peripheral surface of the output shaft 2686.

Each of the first and second flat segments 2726, 2730 of each of the protrusions 2724 is configured to alternately engage with the respective flat portion 2702 of the output shaft 2686. Accordingly, the first flat segment 2726 may be considered a driving lug and each flat portion 2702 may be considered a driven lug. A combination of the first flat segment 2726, the second flat segments 2730, and flat portion 2702 defines the kickout arrangement 2736 located between the driven spur gear 1699 and the output shaft 2686.

Figure 86B:
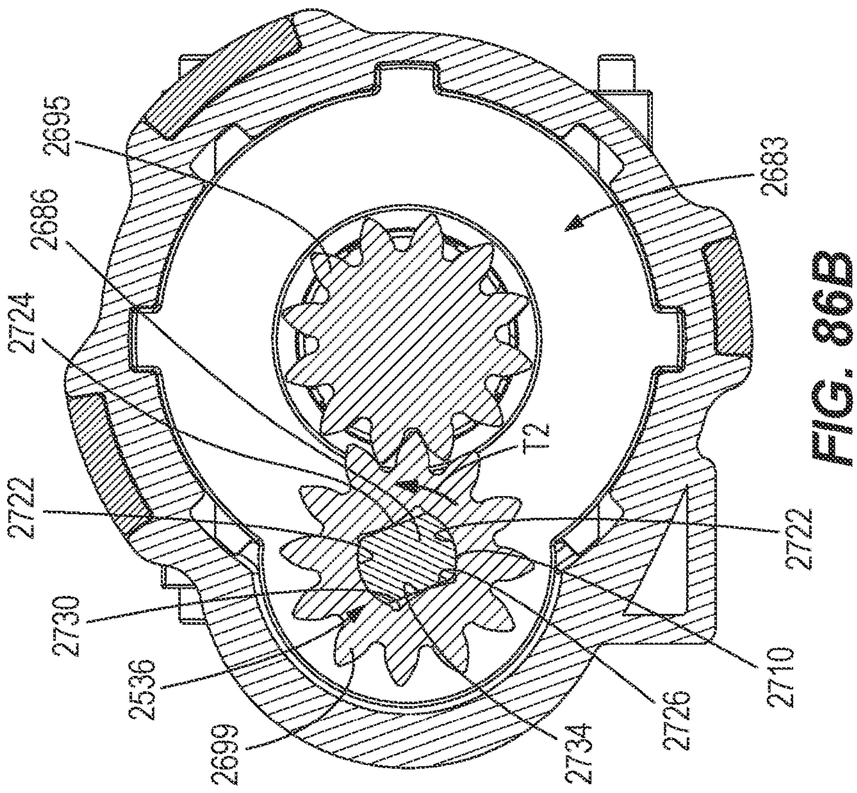
FIG. 86B is another front cross-sectional view of the drive unit of FIG. 83 about the line 85B-85B illustrating the torque output member in an intermediate rotational position relative to the torque input member when the driver blade is in the position shown in FIG. 81A.
Figure 86A:
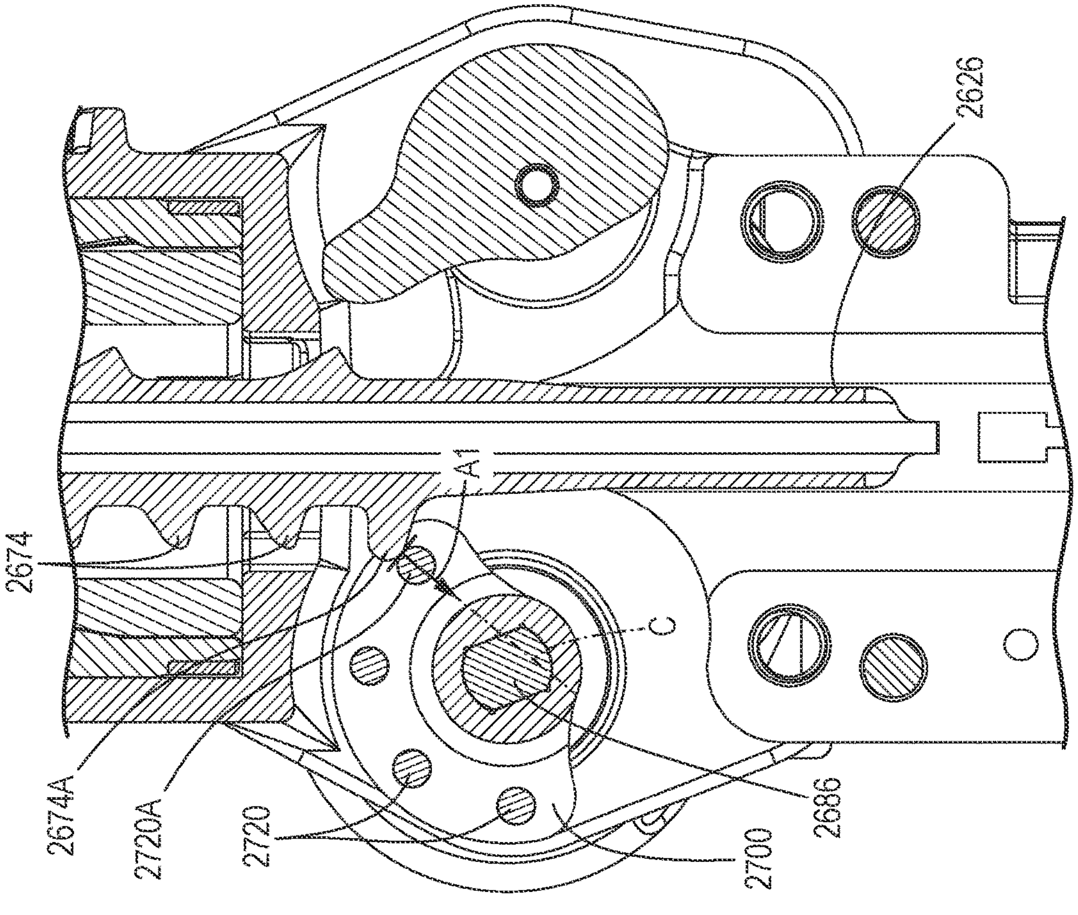
FIG. 86A is another front cross-sectional view of the lifter of FIG. 83 about the line 85A-85A illustrating the driver blade in the TDC position.
Figure 87B:
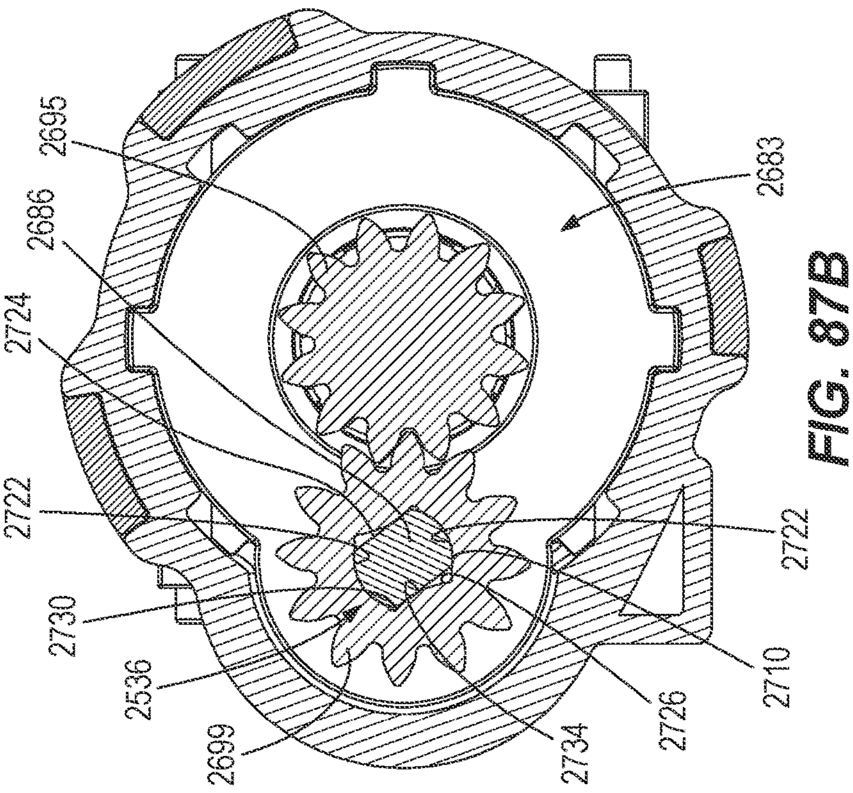
FIG. 87B is another front cross-sectional view of the drive unit of FIG. 83 about the line 85B-85B illustrating the torque output member in a second rotational position relative to the torque input member when the driver blade is in the position shown in FIG. 82A.
Figure 87A:
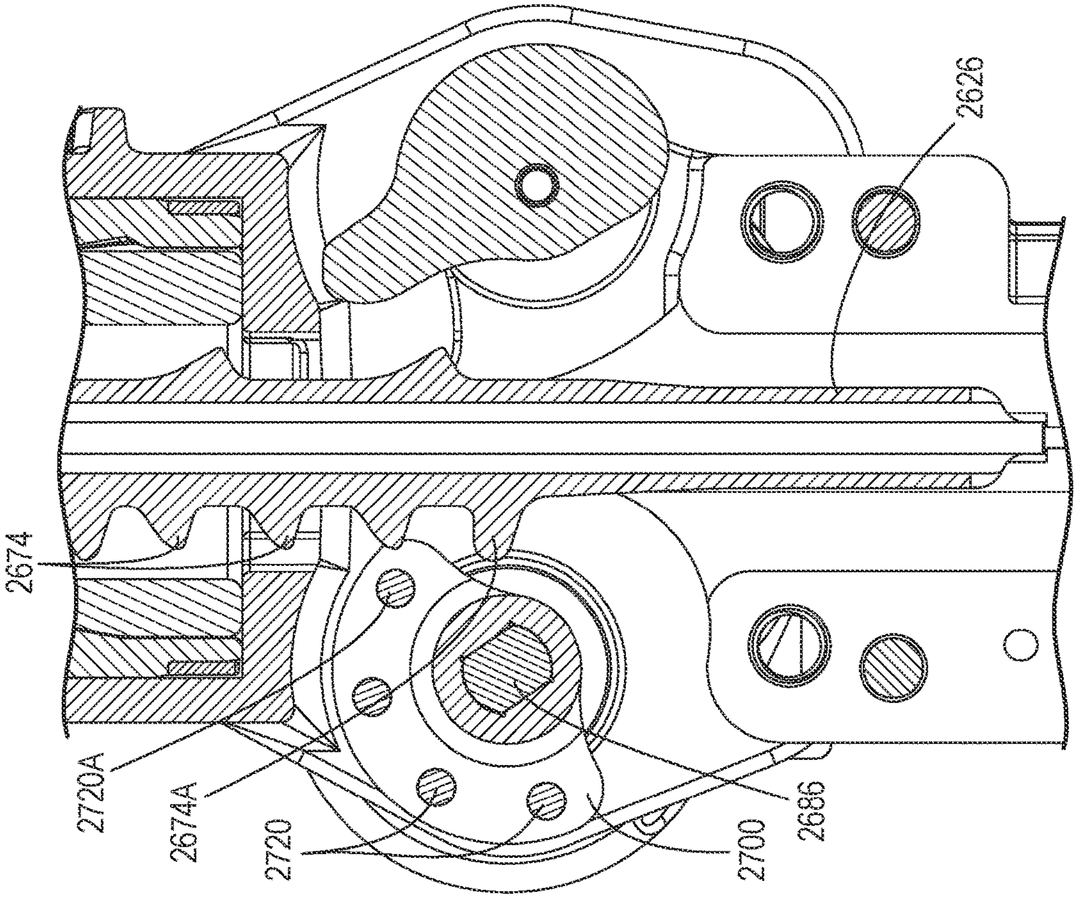
FIG. 87A is another front cross-sectional view of the lifter of FIG. 83 about the line 85A-85A illustrating the driver blade moving from the TDC position toward a BDC position.

With reference to FIGS. 85B, 86B, and 87B, the output shaft 2686 and the lifter 2700 (e.g., the torque output member) is movable relative to the spur gear between a first position (FIG. 85B), in which the flat portions 2702 of the output shaft 2686 are engaged with the respective first flat segments 2726 of the driven spur gear 1699, and a second position (FIG. 87B), in which the output shaft 2686 and the lifter 2700 is rotated relative to the driven spur gear 1699 (i.e., about a rotational axis 2490) such that the second flat segments 2730 are engaged with the respective flat portions 2702 when the lifter 2700 moves towards the TDC position (FIGS. 85A, 86A, 87A). The output shaft 2686 and the lifter 2700 is in the first position relative to driven spur gear 1699 when returning the driver blade 2626 from the BDC position toward the TDC position. The output shaft 2686 and the lifter 2700 rotates (in a counter-clockwise direction from the frame of reference of FIG. 85B) to the second position relative to the driven spur gear 1699 after the driver blade 2426 reaches the TDC position. In other words, the aperture 2710 is configured to selectively allow rotation of the output shaft 2686 relative to the driven spur gear 1699.

More specifically, as illustrated in FIGS. 85A, 85B, as the driver blade 2626 approaches the TDC position, a contact normal (i.e., arrow A1 in FIG. 85B) perpendicular to a line tangent to both a last lifter pin 2720A and the surface on a lowermost tooth 2674A on the driver blade 2626 with which the pin 2720A is in contact is formed. Since the lifter 2700 and the output shaft 2686 are coupled for co-rotation, a reaction force T1 is applied to the output shaft 2686 along the contact normal A1, which is oriented along a line of action C located below the rotational axis of the lifter 2700, which is coaxial with the rotational axis 2690 of the output shaft 2686, from the frame of reference of FIG. 85B. Thus, a reaction torque (arrow T1) is applied to the output shaft 2686 in a clockwise direction (from the frame of reference of FIG. 85B), thereby maintaining the output shaft 2686 in the first position relative to the driven spur gear 1699 as the driver blade 2626 is moved toward the TDC position. The line of action C of the contact normal A1 remains below the rotational axis 2690 of the lifter 2700 until the lifter 2700 reaches the TDC position. Thereafter, as shown in FIG. 86A, the contact normal A1 between the lowermost tooth 2674A and the last lifter pin 2720A changes direction such that the line of action C is located above the rotational axis 2790 of the lifter 2700. Thus, as shown in FIG. 86B, the reaction torque (arrow T2) exerted on the output shaft 2686 by the driver blade 2626 is redirected in a counter-clockwise direction (from the frame of reference of FIG. 86B), thereby causing the output shaft 2686 to rotate about the driven spur gear 1699 from the first position shown in FIG. 85B to the second position shown in FIG. 87B.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a driver blade movable from a top-dead-center position to a driven or bottom-dead-center position for driving a fastener into a workpiece;

a drive unit for providing torque to move the driver blade from the bottom-dead-center position toward the top-dead-center position;

a torque input member configured to receive torque from the drive unit;

a torque output member in selective driving connection with and downstream of the torque input member, the torque output member configured to receive torque from the torque input member in a first rotational direction for returning the driver blade from the bottom-dead-center position toward the top-dead-center position; and a kickout arrangement at least partially defined by an outer surface on one of the torque output member and the torque input member, and an aperture formed in the other of the torque output member and the torque input member in which the outer surface is received, the kickout arrangement configured to permit limited rotation of the torque output member relative to the torque input member between a first position and a second position, wherein the torque output member is in the first position relative to the torque input member when returning the driver blade from the bottom-dead-center position toward the top-dead-center position, and wherein the kickout arrangement permits the torque output member to rotate relative to the torque input member from the first position to the second position, without torque being applied to the torque input member in a second rotational direction that is opposite the first rotational direction, after the driver blade reaches the top-dead-center position to release the driver blade and initiate a fastener driving operation.

2. The powered fastener driver of claim 1, wherein the torque input member is an output shaft and the torque output member is a rotary lifter.

3. The powered fastener driver of claim 1, wherein the drive unit includes a motor and a transmission configured to receive torque from the motor, wherein the transmission includes a planetary stage having a carrier, and wherein the carrier is the torque input member.

4. The powered fastener driver of claim 3, further comprising an output shaft coupled to the carrier and a rotary lifter coupled for co-rotation with the output shaft, and wherein the output shaft and the rotary lifter together form the torque output member.

5. The powered fastener driver of claim 1, wherein the drive unit includes a motor and a transmission configured to receive torque from the motor, wherein the transmission includes a first, drive spur gear and a second, driven spur gear meshed with the drive spur gear, and wherein the driven spur gear is the torque input member.

6. The powered fastener driver of claim 5, further comprising an output shaft coupled to the driven spur gear and a rotary lifter coupled for co-rotation with the output shaft, and wherein the output shaft and the rotary lifter together form the torque output member.

7. The powered fastener driver of claim 6, wherein the motor defines a first rotational axis coaxial with the drive spur gear, wherein the output shaft defines a second rotational axis that is offset from the first rotational axis, and wherein the driven spur gear is coaxial with the second rotational axis.

8. The powered fastener driver of claim 1, wherein the torque input member includes first lugs, and the torque output member includes second lugs, and wherein each of the first lugs is alternatively engageable with the second lugs for driving rotation of the torque output member relative to the torque input member.

9. The powered fastener driver of claim 1, wherein the torque input member defines a rotational axis, and wherein the torque output member rotates about the rotational axis between the first position and second position.

10. The powered fastener driver of claim 9, wherein the aperture includes two flat segments, and the outer surface includes two flat portions, each flat portion oriented parallel with the rotational axis, and wherein at least one of the flat segments is configured to selectively engage with at least one of the flat portions when the torque output member is in the first position and the second position.

11. The powered fastener driver of claim 10, wherein the aperture includes two opposed curvilinear segments, and the outer surface includes two opposed cylindrical portions, and wherein each curvilinear segment is configured to engage with the respective cylindrical portion.

12. The powered fastener driver of claim 10, wherein the aperture includes two opposed curvilinear segments and two opposed protrusions that extend radially inward of a base circle coinciding with the two opposed curvilinear segments.

13. The powered fastener driver of claim 12, wherein each protrusion includes a first flat segment, a second flat segment, and an apex between the first and second flat segments, and wherein the first and second flat segments of each protrusion define an obtuse included angle therebetween.

14. The powered fastener driver of claim 13, wherein the obtuse included angle is between 120 degrees and 160 degrees.

15. The powered fastener driver of claim 14, wherein the obtuse included angle is 140 degrees.

16. The powered fastener driver of claim 1, wherein the aperture defines a rotational axis that extends therethrough, and wherein the first and second rotational directions are defined relative to the rotational axis.

17. A powered fastener driver comprising:

a driver blade movable from a top-dead-center position to a driven or bottom-dead-center position for driving a fastener into a workpiece;

a drive unit for providing torque to move the driver blade from the bottom-dead-center position toward the top-dead-center position;

a torque input member configured to receive torque from the drive unit;

a torque output member in selective driving connection with and downstream of the torque input member, the torque output member configured to receive torque from the torque input member in a first rotational direction for returning the driver blade from the bottom-dead-center position toward the top-dead-center position; and a kickout arrangement at least partially defined by an outer surface on one of the torque output member and the torque input member, and an aperture formed in the other of the torque output member and the torque input member in which the outer surface is received, the aperture having two opposed curvilinear segments and two opposed protrusions that extend radially inward of a base circle coinciding with the two opposed curvilinear segments, the kickout arrangement configured to permit limited rotation of the torque output member relative to the torque input member between a first position and a second position, wherein the kickout arrangement permits the torque output member to rotate relative to the torque input member from the first position to the second position, without torque being applied to the torque input member in a second rotational direction that is opposite the first rotational direction, after the driver blade reaches the top-dead-center position to release the driver blade and initiate a fastener driving operation.

18. The powered fastener driver of claim 17, wherein the drive unit includes a motor and a transmission configured to receive torque from the motor, wherein the transmission includes a planetary stage having a carrier, and wherein the carrier is the torque input member.

19. The powered fastener driver of claim 18, further comprising an output shaft coupled to the carrier and a rotary lifter coupled for co-rotation with the output shaft, and wherein the output shaft and the rotary lifter together form the torque output member.

20. The powered fastener driver of claim 17, wherein the drive unit includes a motor and a transmission configured to receive torque from the motor, wherein the transmission includes a first, drive spur gear and a second, driven spur gear meshed with the drive spur gear, and wherein the driven spur gear is the torque input member.

21. The powered fastener driver of claim 20, further comprising an output shaft coupled to the driven spur gear and a rotary lifter coupled for co-rotation with the output shaft, and wherein the output shaft and the rotary lifter together form the torque output member.

* * * * *